United States Patent
Ekkaia et al.

(10) Patent No.: US 9,684,483 B2
(45) Date of Patent: Jun. 20, 2017

(54) SEAMLESS ILLUMINATED PANEL

(71) Applicant: Lellan, Inc, Redwood City, CA (US)

(72) Inventors: Dean Ekkaia, Emeryville, CA (US); Frank Halasz, Santa Cruz, CA (US); Richard Alfons Wimmer, Redwood City, CA (US)

(73) Assignee: Lellan, Inc., Redwood City, CA (US)

( * ) Notice: Subject to any disclaimer, the term of this patent is extended or adjusted under 35 U.S.C. 154(b) by 293 days.

(21) Appl. No.: 14/439,014

(22) PCT Filed: Oct. 28, 2013

(86) PCT No.: PCT/US2013/067147
§ 371 (c)(1),
(2) Date: Apr. 28, 2015

(87) PCT Pub. No.: WO2014/070684
PCT Pub. Date: May 8, 2014

(65) Prior Publication Data
US 2015/0301781 A1    Oct. 22, 2015

Related U.S. Application Data

(60) Provisional application No. 61/721,454, filed on Nov. 1, 2012.

(51) Int. Cl.
*G06F 3/14* (2006.01)
*H05B 33/08* (2006.01)
(Continued)

(52) U.S. Cl.
CPC .............. *G06F 3/1446* (2013.01); *F21S 2/00* (2013.01); *F21S 8/03* (2013.01); *F21V 11/00* (2013.01);
(Continued)

(58) Field of Classification Search
CPC ....... G09G 2360/04; G06F 3/1446; F21S 2/00
See application file for complete search history.

(56) References Cited

U.S. PATENT DOCUMENTS

| 5,563,470 A * | 10/1996 | Li | G09F 9/33 313/485 |
|---|---|---|---|
| 6,455,945 B1 * | 9/2002 | Ishii | B05D 7/146 257/620 |

(Continued)

FOREIGN PATENT DOCUMENTS

| CN | 202841795 U | 3/2013 |
|---|---|---|
| EP | 1 580 709 A1 | 9/2005 |

(Continued)

*Primary Examiner* — Karabi Guharay
(74) *Attorney, Agent, or Firm* — Kim Rubin Patent Agent

(57) ABSTRACT

A device and method of providing a versatile illuminated panel for walls, product displays, and other surfaces is described. Panels are constructed from a variable number of rectangular illuminated tiles, where the tiles mate edge-to-edge so as to create a nearly seamless visual panel effect. Illumination within each tile is uniform to also create a nearly seamless visual panel effect. End-users may create panels of varying sizes and shapes by using different quantities of a standard tile. The software within the invention automatically determines the number and arrangement of tiles within each assembled panel. Each tile comprises a plurality of illuminators, an optical means to distribute light from the illuminators uniformly across the tile, and at least one communication interface. In one embodiment the tiles are linked into a communications tree-structure; and the location of each tile within the tree constitutes its logical address.

26 Claims, 36 Drawing Sheets

(51) Int. Cl.
   *H05B 37/02* (2006.01)
   *F21V 11/00* (2015.01)
   *F21V 17/10* (2006.01)
   *F21S 2/00* (2016.01)
   *F21S 8/00* (2006.01)
   *G06F 9/44* (2006.01)
   *F21Y 105/00* (2016.01)

(52) U.S. Cl.
   CPC ....... *F21V 17/105* (2013.01); *H05B 33/0857* (2013.01); *H05B 37/0254* (2013.01); *F21Y 2105/00* (2013.01); *G06F 9/4413* (2013.01); *G09G 2360/04* (2013.01)

(56) References Cited

U.S. PATENT DOCUMENTS

| | | | |
|---|---|---|---|
| 7,719,480 B2 * | 5/2010 | Devos | G06F 3/1446 345/1.3 |
| 2003/0056413 A1 | 3/2003 | Wiener | |
| 2005/0264471 A1 * | 12/2005 | Yamazaki | G06F 3/1446 345/1.1 |
| 2006/0044215 A1 | 3/2006 | Brody | |
| 2013/0181884 A1 | 7/2013 | Perkins | |

FOREIGN PATENT DOCUMENTS

| | | |
|---|---|---|
| WO | WO 91/08565 A1 | 6/1991 |
| WO | WO 2011/159039 A2 | 12/2011 |

* cited by examiner

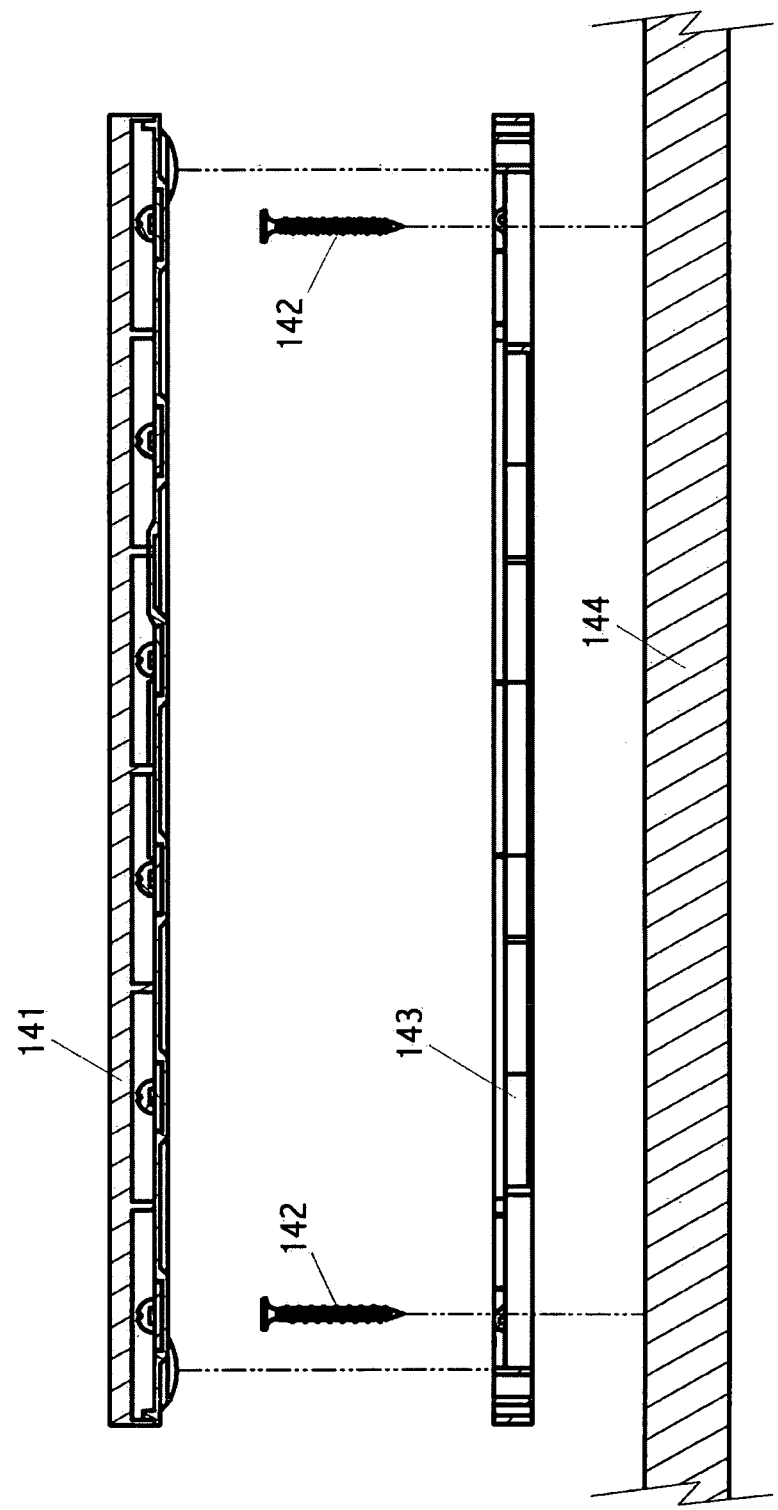

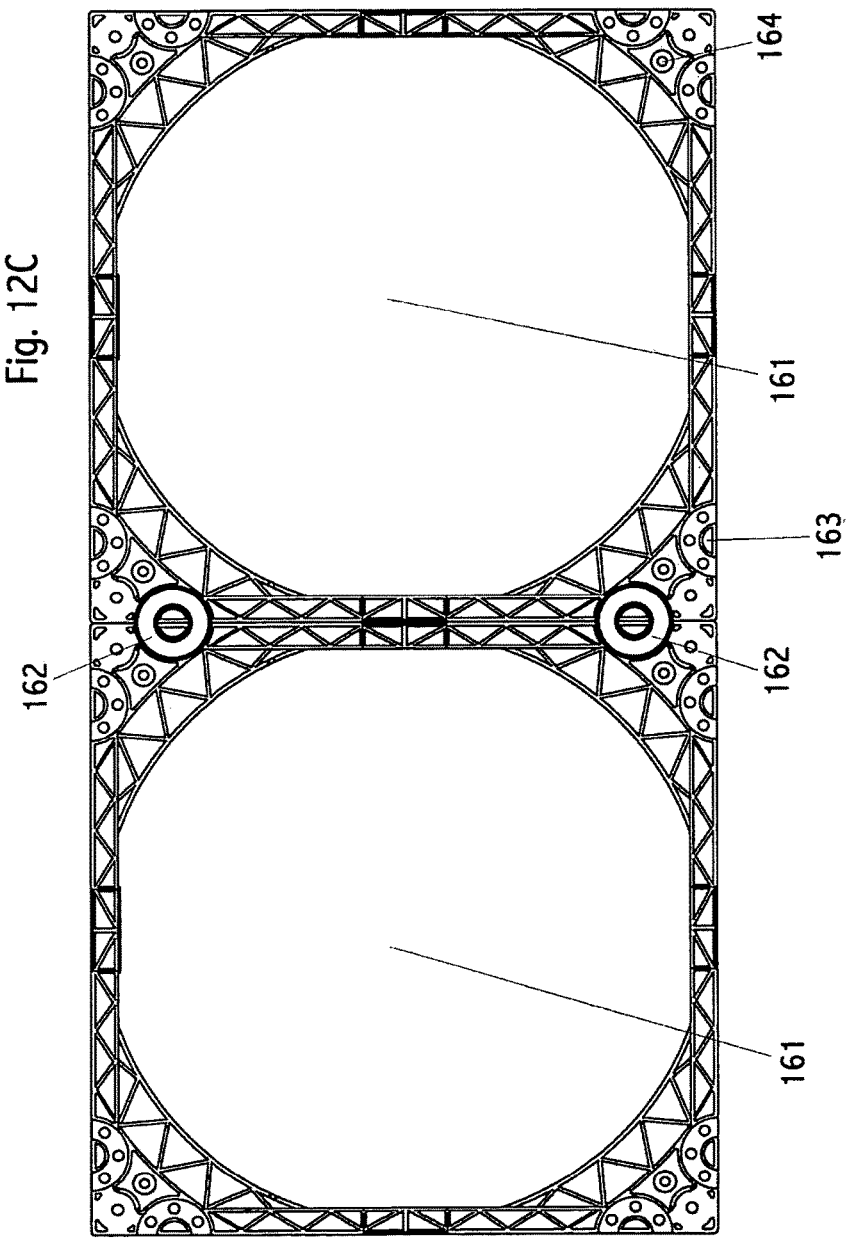
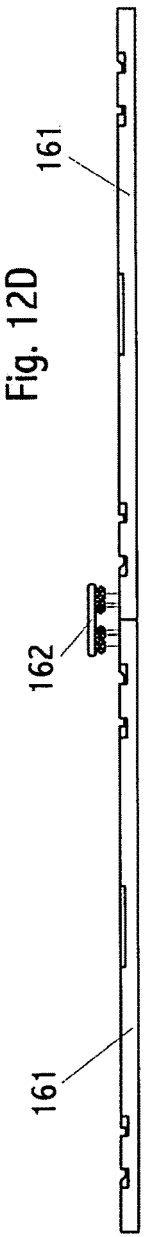

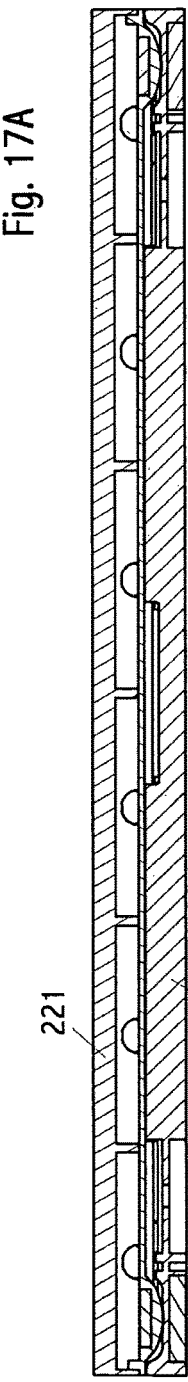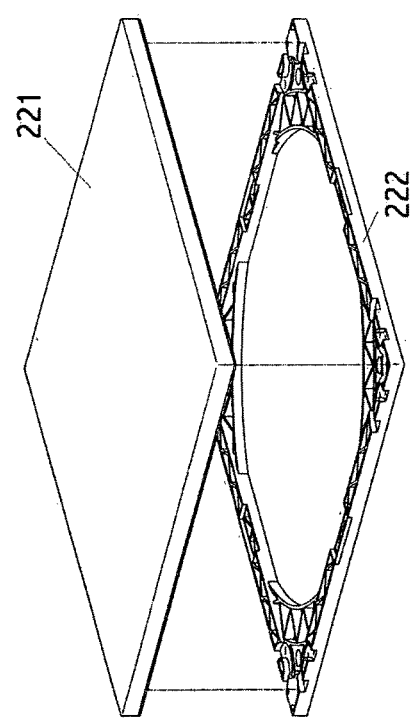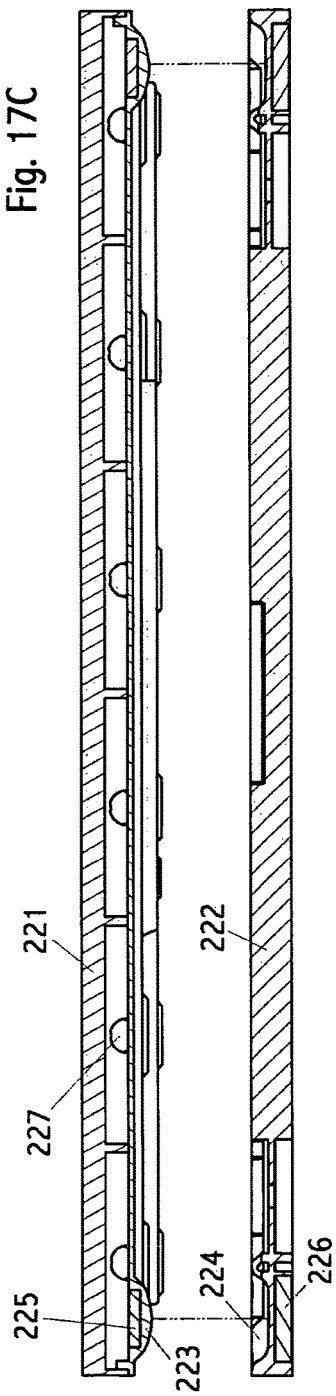

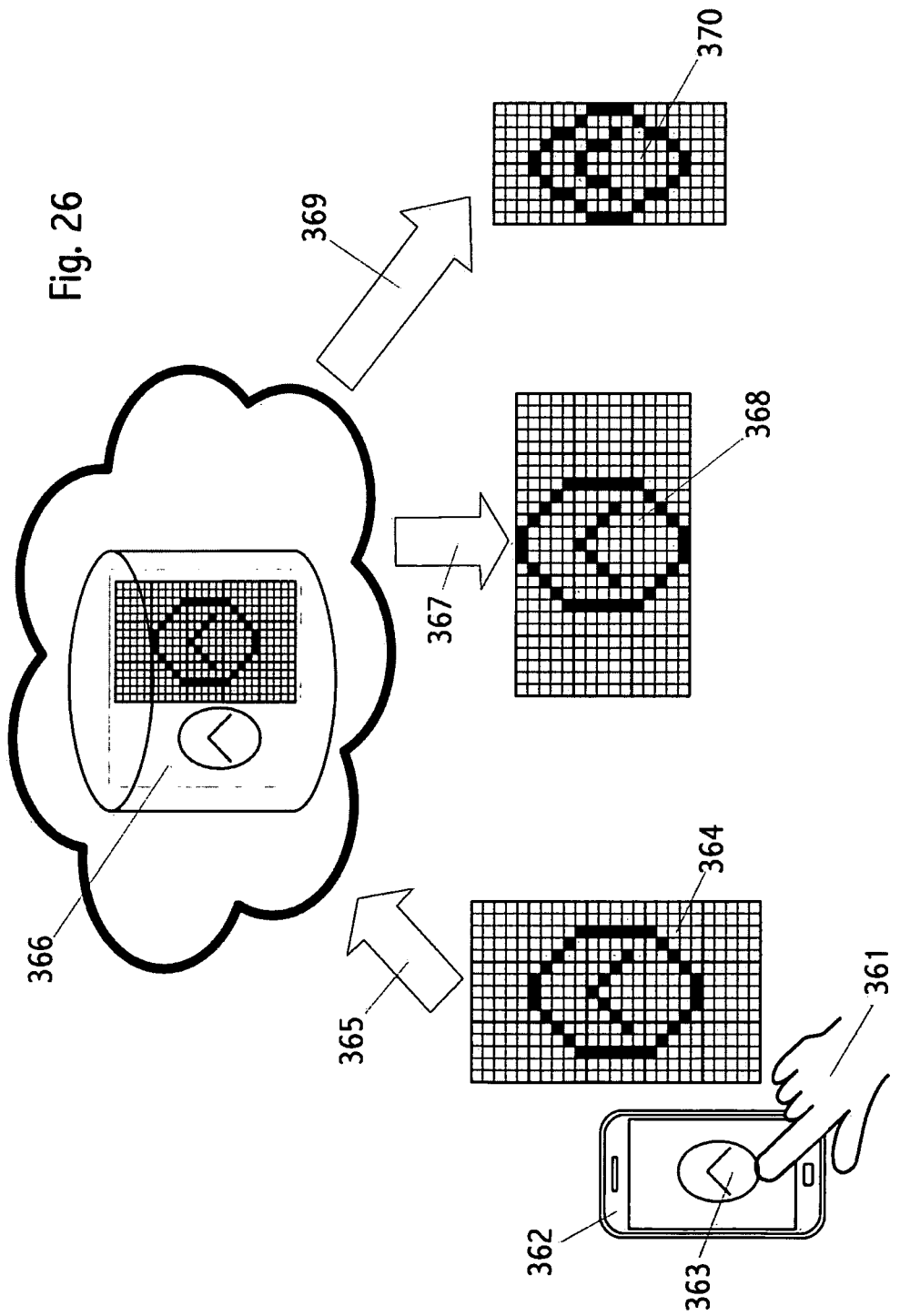

Fig. 27A
Fig. 27B
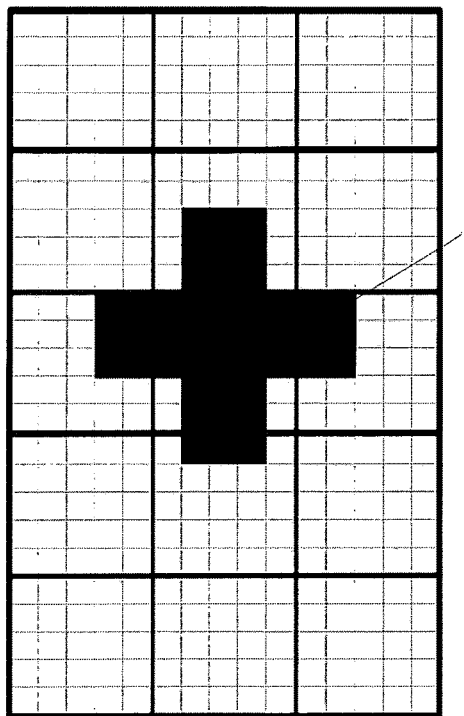
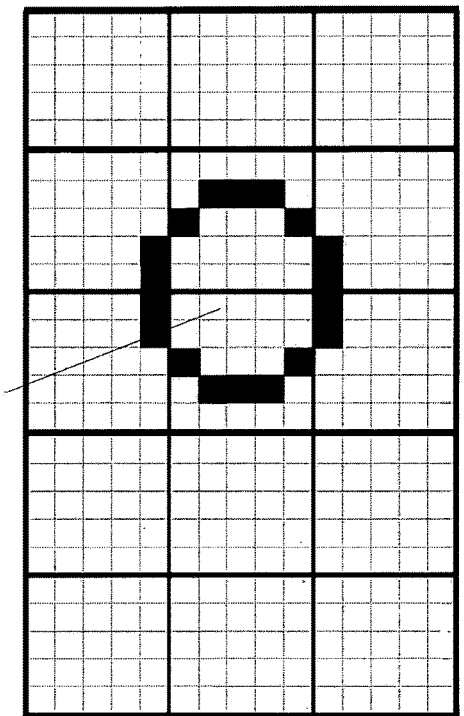
371
372
Touch Sensor
Touch Sensor
373
373
374
374

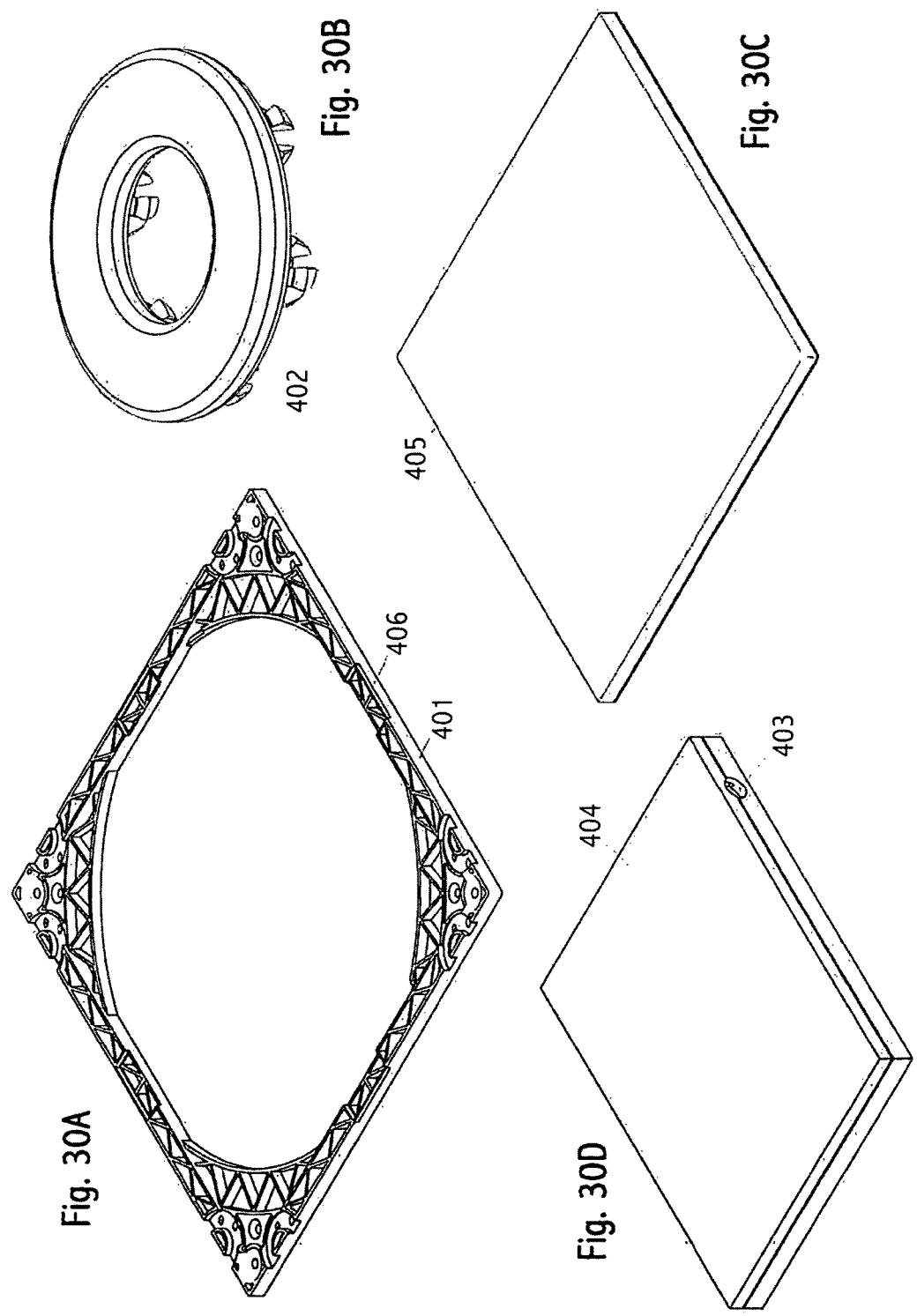

SEAMLESS ILLUMINATED PANEL

CROSS-REFERENCE TO RELATED APPLICATIONS

This application claims the benefit of U.S. Provisional Application 61/721,454 filed 1 Nov. 2012 and is incorporated herein in its entirety.

TECHNICAL FIELD

The technical field of this invention is illuminated tiled modular display panels. In particular, field-installable modular illuminated panels comprising tiles that display images via a programmable array of pixels.

BACKGROUND ART

Background art includes both modular video display panels, and electronic imaging panels comprising an array of picture elements (pixels). For example, patent and patent application publications including: US20130181884, US20060044215, CN202841795, US2005212717, and WO2011159039.

Prior art includes tiled display panels for the purpose of large area illuminated dynamic (electronic) image displays. What is in common with the instant invention is the use of interconnected tiles wherein the tiles form a larger panel. Such prior art comprises two forms: the first format uses video data and video display tiles. Such a format is ideal for large video projection requirements, however, such units are very expensive, large, deep, power-hungry, and complex. The second format uses tiles of light emitting elements, such as LEDs or OLEDs. Such a format provides a panel with less depth, but uses essentially point-source pixel elements.

The weaknesses of the first format are high cost, high weight, a need for continuous video data stream, and high complexity. The weaknesses of the second format are that it does not provide a large area display for a low cost per unit area, and that it does not provide a uniform, diffuse light capability.

Prior art also includes individual lamps that provide a uniform diffuse light, typically to resemble a common incandescent light bulb. Such devices are not suitable for implementing as tiles, due to the lack of built-in processing, image and color adjustment, rectangular shape, mechanical interconnections and flat light emitting surface.

The applications for the instant invention include field-construction of temporary or permanent, re-usable, movable, and re-configurable modular illuminated panels on surfaces including walls, ceilings, floors, kiosks, columns, shelves, trade show booths, and product display areas for applications including dynamic ambient lighting; dynamic signage; dynamic sales and marketing lighting for products and brands; stage lighting; theater lighting; dance hall lighting; performance arena lighting; entertainment and gaming lighting; crowd control; directional information; emergency information; and restaurant, lobby and room dynamic functional, ambient and mood lighting. As such, embodiments must provide appropriately sized modularity, ease of installation, light-weight, minimal depth, high efficiency, uniform light, seamless image presentation, borderless, electrically inter-connectable; mechanically inter-connectable, self-configuring, re-usable tiles that support the stated wide variety of physical panel installations, locations and purposes. Field assembly of panels requires only a small number of unique components, and minimal training. Prior art does not provide these necessary attributes.

For example, U.S. Pat. No. 8,360,604 B2 does not provide ease of installation, minimal depth, uniform light, seamless image presentation, electrically inter-connectability, mechanical inter-connectability or self-configuration as a panel. As another example, US patent publication US 2013/0181884 is a bulky, expensive system that does not provide ease of installation, light-weight, minimal depth, or high-efficiency.

Most prior art arrays of light emitting elements are in the form of fixed size manufactured panels and do not comprise re-usable, field installable modular, inter-connectable tiles.

Prior art illuminating panels provided either (1) sufficient light output and efficiency to be appropriate for area and task lighting, but failed to provide dynamic display of images; or (2) dynamic display of images but had insufficient light output or efficiency to be generally appropriate for area or task lighting. Prior art for mood, architectural or ambient lighting lacked the ability to provide dynamic display of images.

DISCLOSURE OF THE INVENTION

Embodiments of this invention include tiles and tiled panels comprised of adjacent tiles to form a smooth, flat panel capable of producing dynamic images in color while providing a uniform diffuse light surface, for a reasonable cost, using easily assembled and re-usable tiles.

Each tile comprises a moderate number of individual pixel elements such as a 3×3 up to a 16×16 array, where each pixel provides a rectangular, flat surface that emits uniform light of varying hue and brightness. Each such pixel comprises one or more light sources, a light diffusion chamber, and a flat light-emitting surface. The pixels are placed adjacent to each other such that the entire tile is capable of being used in a single, substantially seamless, flat, diffuse, illuminated panel.

The tiles interconnect with cables such that any arrangement of tile adjacency is permitted, including non-rectangular panels. The panels are self configuring with respect to the arrangement of the tiles in the panel. Permitted interconnection between tiles has few constraints—every tile in the panel must have some path to every other tile—so that installation may be accomplished with limited training and few installation-related problems. The interconnection cable provides both data and power, so that the entire panel may be driven from a single connection to any tile.

Tiles comprise two components: a base plate that mechanically mounts on a support surface such as a wall, ceiling, floor or shelf, and an illumination plate that electrically and mechanically connects to a single base plate. The base plates have both electrical and mechanical interconnection to adjacent base plates. There is a one-to-one relationship both electrically and mechanically between each base plate and its corresponding illumination plate. When an illumination plate is mounted to and operably connected to a base plate the combination may be referred to as a tile.

An example application is a covering of an entire wall in a multi-purpose space, such as a school multi-purpose room or a convention or event center. Embodiments of this invention could be used with white light or wall patterns above a certain height for use of the room as a lunch room; display of corporate logos or colors for use as a convention space; dynamic display of shapes or images for use as a dance or performance space; low level lighting for use as a lecture space; full wall white light for use in setup, maintenance and cleaning; moving shapes or arrows for use in crowd control; flashing red exit arrows for use in clearing the room in an emergency; visible partitions of light for use in segmenting the room into work or display areas; creative and dynamic light usage to complement a theatrical production such as simulating rooms or street activity; and selected colors, sizes and positions of light for use in product display.

A unique feature of embodiments is that no bezel is around a complete panel is required, permitting a borderless installation fully covering a surface, wall-to-wall.

Of crucial importance in embodiments is that each pixel provides uniform light output of the desired hues (color) and brightnesses across (i) individual pixels, (ii) each tile comprising an array of pixels, and (iii) multiple tiles across a completed panel. Such uniformity is defined primarily at or near the surface, that is, surface brightness or emissivity measured either at the surface or at a typical viewing distance such as 0.5 meters to 2 meters, viewed normal to the plane of the panel. In addition, when the panel is illuminated with consistent color and brightness of the pixels and tiles, there should be no visible or barely visible seams between the pixels or between tiles, including such seams as dark lines, bright lines, or color bleed. In addition, to the extent that any seams are visible, they should appear the same between adjacent pixels within a tile and between adjacent pixels in differing but adjacent tiles, so that the tile boundaries are not visible, even if pixel boundaries are somewhat visible.

A completed modular panel, which is typically constructed in the field, comprises an array of adjacent base plates mounted on a structural support surface and interconnected; a corresponding illumination plate affixed to and electrically connected to each base plate; and a power source and control source attached to one base plate. Each base plate is effectively the same and each illumination plate is effectively the same, permitting simplified field installation of a wide range of panel sizes, shapes, and purposes from a simple inventory of (i) base plates; (ii) illumination plates; (iii) uniform interconnection cables, (iv) uniform interconnection fasteners; (v) one or more power sources and controllers (which may be combined into a single electronic module). Ideally, both the individual base plates and illumination plates may be installed in any of four rotational positions.

A completed panel self-configures, once powered up with a connected controller.

In one exemplary embodiment a base plate comprises:
(a) a rectangular structural frame, typically monolithic of molded plastic, which is adapted to mechanically attach to adjacent base plates on four sides, and adapted to be mounted on a structural support surface;
(b) one or more elements, which may be in, on, or part of the structural frame, to permit attachment of the structural frame to a corresponding illumination plate; such elements may be magnetic;
(c) four electrical interconnection elements, one per side, such as cables or connectors, adapted to electrically connect to adjacent base plates; wherein such electrical interconnection elements support both power and data transmission;
(d) one or more electrical interconnection elements, such as cables or connectors, adapted to electrically connect to the corresponding illumination plate; wherein such electrical interconnection elements support both power and data transmission.

Base plates should be re-usable, lightweight, low-cost, with a low mechanical depth, such as no more than one quarter the width of the tile, and preferably, no more than one-eighth the width of a tile. Base plates should preferably be mountable and removable from a structural support surface, such as a wall, floor, ceiling, partition or shelf, with a single tool, such as a screwdriver. Base plates should each be positionable in at least two, and preferably four, rotations without negative impact on the configuration or performance of a completed panel.

In one exemplary embodiment an illumination plate comprises:
(a) a rectangular structural frame, typically monolithic of molded plastic, which is adapted to contain one or more printed circuit boards (PCB);
(b) one or more elements, which may be in, on, or part of the structural frame, to permit attachment of the illumination plate to a corresponding base plate; such elements may be magnetic;
(c) one or more PCBs comprising light emitting elements such at that the illumination plate comprises a regular array of light emitting elements, where each light emitting element is, or corresponds to, a pixel in an operating tile and operating panel; such light emitting elements may be LEDs or OLEDs supporting a range of hues and brightnesses;
(d) control electronics to drive the light emitting elements with programmable hue and brightness such that the individual pixels may have different hues and brightness;
(e) an array of pixels wherein each pixel comprises a reflector;
(f) a diffusion layer through which light exits the illumination plate; such diffusion layer is preferably monolithic.

Optionally, each pixel may also comprise a baffle, wherein the baffle blocks at least some light from the pixel's light emitting element from directly striking the diffusion layer.

Illumination plates are adapted such that when they are attached to corresponding base plates, and when the base plates are installed adjacently, that the diffusion layers of the illumination plates form a uniform visible surface of the completed panel.

In one embodiment, the communication electronics in each tile (one base plate with a corresponding illumination plate) communicates data with adjacent tile. Each tile also passes power so that a single power source attached at one point to the completed panel powers each tile. The panel controller provides data comprising the desired location of a selected pixel and the desired hue and brightness of that pixel. From the one point of attachment to the panel of the controller this data passes from tile to tile until it reaches the correct final destination tile, which then sets the desired pixel the desired hue and brightness.

Ideally, each illumination plate may be attached and removed from its corresponding base plate without tools. In one embodiment, magnets are used for this purpose. Tiles may be removed by hand with no tools, starting from an edge of the panel, or by the use of conventional glass suction cups: an arbitrary illumination plate may be removed.

The completed panel does not need any bezel. The completed panel may be flush on any number of its sides with an adjoining structural element, such at a wall-to-wall, wall-to-floor, wall-to-ceiling, of shelf-to-wall junction. As an example, a floor or ceiling may be fully covered, without a bezel, with a completed panel. Power and control connections for the panel may be from a single point behind the completed panel. Power and control connections may be each to different tiles within the panel; and may each be to any tile that has at least one available electrical connection.

BRIEF DESCRIPTION OF DRAWINGS

FIG. 11 shows the base plate and illumination plate of an exemplary tile in cross section.

FIGS. 12C and 12D show a top view and side view respectively of two mechanically interconnected exemplary tile base plates.

FIGS. 17A, 17B and 17C show the side view, perspective exploded view, and side exploded view of the base plate and illumination plate assembly.

FIG. 26 shows an exemplary method of uploading and downloading a panel graphic, including compensation for different panel architectures.

FIGS. 27A and 27B show an exemplary embodiment of a panel graphic changing in response to a local sensor.

FIGS. 30A, 30B, 30C and 30D show one embodiment of a kit of elements to construct a panel, including a base plate, illumination plate, "O" clamp and edge plug.

DESCRIPTION OF EMBODIMENTS

Figure 1:
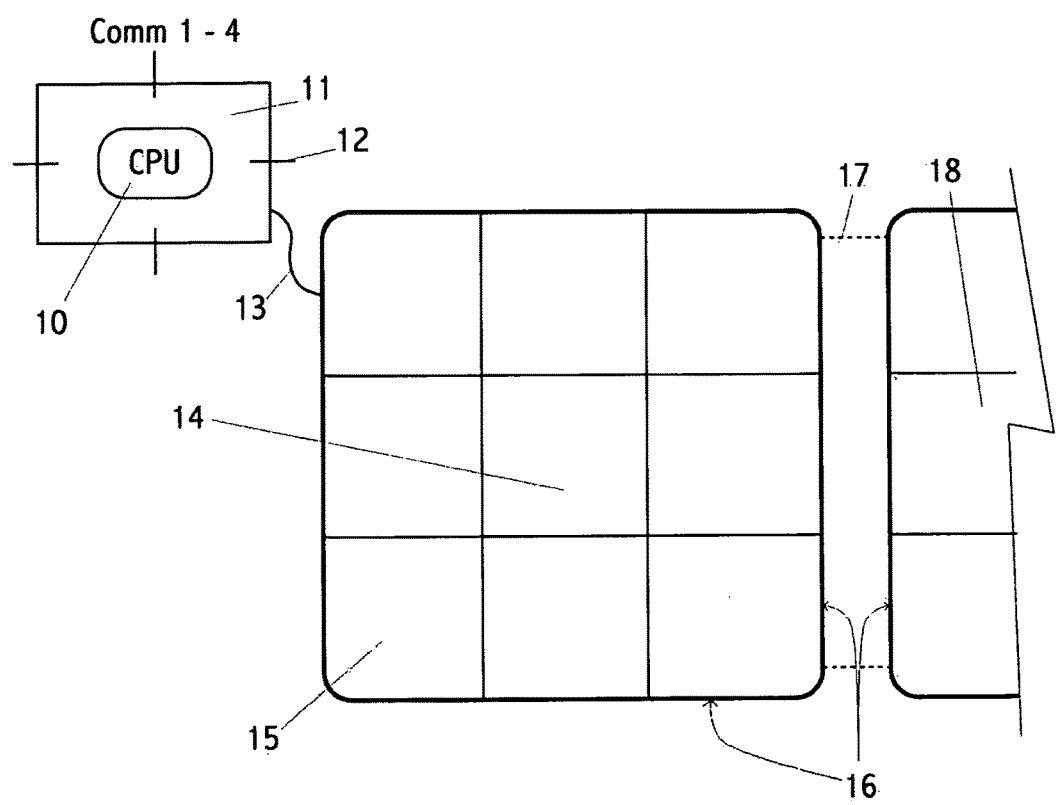
FIG. 1 shows an exemplary tile with nine illumination elements, and a tile controller.

The field of this invention is generally light fixtures, or programmable, variable illuminated displays. More specifically, the field of this invention is modular illuminated displays, where the size and shape of the installed display may be selected after manufacturing.

All descriptions herein refer to specific embodiments, examples and applications; rather than the invention as a whole, unless explicitly so stated.

In one embodiment, illuminated panels are constructed, typically at or near the installation site, from individual, typically identical tiles. Square tiles may be used to create a wide range of rectangular sizes and shapes, such as might cover an entire wall, ceiling, floor, table or shelf. In one embodiment, each tile has two major components: a base plate and an illumination plate. The base plate provides a structural platform and inter-tile electrical connectivity. The illumination plate provides the illumination elements (pixels), a tile processor, and a diffuser, which forms the visual surface of the completed panel.

A particular uniqueness of some embodiments is the ability to easily recreate a wide range of panel sizes and shapes from a few standard components, such as a base plate, an illumination plate, a panel controller, and a mechanical tile connection component. An additional particular uniqueness is the ability to easily re-use these standard panel components in order to implement temporary or changing panel installations. Such temporary installations are ideal for retail, trade shows, conventions, classes, and performances.

We often refer to the combination of one base plate and one illumination plate as a tile.

In some embodiments, this invention has the unique attribute of combining functional lighting, such as might be used to highlight or backlight a product, with a dynamic, programmable display, such as previously might have been a large video screen. For example, this invention might be on the wall behind a wall of shoes, or placed on every shelf, directly underneath a collection of shoes. Thus, this invention is able to accomplish five functions with a single fixture: (i) utility lighting, such as was previously accomplished with traditional overhead incandescent or fluorescent fixtures; (ii) decorative lighting, such as was previously accomplished with table lamps, wall sconces or chandeliers; (iii) commercial purpose lighting, such as used for branding, advertising, or product displays; (iv) entertainment lighting, such as on gaming machines; and (v) informational and emergency signage.

Applications include: general lighting, decorative lighting, gaming (gambling) applications, video games, multi-player and massively multi-player games, social interactions, product and service purchasing, branding, education, user-specific and environment specific advertising, food service, crowd management; and product display.

In some embodiments, this invention has the unique ability to automatically or manually change its appearance in response to product changes. For example, the color of the display might change if a shoe is removed or if a shoe is added. As another example, a display may change automatically depending on the activity level and type of nearby people or wireless devices.

As another example, in one embodiment this invention may be the entire surface of a table in a restaurant. The surface has one pattern and colors when the table is unoccupied, another when diners are seated, and yet other when the food is delivered. Patterns might be unique for each different menu item. Such an application not only entertains diners, but also may be used to encourage additional purchases, such as desert or after-dinner drinks.

A unique embodiment of this invention is the ability to create and reconfigure panel shapes easily. Such ability is critical in dynamic applications such as product displays, trade shows, museums, art exhibits, and others.

We typically refer to a "panel" as a completed arrangement of "tiles." A panel is composed of a plurality of tiles. Tiles are typically rectangular, but may have other shapes, such as hexagonal, diamond, or complex shapes for tesselations. The tiles are arranged touching each other, so as to create a nearly seamless appearance of the panel, where a "seam" is the border or junction between two tiles. A seam is also the border between two pixels.

Panels do not need to be rectangular, or even comprise contiguous tiles.

Each pixel, and thus each tile, and each panel, provides illumination, the color (hue) and brightness of which is programmable and may change dynamically.

Such panels may be used to provide general, that is, "functional," illumination to a room or space. Such a panel may also be programmed to provide a highly decorative fixed or changing display of light. Such decorative design of the panel illumination may be abstract, or it may provide a recognized pattern such as a brand, icon, message or words. The decorative design may be used to respond to, or to enhance, some other object or activity near the panel, such as highlighting products for sale, or responding to dance or communication activity of people in the room. A panel may be used for crowd control or emergencies, such as red moving arrow.

Such panels may be large. For example, a panel may cover an entire table, an entire wall, entire floor, entire ceiling, or entire product display area, such as a self, table, or display case.

Panels may be arranged and programmed to function primarily as a work of art.

Panels may be arranged and programmed to generate a mood, such as relaxing mood in a fine restaurant, or a dynamic mood for a dance floor.

Panels may be used for branding, advertising, or product enhancement.

Panels may provide information or crowd management, such as at airports, concerts, theme parks, or events.

Each tile has within it a regular grid of illumination elements. In one embodiment, these elements are arranged in a six by six square. On one embodiment, each element has the ability to provide light across the entire visible spectrum of color and brightness. In one embodiment elements may also provide infrared or ultraviolet light.

One unique attribute of this invention is the nearly seamless appearance of the panel. Another unique attribute of this invention is the ability for an end user, designer, reseller, or installer to easy create the panel from tiles without the need of special tools or skills.

A unique attribute of this invention is the ability to use a single tile type to create a panel.

A unique attribute of this invention is to use, in one embodiment, a single type and length of electrical cable to interconnect the tiles. In an alternate embodiment, the electrical interconnection cables are integral to each tile.

A unique attribute of this invention is the use of electrical connection options on four edges of the tiles, such as top, left, bottom, and right (as arbitrary labels) so that tiles may be electrically connected to only adjacent tiles, and optionally to all adjacent tiles, or in a logical tree structure or other interconnection arrangements such that all tiles in the panel are interconnected.

A unique feature of this invention in some embodiments is that the multiple electrical connection options mentioned above are effectively equivalent electrically, permitting each tile to be placed in any location within the panel.

A unique feature of this invention in some embodiments is that the multiple electrical connection options mentioned above are effectively equivalent electrically, permitting each tile to be placed in any rotation, subject to the limitations of the tile shape. For example, a square tile may have four possible orientations, while a hexagonal tile may have six possible orientations. The ability to place a tile in any orientation has the advantage that panel assembly is simple and fast.

A unique feature of one embodiment of this invention is that each tile is comprised of two key components: a base plate and an illumination plate. A typical installation scenario is as follows: The base plates are mechanically interconnected with adjacent base plates to form a panel base. The base plates in the panel base are also electrically interconnected to adjacent base plates. This panel base is attached to a panel support surface, such as a wall, ceiling, table, or shelf. Then, the illumination plates are attached to the base plates. There is a one-to-one relationship between each base plate and each illumination plate. The combination of one base plate and one illumination plate forms one tile.

The illumination plates form a nearly seamless final panel appearance. Illumination plates typically include a diffuser, which forms the visual front of an assembled panel.

Power and a panel controller are typically connected to an arbitrary, but convenient single tile, or each to different single tiles. This power and control connections power and send commands to all of the tiles in the panel, respectively.

Other embodiments create variations of the above features and scenarios.

A unique feature of this invention in one embodiment is that illumination plates may be replaced anywhere in the panel without dismounting or disassembling the entire panel. Typically, the only tile affected is the tile being serviced.

A similar unique feature is that a base plate may be also be replaced anywhere in the panel without dismounting or disassembling the entire panel. Typically, the only tile affected is the tile being serviced. Even after the base plates are mounted on a support surface, a base plate may be removed, including its electrical and mechanical connections to adjacent tiles, and replaced.

Each tile provides illumination, the color (hue) of which is programmable and may change dynamically.

In one embodiment the electrical connection options mentioned above are comprised of two male and two female connectors arranged such that a male and female connector are on opposite edges. In this way, each tile electrically mates to its adjacent tile with a matching pair of male-female connectors.

A unique feature of this invention is that each tile comprises a processor that programmatically and electrically controls the illumination elements within that tile.

In one embodiment, the processors in the tiles communicate with other tiles via the above-described electrical connections. In one embodiment, commands to all processors enter the panel at a single tile, and these commands are forwarded appropriately out the correct communication interface such that each command is directed to the appropriate tile, using the above-described electrical connections.

In one embodiment, the same electrical connections mentioned above comprise both communication wires and power wires. In one embodiment, all tiles are powered via these above-mentioned electrical connections. This embodiment provides the unique benefit that communications and power are coupled via the same cable, simplifying assembly of the panel from the tiles. In one embodiment, both power and commands enter the panel through a single electrical connection. In one embodiment, this single electrical connection may be to any tile in the panel. This embodiment provides the unique benefit that the connection point to the panel may be provided where most convenient or most accessible, simplifying and lowering the cost of installation.

In one embodiment the panel is "self-configuring," in that the logic in the panel determines the arrangement of interconnected elements automatically. In one embodiment this self-determined configuration is provided to the remote controller. This capability provides the unique benefit that the simple act of assembling a panel constitutes the design of the panel sufficient to enable programming software to know the configuration of the panel and to adapt, display, translate, program, communicate or respond appropriately. For example, a graphical user interface (GUI) on a remote panel controller is able to show the exact configuration of a panel with no advance data entry of the panel's configuration.

This "self-configuring" ability is critical in many applications, such as product displays, trade shows, museums, and other applications with a regular need for different panel configurations. An end user or minimally trained installer, such as an electrician, is able to disassemble, modify, and create new panel configurations, which are immediately usable by the end customer.

Since panels are constructed from a single tile type, and no bezel is required, all tiles in one panel may be reused in any other panel.

Since power and control input may come into a panel at any tile, changes and installations require a minimum amount of power and cable changes in walls or other supporting structures.

In one embodiment the electrical connections mentioned above comprise cables that are either recessed into the edge of the tile or extend from the edge of the tile sufficient to enable connection to an adjacent tile. The embodiment provides the unique benefit that the same tiles may be used internally in the panel and also on the edge of the panel without having visible wires or connectors visible on the completed panel.

Various embodiments provide the unique benefit for the panel to be implemented without any bezel. That is, no bezel, separate from the tiles, is necessary either to provide a finished appearance of the panel or to structurally support any part of the panel.

An embodiment of this invention uses multiple power pins on the above-mentioned electrical connections. The embodiment has the unique benefit of thinner tiles, reducing weight, size and cost, while providing for a more attractive and less bulky finished panel.

An embodiment of this invention uses sufficiently large and multiple pins and wire for power connections within the above mentioned electrical connections to permit power to enter a physically large panel at a single point, simplifying installation and reducing installation cost.

An embodiment of this invention uses novel internal reflector shape in between the illumination elements in order to maximize the amount of light from the illumination elements that exits the panel while preserving a uniform illumination over the area of the front of the panel illuminated by that illumination element.

An embodiment of this invention uses one or more internal lenses between the illumination elements and the visible front of the panel in order to maximize the amount of light from the illumination elements that exits the panel while preserving a uniform illumination over the area of the front of the panel illuminated by that illumination element. One embodiment uses a lens comprising a single element per tile. In one embodiment this single lens comprises multiple light refracting surfaces. In one embodiment this single lens comprises both light refracting surfaces and surfaces that provide total internal reflection. A Fresnel lens is used in one embodiment.

An embodiment of this invention uses mechanical barriers in between the illumination elements preserving a uniform illumination over the area of the front of the panel illuminated by that illumination element, while at the same time minimizing any visible banding in the tile or panel due to the distinct illumination elements. Such undesirable banding may be bright bands, dark bands, or bands of an undesirable color due to mixing of different colors from adjacent illumination elements.

An embodiment uses a baffle as both a first reflector and to block light from the light emitting element(s) from directly reaching the diffuser, thus creating a hot spot. This embodiment uses two diffuse reflectors, thus having neither refractive optics nor specular reflectors, in what may be called a "folded" optical path.

One embodiment uses a light diffuser at the front of the panel. In one embodiment this light diffuser extends to the edges of the panel.

FIG. 1 shows an exemplary tile 14 comprised of nine representative illumination elements 15. The tile shown has visibly rounded corners, although a preferred embodiment is such rounding no greater than necessary to make sharp, square corners safe for handling. The shown tile 14 is square, although tiles may be rectangular, or indeed any tesselatable shape. Three sample tiles edges are shown 16. Tiles are generally placed adjacently as shown by dotted lines 17 to create a panel. Here, tile 14 is being placed adjacent to tile 18.

Connected to the tile 14 is a tile controller 11 comprising a CPU 10 and at least one communication port 12. Four communication ports 12 are shown in the Figure. FIG. 1 shows the tile processor 11 connected to the tile 14 via wiring 13. In preferred embodiments, the tile processor 11 is located within the tile 14; it is shown separately in the Figure for clarity.

FIG. 1 shows a square tile 14 with a 3×3 array of illumination elements 15. An alternative embodiment uses a 6×6 array of illumination elements. A suitable range of element size is 3×3 to 256×256. Another suitable range is 4×4 to 100×100. Another suitable range is 5×5 to 36×36. Yet another suitable range is 6×6 to 12×12.

Figure 2:
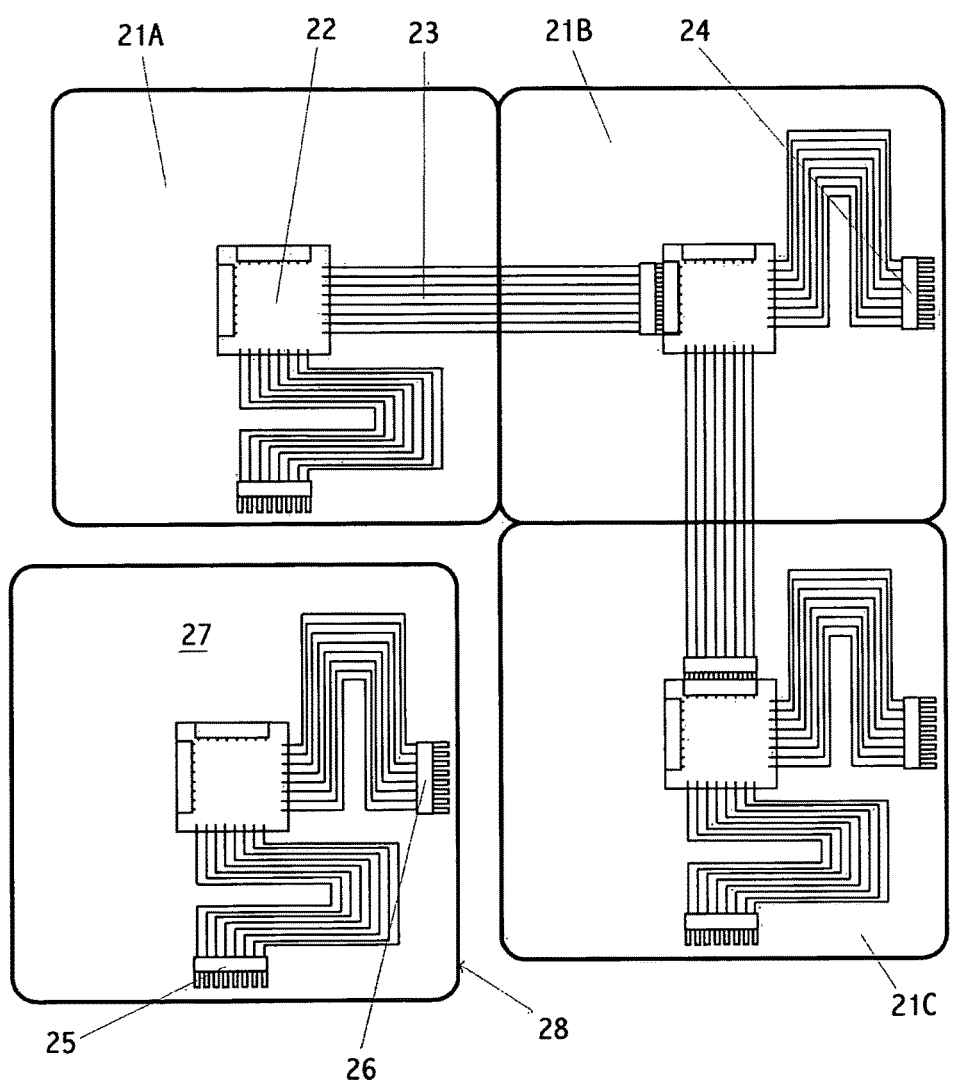
FIG. 2 shows three connected, adjacent tiles, and a fourth non-connected tile.

FIG. 2 shows four tiles, 21A, 21B, 21C and 27. Tiles 21A, 21B and 21C are shown placed mechanically adjacent and electrically interconnected. Tile 27 is not yet placed adjacent, or yet connected.

FIG. 2 shows the basic way that a large panel is constructed from a plurality of identical tiles. One embodiment with square tiles permits the tiles to be placed in any of four orientations during panel assembly. Another embodiment permits one of two orientations. This is a unique benefit of one embodiment of this invention. Yet another embodiment requires all tiles in one panel to have the same orientation. Panels may be constructed in nearly an unlimited number of architectures, where here the term panel architecture refers to the number of tiles, the aspect ratio of the completed panel, the number of tiles rows and tile columns, and if the tiles are placed aligned on the natural tile grid. The creation, during assembly, of such a wide range of panel architectures is a unique benefit of this invention. This attribute permits the tiles of this invention to be treated very much like any other building material in that they are used "as required" to implement a particular design during construction, using minimally skilled labor. Such tiles, being all of the same, are readily manufactured, sold, distributed and stocked efficiently and economically effectively. The tiles of this invention may also readily be re-used, permitting panels to be constructed economically for temporary as well as permanent purposes, such trade shows, museum exhibits, parties, and store product displays. Tiles may be rented. This is a unique benefit of this invention.

Panel design and assembly may be accomplished by an architect, graphic designer, value-added-reseller (VAR), manufacturer's representative, trade workers, or an end-user, for example.

Continuing with FIG. 2, we see in the shown embodiment, a processor 22 in each tile. The processor 22 in tile 21A is shown with two interconnecting cables, one disconnected and one, 23, connected to tile 21B. In this embodiment, each tile comprises two male connectors, here shown on each tiles as to the right and to the bottom of each processor, such as 26, 25 and 24; and two female connectors, here shown to the top and left of each processor. Note that the particular use of specific cables and connectors in this Figure is schematic; many possible embodiments are available. 24 shows a non-connected male connector at the end of a cable. Cable 24 may end up at the edge of a completed panel and never be connected. As shown in this Figure, cable and connector 24 remain internal within the perimeter of tile 21B, thus permitting a clean final edge to the completed panel. Cables used to interconnect tiles, such as cable 23, may be extended in this embodiment beyond the perimeter of the tile.

As shown in the embodiment in FIG. 2, cables are flexible to permit their position as either within the tile perimeter (not connected) or partially extended past the tile perimeter (connected). Cables 24 and 26 are shown as internal, while cable 23 is shown extended and connected. 28 shows one edge of tile 27, which may be placed adjacent to tile 21C, and then cable 26 would be electrically connected to the left side of the processor in tile 21C.

When we refer to tiles being "adjacent," we refer variously or in aggregate to mechanical placement with edges touching; mechanical interconnection, such as using "O" clamps, as will be explained further, below; electrical interconnection, such as shown in one embodiment in FIG. 2; and visual adjacency, wherein the illumination as seen at an operable distance from a working panel by a person is nearly seamless between the illumination elements (pixels) of one tile and the adjacent illumination element in an adjacent tile. Such visual adjacency and seamlessness will be explained further, below.

Figure 3:
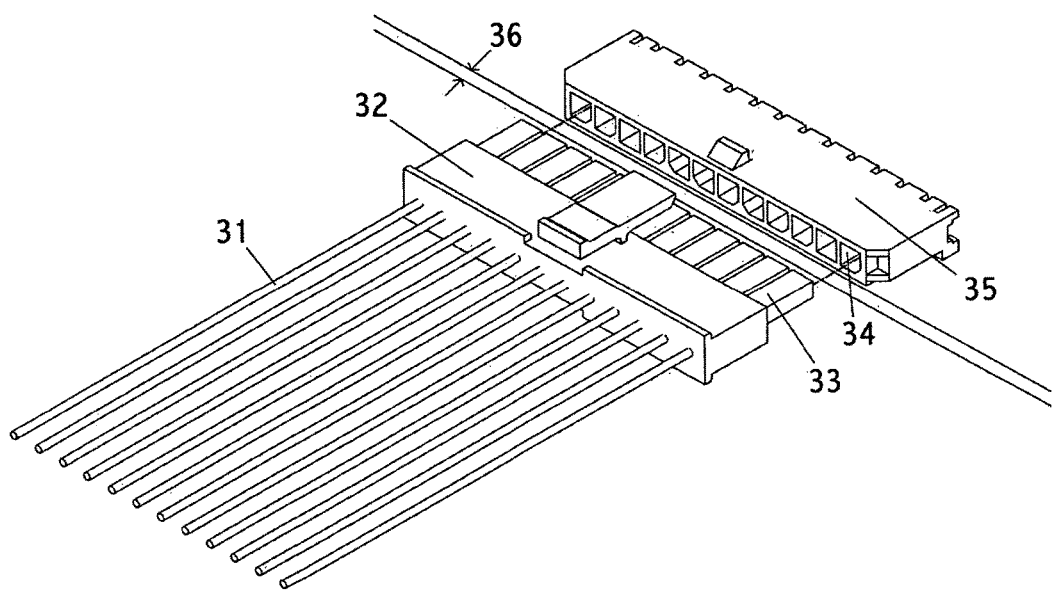
FIG. 3 shows an exemplary tile connector detail.

FIG. 3 shows one embodiment of a connector pair. The male plug, 32, is on the end of a flexible cable 31 in a first tile. The term cable includes conductive traces on a flexible circuit board, and other physical forms of providing communication channels. When connected, plug 32 enters female receptacle 35, with pins 33, which in this embodiment is mounted rigidly on an adjacent, second tile. The gap 36 is shown representing the practical gap between two adjacent tiles in order to properly tolerate manufacturing tolerances while permitting an effective, reliable connection between a male pin such as 33 and a mating female pin such as 34 in male connector 32 and female connector 35, respectively. This permits an effective visual adjacency and seamlessness between adjacent tiles.

Figure 4:
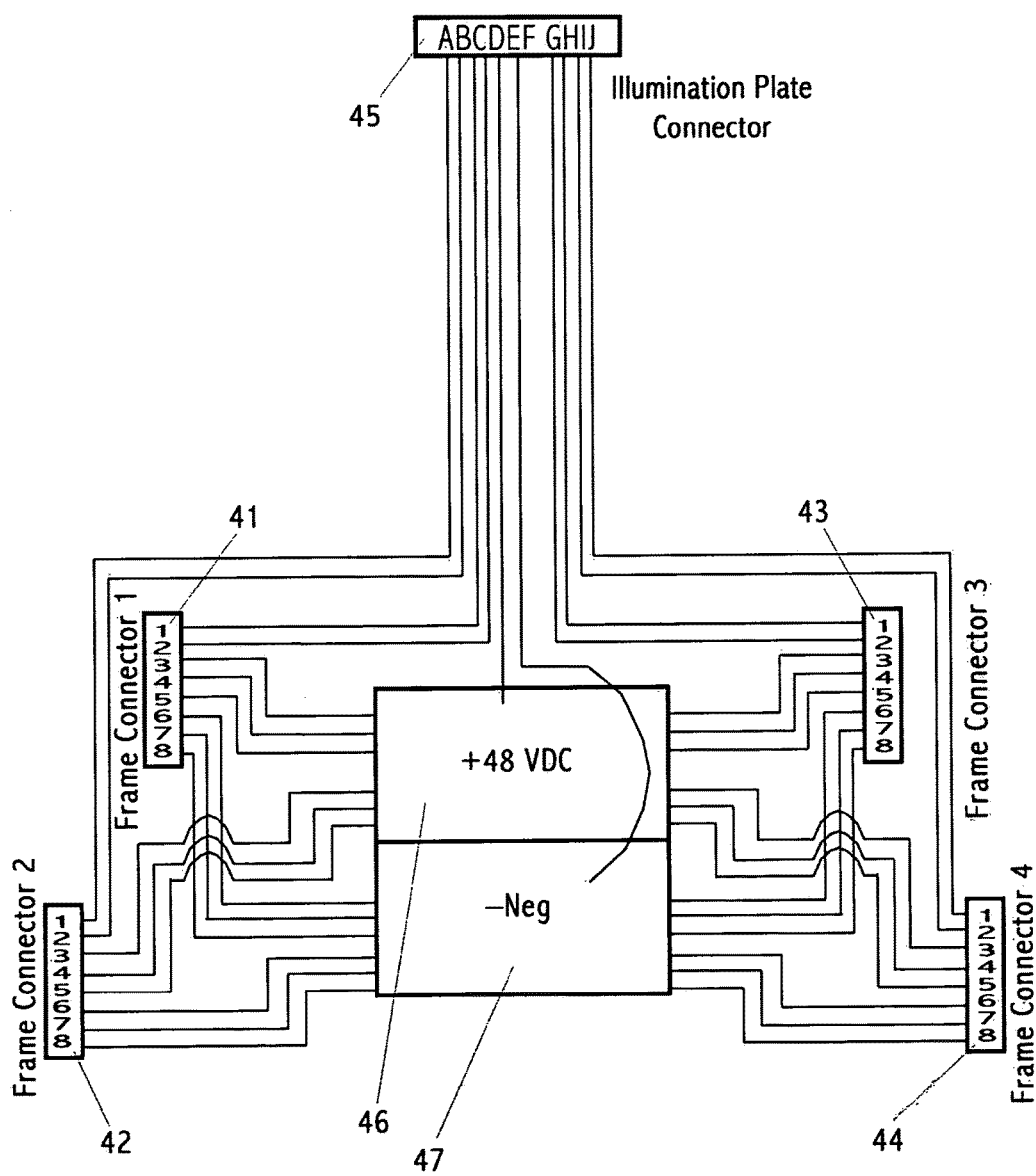
FIG. 4 shows an exemplary wiring diagram for one tile.

FIG. 4 shows one embodiment of a circuit diagram. In this embodiment, this wiring diagram represents a wiring harness that effectively implements the necessary electrical connections for four communication ports, power distribution with a tile, and connection between the ports and a processor. In this embodiment, this wiring harness is located in the base plate, and is interconnected as the base plates are assembled into a panel. The illumination plates are typically attached to the base plates after the base plates are mechanically and electrically connected to each other. The process of attaching an illumination plate to a base plate comprises connecting the Illumination Plate Connector, 45 in FIG. 4, to the illumination plate. FIG. 4 shows four communication port connectors, identified as Frame Connector 1 through Frame Connector 4, 41 through 44, respectively. In some embodiments these four connectors are the same gender, permitting tiles to be installed in any of four orientations. In some embodiment, two connectors (such as arbitrarily identified as right and bottom) are male, while the other two connectors, left and top, are female. In this embodiment, all tiles in one panel must have the same orientation. Alternatively, gender-free connectors or hermaphroditic connectors may be used.

FIG. 4 also shows two power distribution elements, 46 and 47 for the positive and negative voltages respectively. Such distribution elements may be each a copper pad on a circuit board, a conductive lug or connected lugs, connected wires (such as soldered, crimped or via use of a wire nut), or other electrical connection means. In this embodiment, the two voltages are 48 VDC and Ground, or "Neg." A wide range of other voltages is possible, including AC.

FIG. 4 shows, in this embodiment, the use of three pins in each Frame Connector for each power line. Here, looking at Frame Connector 1, 41, pins 2, 3 and 4 are +48 VDC; pins 6, 7 and 8 are Neg. A unique benefit of this arrangement is that the base plates may be thinner, and thus the completed tile thinner, and thus the completed panel thinner, for a given amount of current or power passed between tiles via these connectors due to the smaller size of the connector pins and associated wire gauge, than would be required using a single pin for each power line, for the same amount of total maximum tile current. Thinner, and thus lighter, and also lower cost, is a unique benefit of this embodiment.

FIG. 4 shows a pair of wire on each of the Frame Connectors comprising a bi-directional, two-wire communication path between the tile processor and the process on an adjacent tile. For example, pins 1 and 2 on Frame Connector 1, 41. The Illumination Plate Connector 45 comprises all four bi-direction communication ports, plus two power pins.

The use of a thinner connector and a thinner tile also permits more curvature when implementing curved or faceted panel implementations, as compared to an implementation using a single power pin for each power line, for the same amount of total maximum current passed between tiles. This is another unique benefit.

Figure 5A:
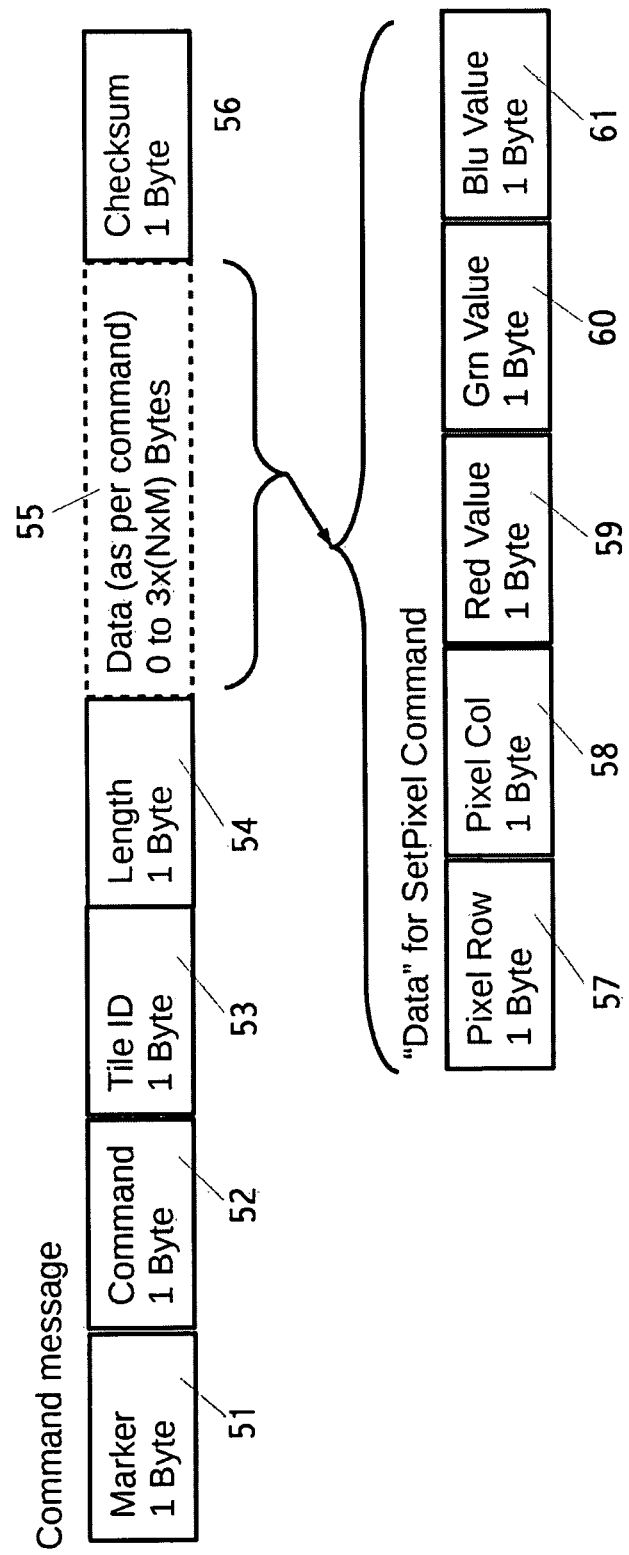
FIGS. 5A and 5B show exemplary command structures used for inter-tile communication.

FIG. 5A shows an embodiment of one command structure. Fields 51 through 56 make up one exemplary command. Fields 57 through 61 are exemplary data fields for a particular command, here shown as a "SetPixel" command. 57 and 58 identify the pixel row and column position, respectively. The Marker, 51, is used to identify the start of the message. The Command field, 52, comprises the specific command in this message. The Tile ID, 53, identifies a specific tile that may be either the target or the source of the message, depending on the specific command. The Length, 54, indicates the length of the message in bytes. Messages comprising different commands are different lengths. The Data field, 55, varies in content and length dependent on the command. The maximum length of the Data field is (3×M× N) bytes, where M and N are the number of rows and columns, respectively, of addressable illumination elements (pixels) within the tile. The Checksum, 56, is used to assure that the message is received without error.

FIG. 5A shows Data detail for an exemplary command, "SetPixel." This data comprises the fields 57 through 61, repeated as necessary to comprise the data for all target pixels within one tile. The Pixel Row, 57, identifies the pixel row within a tile for a specific pixel. The Pixel Col, 58, identifies the specific column within a tile for the specific pixel. The Red, Grn, and Blu Values, 59, 60, and 61 respectively identify a brightness for red, green and blue emitters respectively for the identified pixel, in a range of 0 (off) to 255 (maximum brightness). Multiple pixel data may be sent within one message as desired. The combination of Red, Grn and Blu Values sets both the brightness and hue for a selected pixel.

Figure 5B:
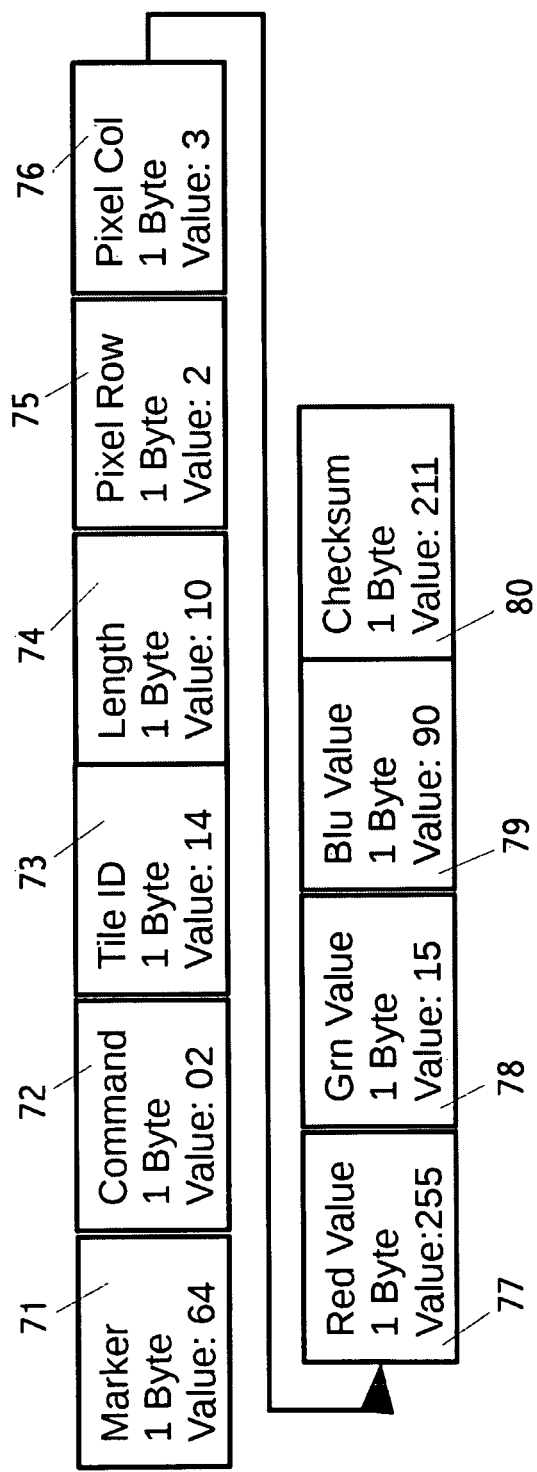

FIG. 5B shows an embodiment of one command structure. Fields 71 through 80 are shown with a field name, field size, and typical value. The Marker, 71, is used to identify the start of the message. The Command, 72, indicates which of multiple commands is in this message. The Tile ID, 73, identifies a specific tile that may be either the target or the source of the message, depending on the specific command. The Length, 74, indicates the length of the message in bytes. The Pixel Row, 75, identifies the pixel row within a tile for a specific pixel. The Pixel Col, 76, identifies the specific column within a tile for the specific pixel. The Red, Grn, and Blu Values, 77, 78, and 79 respectively identify a brightness for red, green and blue emitters respectively for the identified pixel, in a range of 0 (off) to 255 (maximum brightness). The Checksum, 80, is used to assure that the message is received without error.

Figure 6:
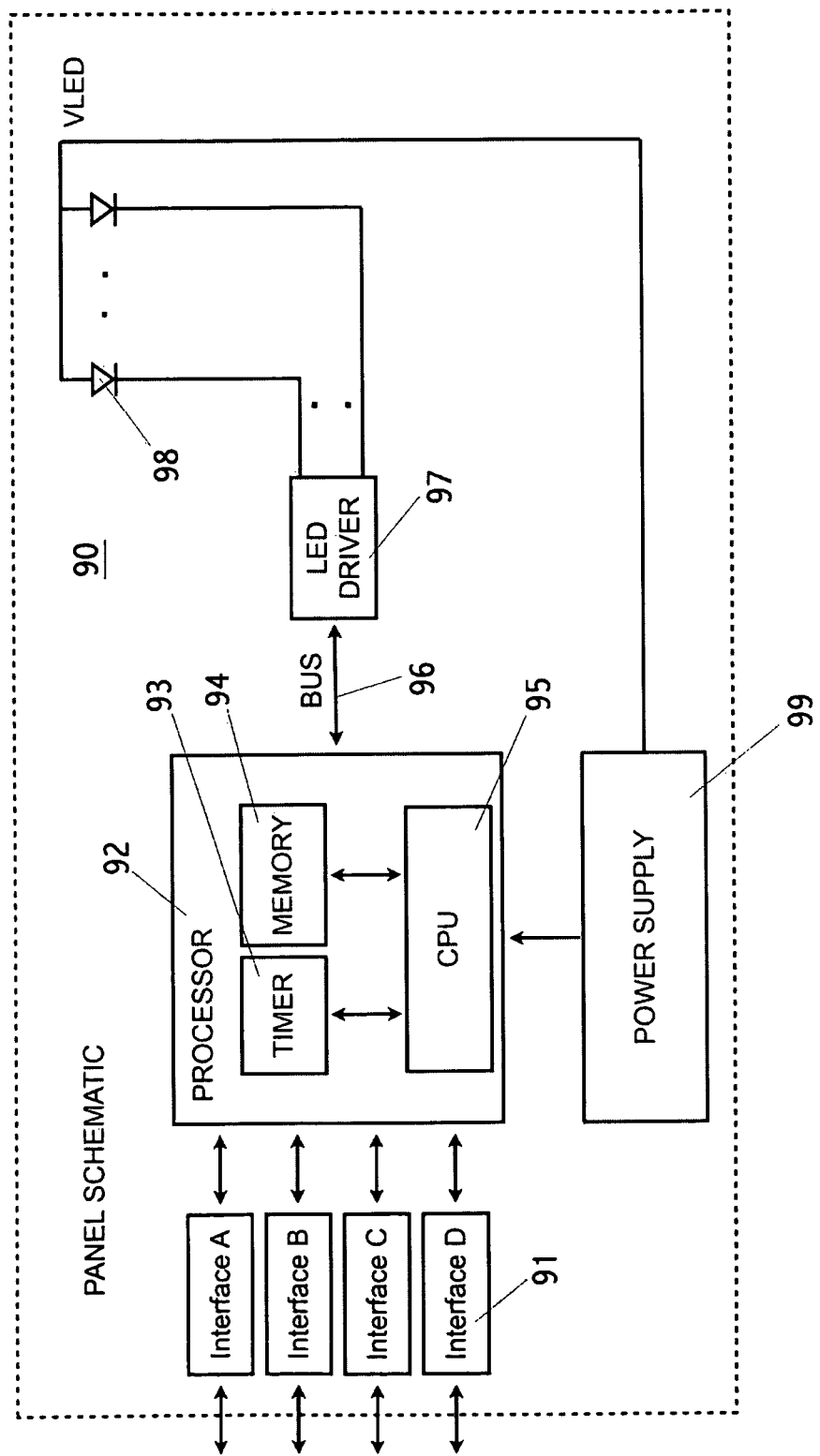
FIG. 6 shows an exemplary block diagram of a processor, communication ports, and illumination elements for one tile.

FIG. 6 shows a block diagram of one embodiment of the electronics for one illumination plate. In a typical embodiment, the base plate comprises a wiring module and the illumination plate comprises the electronics of this Figure. The processor 92 may be a single IC. The four communication interfaces, 91, may be simply cables. The processor 92 comprises a timer, 93, local memory, 94, which further comprises non-volatile memory for software or firmware, and constants related to a specific tile, and working memory to hold data structures, variables and similar working memory for a program. These sub-memory components are not shown in this Figure. The processor 92 also comprises at least one CPU, 95. The timer, 93, may be implemented in hardware, in software, in a combination of hardware and software or provided via timing messages received from an external source.

The illumination plate electronics shown in FIG. 6 also comprise the illumination elements, here shown as VLEDs, 98, driven by LED drivers, 97, via a bus 96 under control of the processor 92. At least one power supply 99 powers the processor 92 and the illumination elements 98. In some embodiments a separate power supply 99 may not be necessary, as the power entering these electronics from the base plate, such as shown in FIG. 4, may be appropriate as is. In some embodiments these electronics may be split among multiple tile components, such as partially on the base plate and partially on the illumination plate, or even as part of an additional tile component. In one embodiment, there are 36 pixels arranged in a 6×6 square grid, where each pixel comprises a red, green and blue LED, each driven separately by the LED drivers under the control of the processor. Alternative illumination elements include OLEDs and LCD elements. Also E-ink may be used.

Figure 7A:
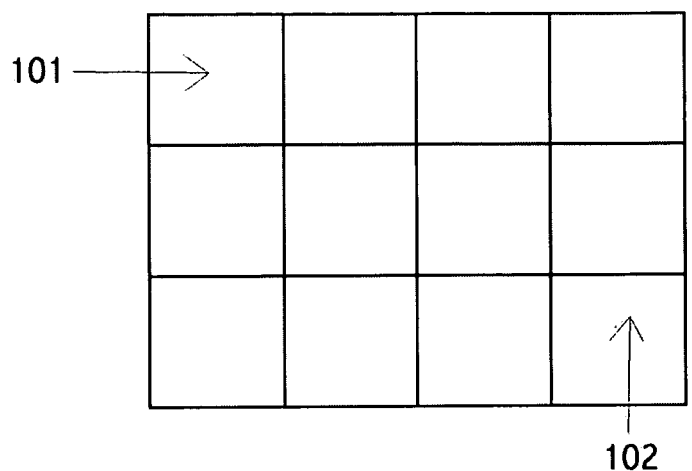
FIGS. 7A and 7B show an exemplary panel and inter-tile wiring.

FIG. 7A shows an exemplary panel constructed of tiles. Here, a rectangular panel of three rows and four columns. 101 shows one row. 102 shows one column. Panels may be considerably larger than this example. They do not need to be rectangular, nor have the tiles aligned on the natural tile grid, nor have the tiles touching each other, nor have the tiles at the same angle.

Figure 7B:
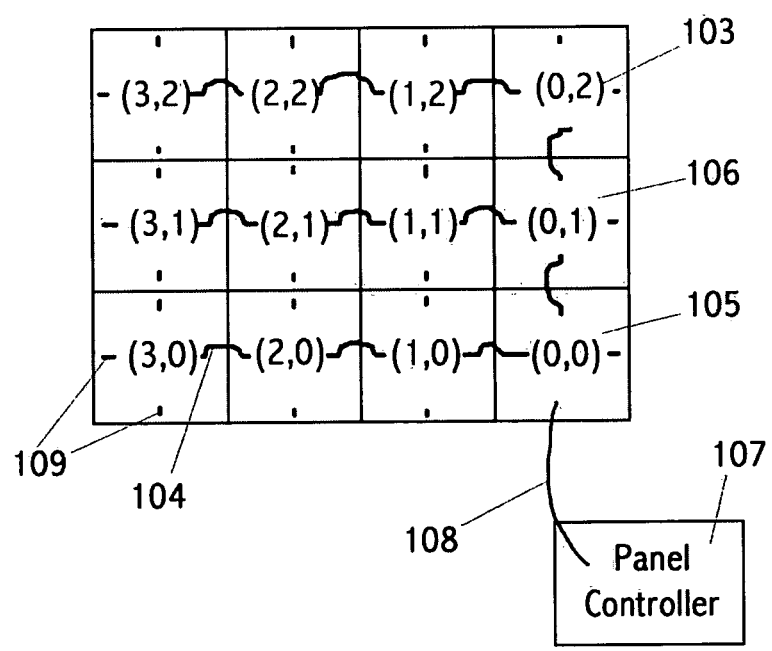

FIG. 7B shows the same exemplary panel as FIG. 7A, now wired in a logical "tree" with the Panel Controller 107 connected to the root tile, 105, via able 108. We see in this figure that each tile is labeled with a (column, row) address, such as shown in 103. Here, the root tile, 105, is identified as column=0, row=0, although numbering could just as well start with one. Note that here, rows count up from the bottom, and columns increment left to right. This is done in this Figure to emphasize that the ordering of such numbering is arbitrary, with rotations and reflections just as effective. Cables, discussed below, connect all of the tiles in a panel in a logical tree. An exemplary cable is shown 104. Here each tile has four available communication ports for such wiring. 109 shows two unused communication ports on the tile, (3,0). The root tile in the tree, 105, is connected to the Panel Controller, 107. In other embodiments the Panel Controller, 107, does not need to connect to the tree root tile. Observe that for tile 106, three communication ports are used. Upstream ports are towards the tree root. Downstream ports are away from the tree root. Connection 104 connects tile (3,0) upstream port to tile (2,0) downstream port. This logical network wiring permits, in one embodiment, auto-configuration of the panel. The Panel Controller 107 may be connected to the panel with a cable, 108. Alternatively, the Panel Controller may be integrated with the panel, so that an external cable 108 is not necessary.

Such a logical tree in wiring tiles is not necessary to construct tile addresses automatically, and perform auto-configuration. Tiles may be fully connected in a mesh, as shown below in FIG. 31B. A different algorithm is then used for tile address assignment. In one embodiment tiles may be interconnect in any arrangement with the only requirement that every tile have some connection path to very other tile.

In one embodiment a tile sensor is used to determine the orientation of the tile. For example, two tilt switches may identify each of four orientations, for a vertical panel. Such tile orientation may be detected by other means. For example, a camera may view the completed panel, then determine tile locations and tile orientation by observing a pattern within the panel and a pattern within a tile. The patterns could be predetermined, or driven by an app associated with the viewing camera.

Algorithms to create a logical network from a wired mesh are well known, often called "spanning tree" algorithms.

Figure 8:
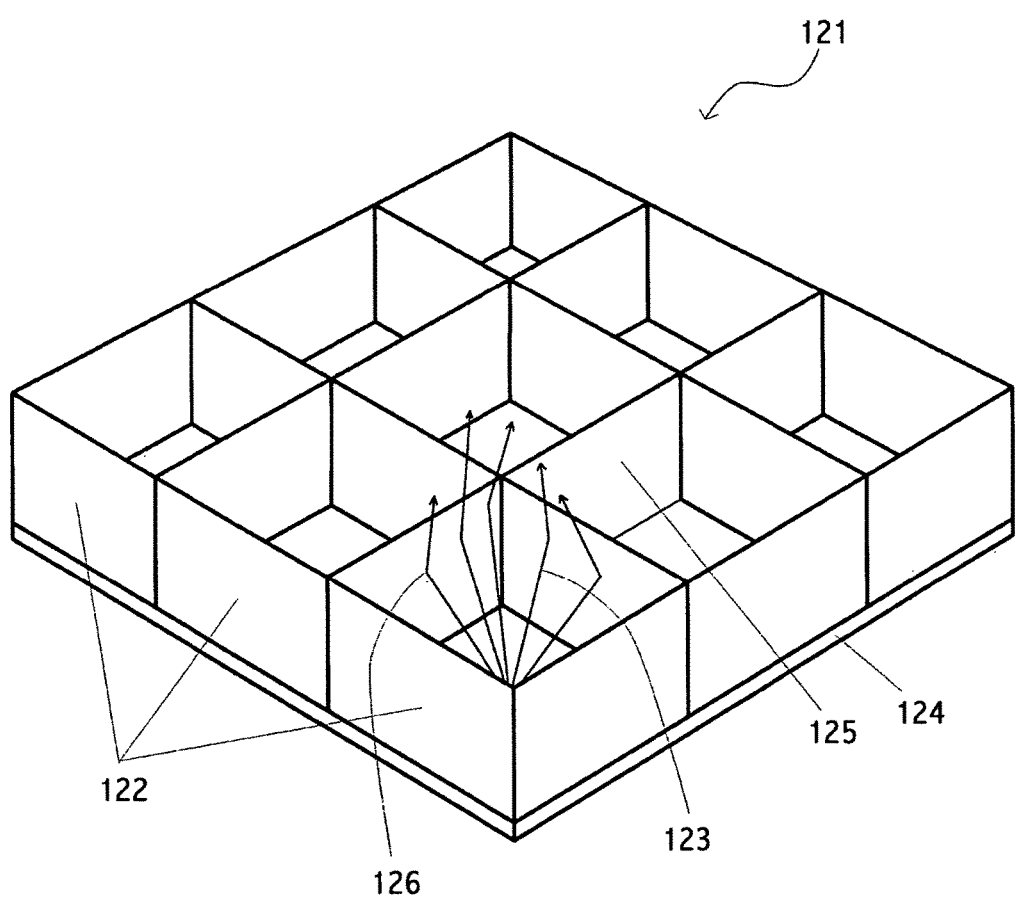
FIG. 8 shows an exemplary tile with the diffusion screen removed showing internal reflectors between illumination elements.

FIG. 8 shows one embodiment of a tile 124 with the diffusion screen removed, 121. This Figure shows a 3×3 arrangement of illumination elements, with light reflectors 125 between each illumination element. A side of the tile, or rib, which may also comprise the sides of the edge reflectors on that tile side, is shown as 122. 123 shows a number of light rays emanating from an illumination element. These light rays 123 may be one color or they may be from more than one emitter, such as from a red, green, and blue LED within the illumination element. 126 shows the point at which one sample light ray is reflecting off a reflector. A purpose of the reflectors is to increase the luminous efficiency of the tile by placing more light from the illumination elements onto the diffuser (not shown). The arrows are the ends of the light rays 123 indicate light rays that hit the diffuser that would not hit the diffuser if the reflectors 125 were light absorbing. Many of these rays would overlap with rays from other illumination elements if the reflectors 125 were missing. The reflectors may function as, or be integrated with, ribs, discussed below. One or more reflectors may be separate elements from the ribs. The reflectors shown in this Figure are schematic only. Their actual shape and configuration may vary significantly from this Figure.

Figure 9:
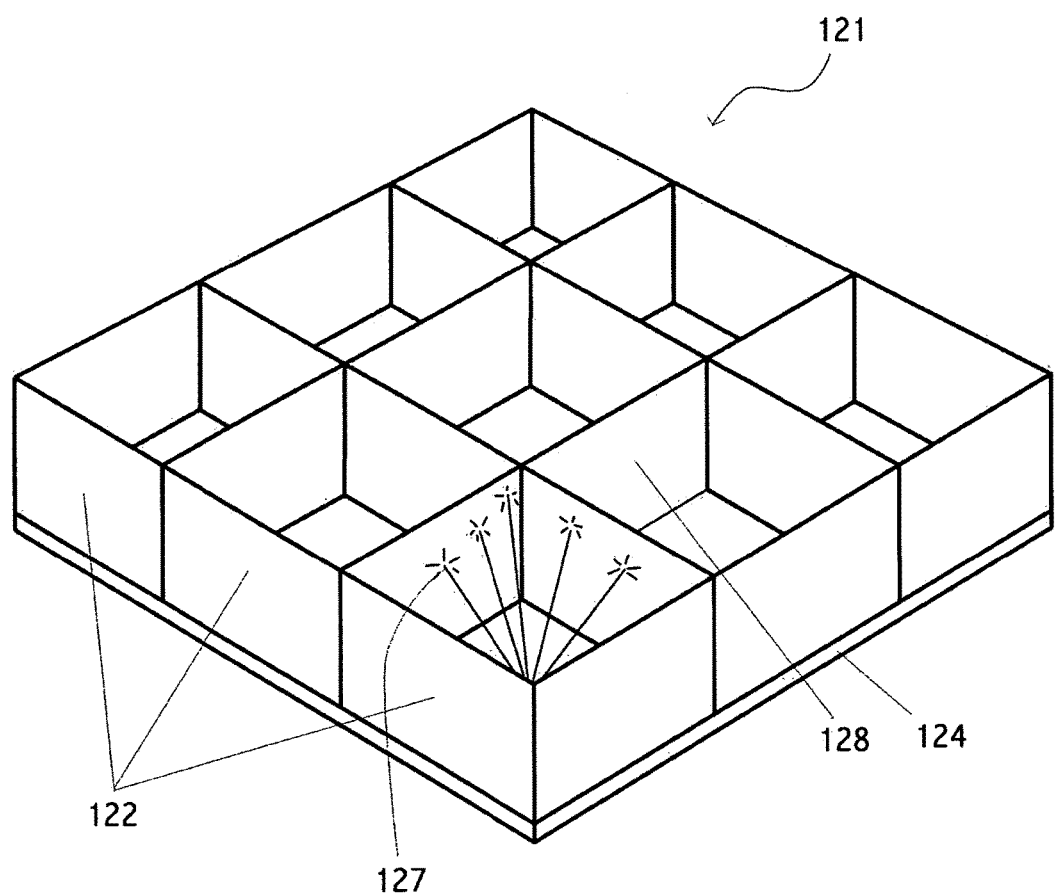
FIG. 9 shows an exemplary tile with the diffusion screen removed showing internal light barriers between illumination elements

FIG. 9 shows one embodiment of a tile 124 with the diffusion screen removed, 121. This Figure shows a 3×3 arrangement of illumination elements, with ribs 128 between each illumination element. A side of the tile, which may also comprise the sides of the edge ribs on that tile side, is shown as 122. 127 shows a number of light rays emanating from an illumination element, then being blocked by the ribs 128. These light rays 127 may be one color or they may be from more than one emitter, such as from a red, green, and blue LED within the illumination element. A purpose of the ribs is to avoid overlap of light from one illumination element (pixel) for overlapping with light from another illumination element. This possible, undesirable, overlapping is discussed in more detail, below. The ribs may function as, or be integrated with, reflectors, discussed above. Note that a reflector may also function to prevent light from one reflector from overlapping at the diffuser with light from a different illumination element. The ribs shown in this Figure are schematic only. Their actual shape and configuration may vary significantly from this Figure. However, a preferred shape of pixels at the diffuser, as seen by a normal viewer of an operating panel, is square.

Figure 10A:
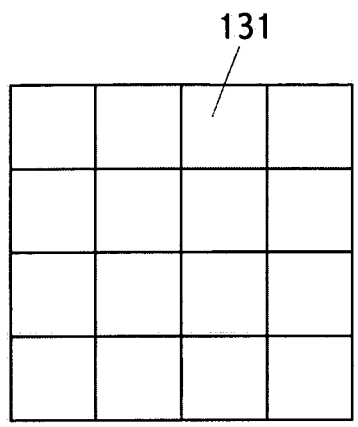
FIGS. 10A, 10B, 10C and 10D show an exemplary tile; uniform illumination from each illumination element; the visual appearance of uniform illumination from a tile; and various inter-illumination element visual banding effects, respectively.
Figure 10B:
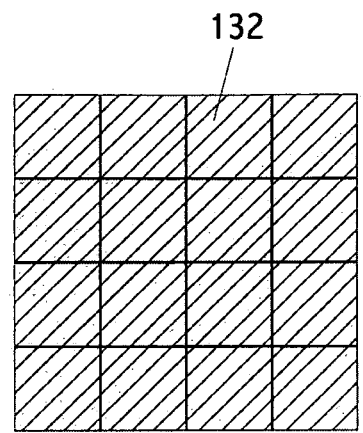
Figure 10C:
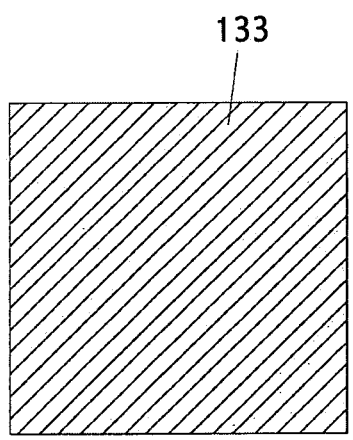

FIGS. 10A, 10B, 10C and 10D illustrate the concept of desired even illumination versus undesired "banding." FIG. 10A shows a arrangement of illumination elements for illustrative purpose in these four Figures, here 131, a 4×4 array. FIG. 10B shows an illustration of ideal uniform illumination as uniform diagonal lines from the 16 illumination elements, 132. As viewed by a typical viewer of an operating panel, the vertical and horizontal lines in FIG. 10B would not be visible, but are in this Figure to show that the source of the uniform illumination 132 is actually provided by 16 different elements. FIG. 10C shows how the tile would ideally be seen, 133, by a viewer of an operating panel. Note also that for uniform illumination as shown in these Figures, the tile must have first received a command to turn on the pixels to all the same hue and same brightness.

Figure 10D:
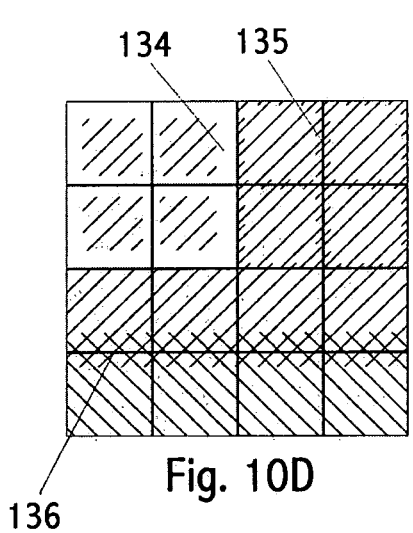

FIG. 10D shows three different undesirable "banding" effects due to less than ideal implementation. 134 shows how the light from four upper left pixels does not reach uniformly to the all edges of the pixels, leaving one or more areas at the edges of the pixels that are not as bright as the center. 135 shows how light from two pixels set to the same hue and brightness as two adjacent pixels overlap to create a vertical band, 135, of brighter light at the pixel boundaries. 135 also shows increased brightness at the edges of the four pixels, perhaps due to poor reflector design or construction. 136 shows how a row of uniformly set pixels to a first hue, above the bottom row of uniformly set pixels set to second hue, overlap to form a horizontal band 136 of a third hue between the two rows.

A key purpose of the design, shape, materials, and locations of reflectors, baffles, ribs, lenses, diffusion layers and other optical elements between the illumination devices and the diffuser is to reduce undesirable banding such as described above.

FIG. 11 shows a side view of one embodiment of an illumination plate 141 and a base plate 143. In a typical panel assembly the base plates (one shown as 143) are mounted on a supporting structure 144 with fasteners 142. Then the illumination plate 141 is secured to the base plate, as will be discussed in more detail below.

The support structure 144 may be vertical, horizontal, or angled. It is generally planer, however may have a curve or curves in one plane. Examples of support surfaces include walls, floors, ceilings, shelves, tables, and display structures.

Figure 12A:
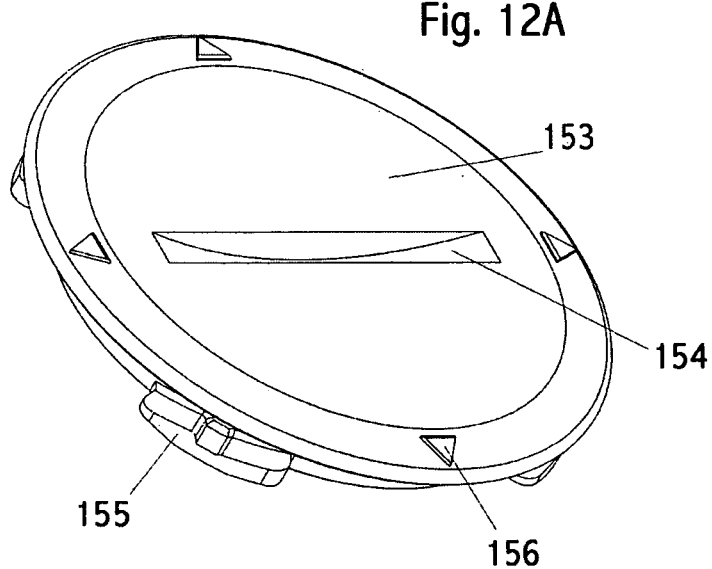
FIGS. 12A and 12B show views of an exemplary "O" clamp used as adjoining fasteners in the mechanical interconnection of tiles.
Figure 12B:
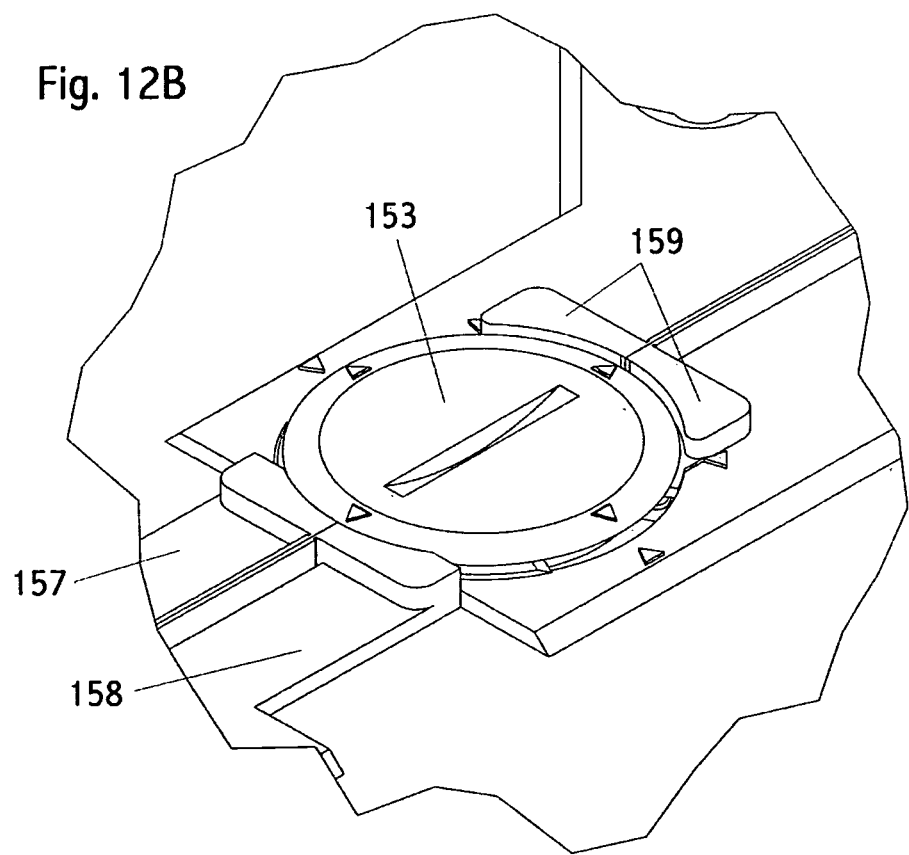

FIGS. 12A and 12B show two views of one embodiment of a component of some embodiments of this invention that mechanically connect adjacent tiles, here referred to as an "O" clamp, 153, as shown in FIG. 12A. This "O" clamp functions as an adjoining fastener. This clamp may be molded from a single piece of plastic. This clamp comprises a circular, generally flat ring, 153; with four retaining elements, one shown as 155; and an application slot 154. This embodiment is a "quarter-turn" style fastener, whereby a coin may be used in slot 154 to rotate the "O" clamp, once it is set into the corresponding receptacles on two adjacent base plates, thereby affixing both the "O" clamp to the two base plates and also thereby effectively fixing the relative positions of the two adjacent base plates, at least at the location of the "O" clamp. One or more visual keys, such as 156, are used to assist in the proper, manual installation of the "O" clamp.

FIG. 12B shows the "O" clamp, 153, in use. This Figure shows the "O" clamp 153, and a portion of two base plates, 157 and 158. Here the "O" clamp 153 is holding the first base plate, 157, adjacent to the second base plate, 158. 159 shows a pair of elevated portions on the two base plates, 157 and 158, that accept the quarter-turn retaining elements, shown in FIG. 12A as 155.

In one embodiment, each base plate comprises two half-receptacles on each of its four edges. Joining two base plates adjacently involves placing the base plates adjacent and installing two "O" clamps, one into each pair of adjoining half-receptacles. This operation effectively secures the two base plates against translation in the X-axis, Y-axis, and Z-axis, where the X-Y plane is the primary plane of the base plates and finished panel, and Z is normal to this plane. This operation also assures proper alignment in all three axes. The Z-axis alignment may also be viewed as assuring co-planarity of the two panels, at least at the adjoined edges. The use of two "O" clamps also secures the two base plates against relative rotation around a line in the X-Y plane that intersects the midpoints of the adjoined edges.

In assembling a panel comprised of a set of base plates, all base plate adjacent edges should be secured, if using this embodiment, with a pair of "O" clamps as described.

The retaining element, the "O" clamp, 153, is designed, in this embodiment, to be removed and re-used. In one embodiment, as will be shown below, each tile has space for two such "O" clamps on each edge. The "O" clamps may be such, or not, to permit adjacent tiles to be angled relative to each other to permit curved panels to be constructed. A variation of this shown "O" clamp may be used that specifically holds adjacent tiles at a desired angle set by the design of the alternative "O" clamp.

There are many alternative embodiments of suitable adjoining fasters to affix base plates adjacent. One embodiment uses a press-fit, rather than a quarter turn clamp. Another embodiment uses magnets. Another embodiment uses a slide latch. Another embodiment uses a snap-type hinged fastener.

FIGS. 12C and 12D provide a top view and side view of two exemplary tile base plates, 161. FIG. 12C shows the two base plates 161 adjacent and mechanically connected by two "O" clamps, 162. 163 shows a space on one base place for half of an "O" clamp that might be used to join this base plate to a base plate underneath, not shown. The observant viewer will notice that each tile base plate in this Figure has space for a total of eight halves of "O" clamps. An exemplary hole 164 permits a fastener, not shown, to secure the base plate to a supporting structure, as discussed elsewhere herein. FIG. 12D shows an exploded view with the two adjacent base plates 161 and an "O" clamp 162.

Figure 13:
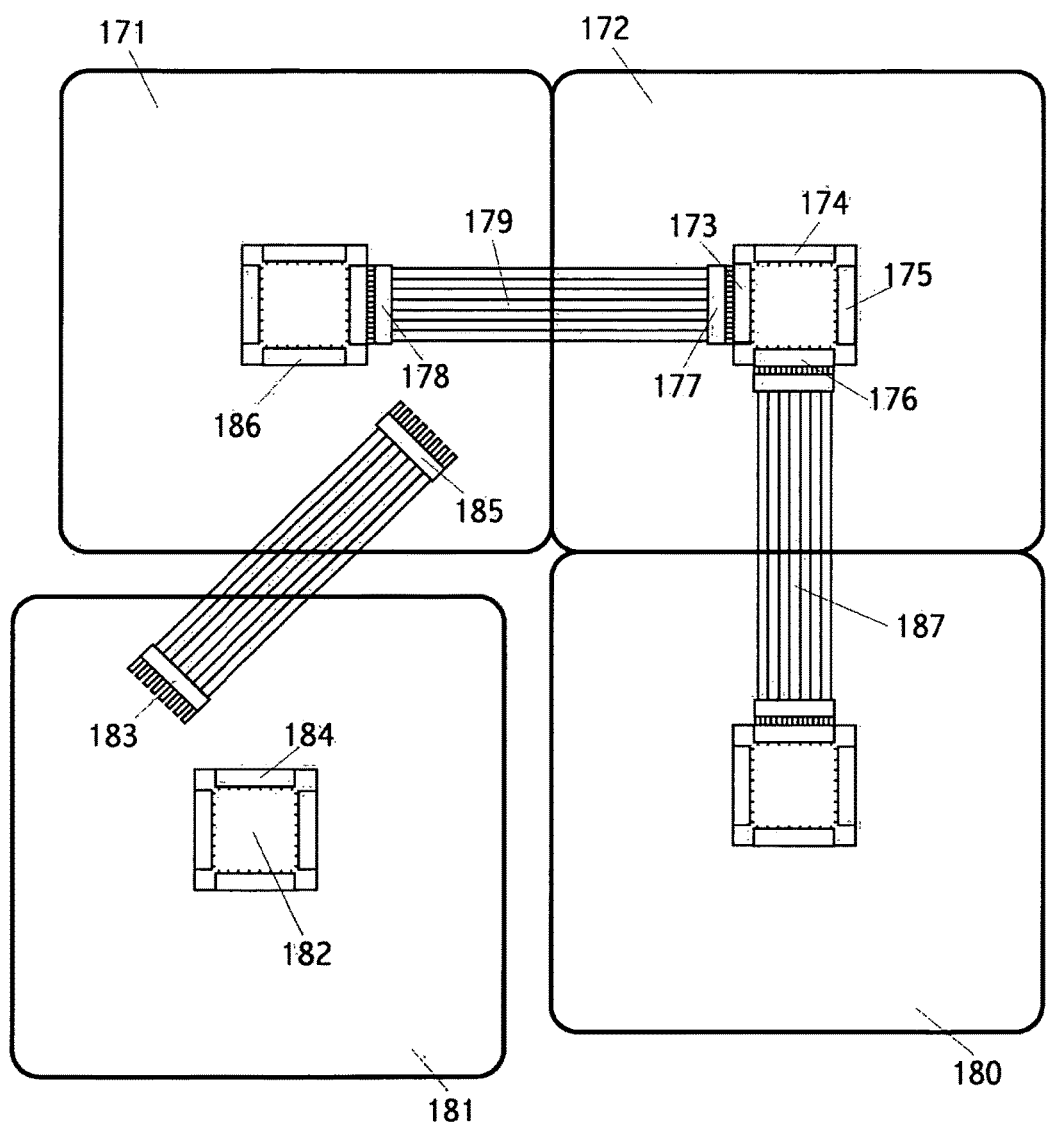
FIG. 13 shows an alternative embodiment of electrically interconnecting tiles.

FIG. 13 shows an alternative embodiment of electrically interconnecting tiles. 171, 172 and 180 are three adjacent and electrically connected tiles. Tile 181 is not yet connected. In this embodiment, each tile has four connectors of a first gender, for example, 173, 174, 175 and 176 on tile 172. Cables with both ends of a second gender, for example the free cable with connectors 183 and 185, is used to electrically interconnect tiles in this embodiment. For example, cable 179 with connectors 178 and 177 is being used to interconnect tiles 171 and 172. Cable 187 connects tiles 172 and 180. Cable 179 may be referred to (arbitrarily) as a horizontal or row connector, while cable 187 may be referred to (arbitrarily) as a vertical or column connector. One way to connect tile 181 is to place connector 185 into 186 and connector 183 into connector 184. 182 represents the control logic for tile 181. An advantage of this embodiment is that tiles may be assembled into a panel in any of four orientations. Also, cables may be handled separately from the tiles. Cables of varying lengths may be offered to enable panels to be constructed on non-contiguous tiles.

Figure 14:
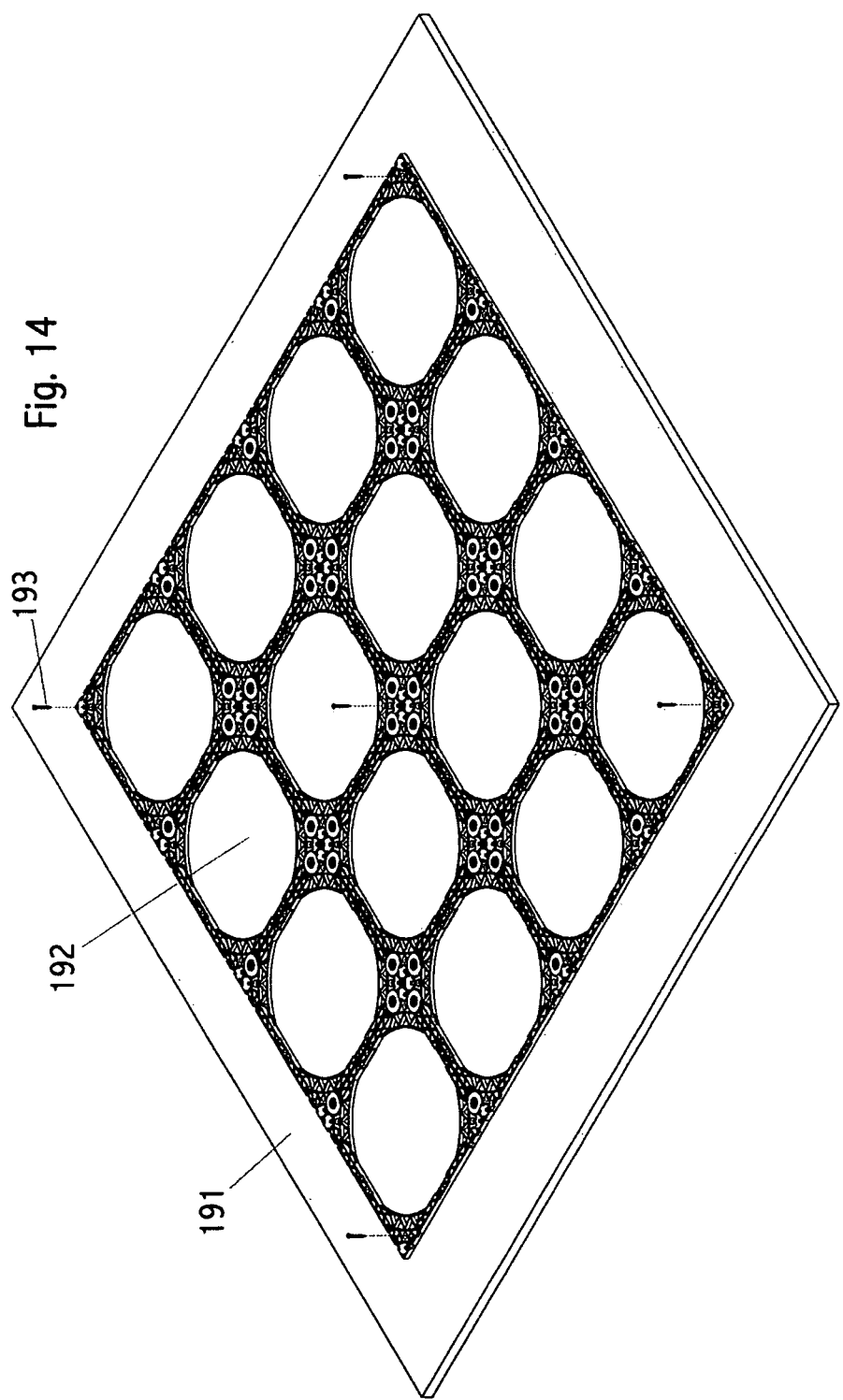
FIG. 14 shows the base plate portion of an exemplary panel constructed of tiles.

FIG. 14 shows a view of 16 base plates assembled into a partial panel 192 in a 4×4 architecture. These 16 base plates may now be secured to a supporting structure 191 with five fasteners, 193. A unique feature of this invention is that it is not necessary to affix every base plate to the supporting structure. For example, in this Figure, only five fasteners are needed to secure all 16 base plates. Fewer fasteners results in faster panel installation, lower cost, less damage to the supporting structure and faster re-deployment of the panel or tiles. In one embodiment the fasteners and structure of the base plates is such that the fastened side of each base plate is capable of supporting one full tile. Thus, in a full panel, if each tile is either affixed to the supporting structure of is adjacent to such an affixed tile, the entire panel is sufficiently affixed securely to the supporting structure.

Figure 15:
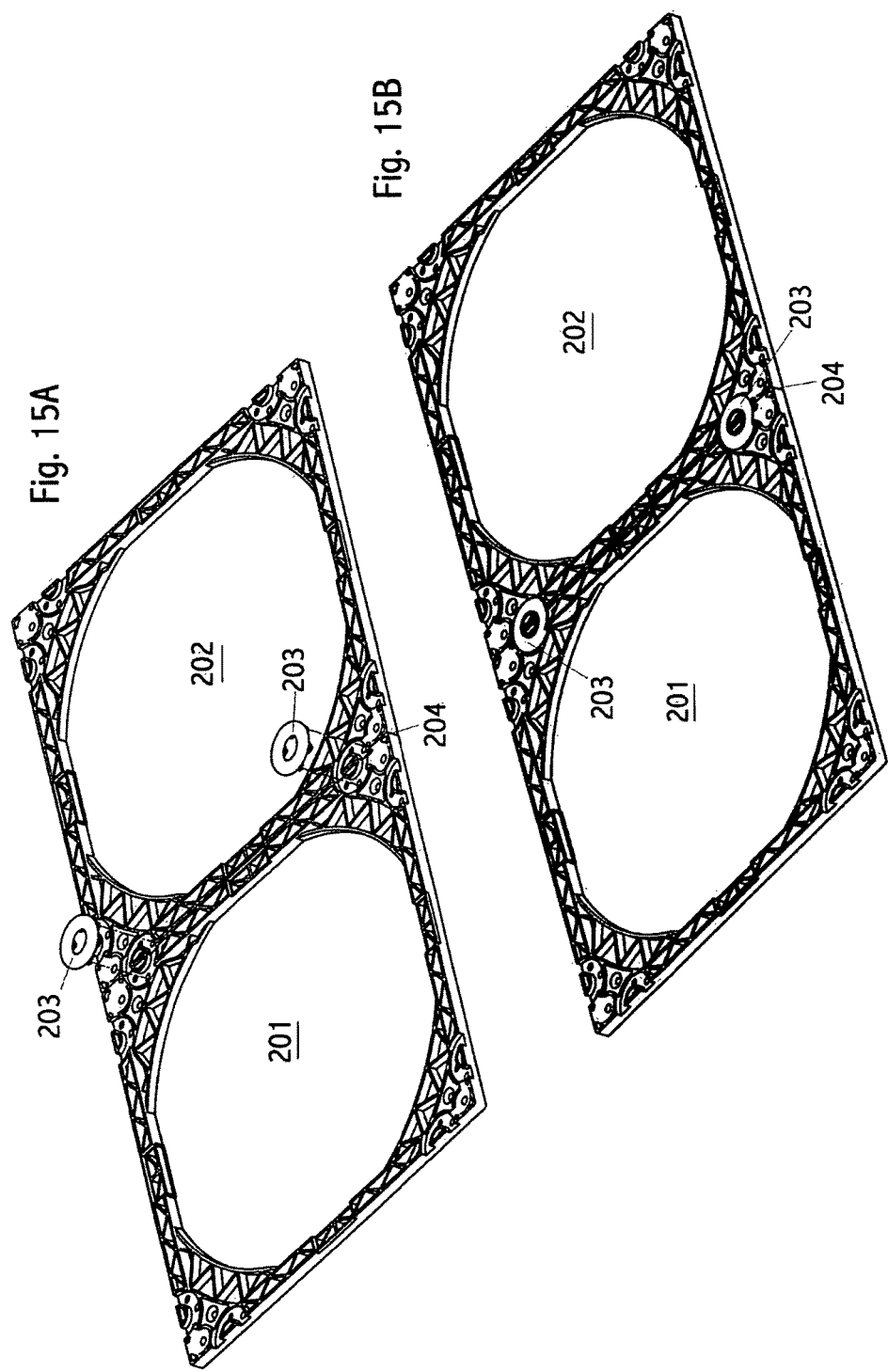
FIGS. 15A and 15B show the use of "O" clamps in an embodiment to mechanically connect two adjacent tiles.

FIGS. 15A and 15B show the use of "O" clamps, 203, to secure two adjacent base plates, 201 and 202, to each other. Ideally, the base plates are secured in such a manner as to maintain ideal alignment within manufacturing tolerances in order to create as visually seamless a final panel as possible. The "O" clamp as described herein mechanically references the interior of the ideally monolithic base plate structure, rather than the edge of the base plate. This permits more accurate alignment tile to tile referencing the most visually important portions of the tile, which include the illumination elements and any reflectors or baffles, and the visible outside edges of the diffuser. 204 shows the precision alignment gap between adjacent base plates. The use of the "O" clamp permits a small clearance between the actual edges of the base plates, which permits, if desired, some curvature in the final panel in some embodiments. In other embodiments, the "O" clamp maintains a rigid alignment of base plates to insure both a planer panel.

FIG. 15A shows two "O" clamps, 203, not yet inserted into the base plates 201 and 202. FIG. 15B shows the two "O" clamps, 203, installed. The base plates 201 and 202 each have receptacles that mate to half of the "O" clamp 203. In this embodiment, each base plate has eight such receptacles, two each on each of four edges.

Figure 16:
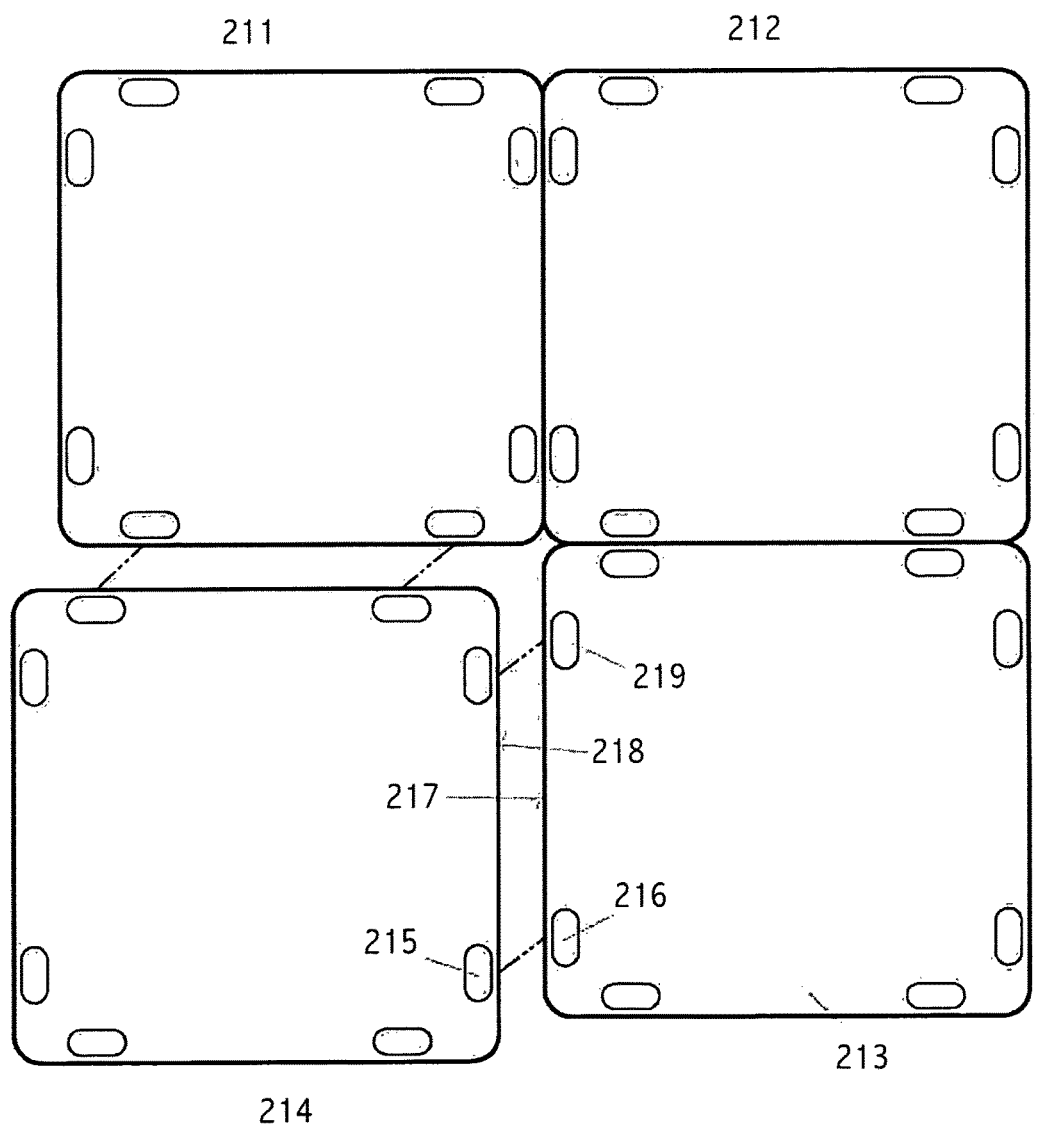
FIG. 16 shows an exemplary embodiment using magnets to mechanically connect adjacent tiles.

FIG. 16 shows the use of magnets to hold base tiles adjacent and general planer, as an alternative or additional embodiment of using "O" clamps. In this shown embodiment, each base plate, 211, 212, 213 and 214, has two magnets on each edge. For example, base plate 213, on edge 217, has magnets 216 and 219. The polarity of magnets is organized so they attract appropriately. For example, magnets on the (arbitrarily named) top and right may have magnetic North facing outward, while the (arbitrarily named) bottom and left then have magnetic South facing outward. The selection of magnet orientation should be consistent with the polarities of the connectors used for the communication ports (not shown in this Figure), of embodiments that use more than one gender. Here, magnet 215 has North facing outward, while magnet 216 has South facing outward, so they attract. Thus, edge 217 will effectively mate with edge 218. Tile 214 will also magnetically attract and mate with tile 211. Magnets may be placed in base plates, or, in alternative embodiments, in other portions of a tile. Magnets may be secured in the tile via press-fit, adhesive, a retaining device, or placed in a slot. Magnets may be recessed or their faces may be exposed for contact when mated. In some embodiments, the magnets are part of a pair of mechanical alignment elements, such as a pin and socket. Securing illumination plates to base plates may use similar magnetic means. Key advantages of magnets used for assembling panels are (i) no tools are needed; (ii) tiles are readily disassembled; (iii) there are no small fastening parts to be lost; and (iv) components may be reused many times without significant wear.

FIGS. 17A, 17B and 17C show an assembled illumination plate 221 with a base plate 222, a perspective exploded view, and a side view of the two plates, respectively. In this embodiment, illumination elements 227 are arranged in a six by six square grid in the illumination plate. In this embodiment, four magnets 225 are used on the four corners of the illumination plate 221, which are attracted to four magnets 226 on the four corners of the base plate 222. The magnets secure the illumination plates to the base plates. The magnets permit illumination plates to be placed over base plates assembled into an array and mounted on a support surface, without the use of tools and free of any fastener or portion on the visible surface of the illumination plate. Illumination plates may be removed from the base plates for disassembly or maintenance by the use of a suction tool, such as used by glaziers to hold glass. Also shown in FIG. 17C are a pair of mechanically mating formations, here a bump, pin or projection 223 on the illumination plate that fits accurately into a mating recess 224 in the base plate. This 223-224 pair provide an accurate alignment of illumination plates with base plates. Ideally, these mechanical formations are molded into the structure of each plate. In this embodiment, the magnets 225 and 226 are placed within the mechanically mating formations, 223 and 224, respectively. Magnets may be secured in the plates via press-fit, adhesive, a retaining device, placed in a slot, or by other means.

Another embodiment to assure or to assist in the proper relatively rotational alignment of illumination plates onto base plates is to set the polarity of the four magnets with three magnets have a first magnetic orientation and one magnet having the opposite magnetic orientation. In proper rotational alignment, all four magnets in the illumination plate will be attracted to all four magnets in the base plate. If rotated 90 degrees, two of the four magnet pairs will repel, rather than attract.

In one embodiment, the magnets discussed above are each located in a receptacle, and the pairs of receptacles (one each on a base plate and an illumination plate) also mate physically, due to their shape and dimensions. Thus, when mating an illumination plate to a base plate, both the magnets and the mating receptacles assist in proper alignment. In addition, in one embodiment, the magnet receptacles also serve to hold and align the magnets during the manufacturing of the base plates and illumination plates. For example, a circular disk magnet may be press fit (or glued) into the base of its receptacle during manufacturing, with the remaining portion of the receptacle, above the magnet, then being sized and shaped for field use in assembling panels.

Figure 18:
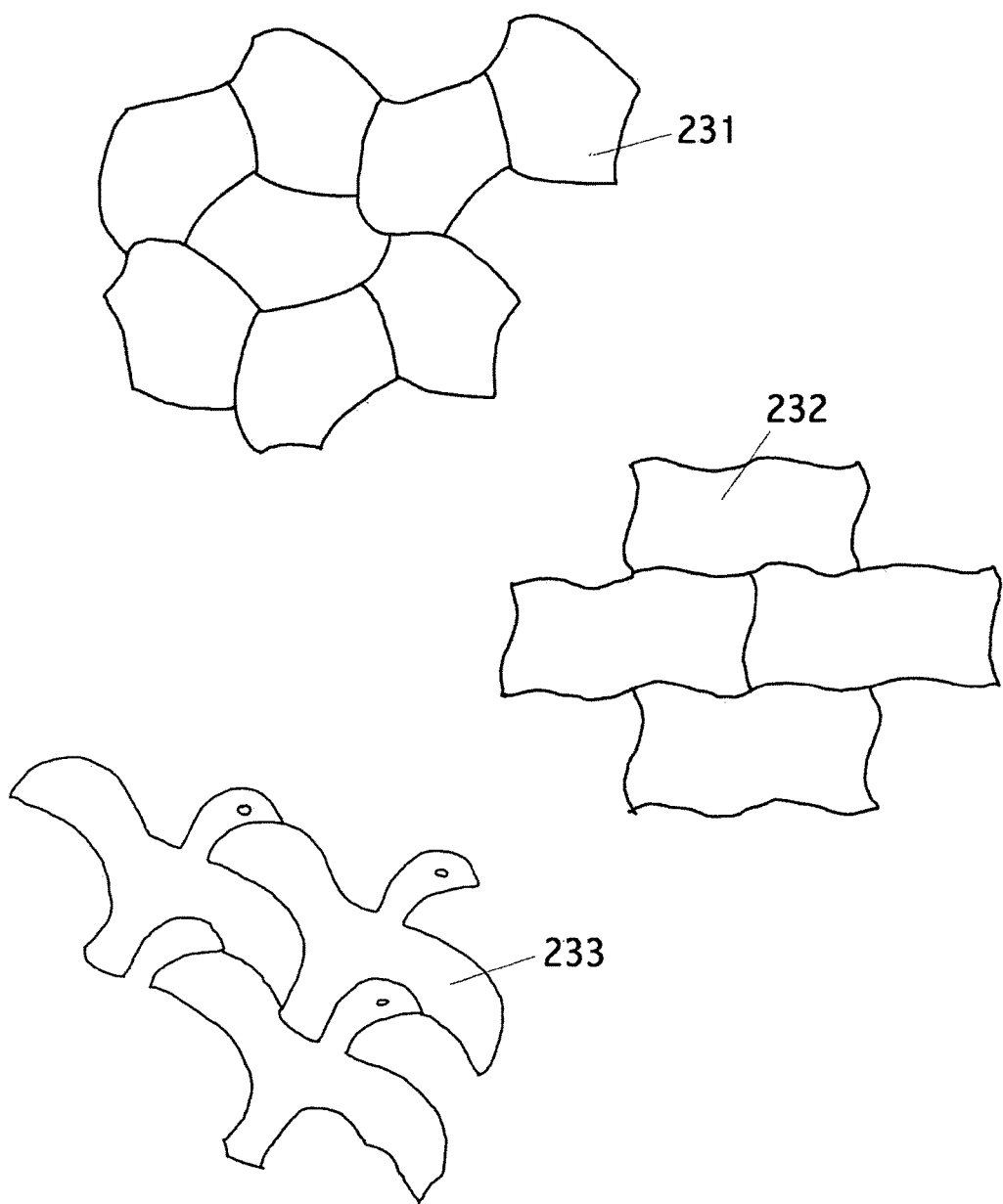
FIG. 18 shows various tessellation patterns for tiles.

FIG. 18 shows three tessellation patterns, 231, 232 and 233. Such tile shapes are an alternative to square or rectangular tiles. Pattern 231 shows eight tiles. Pattern 232 shows four tiles. Pattern 233 shows three "bird" tiles.

Figure 19:
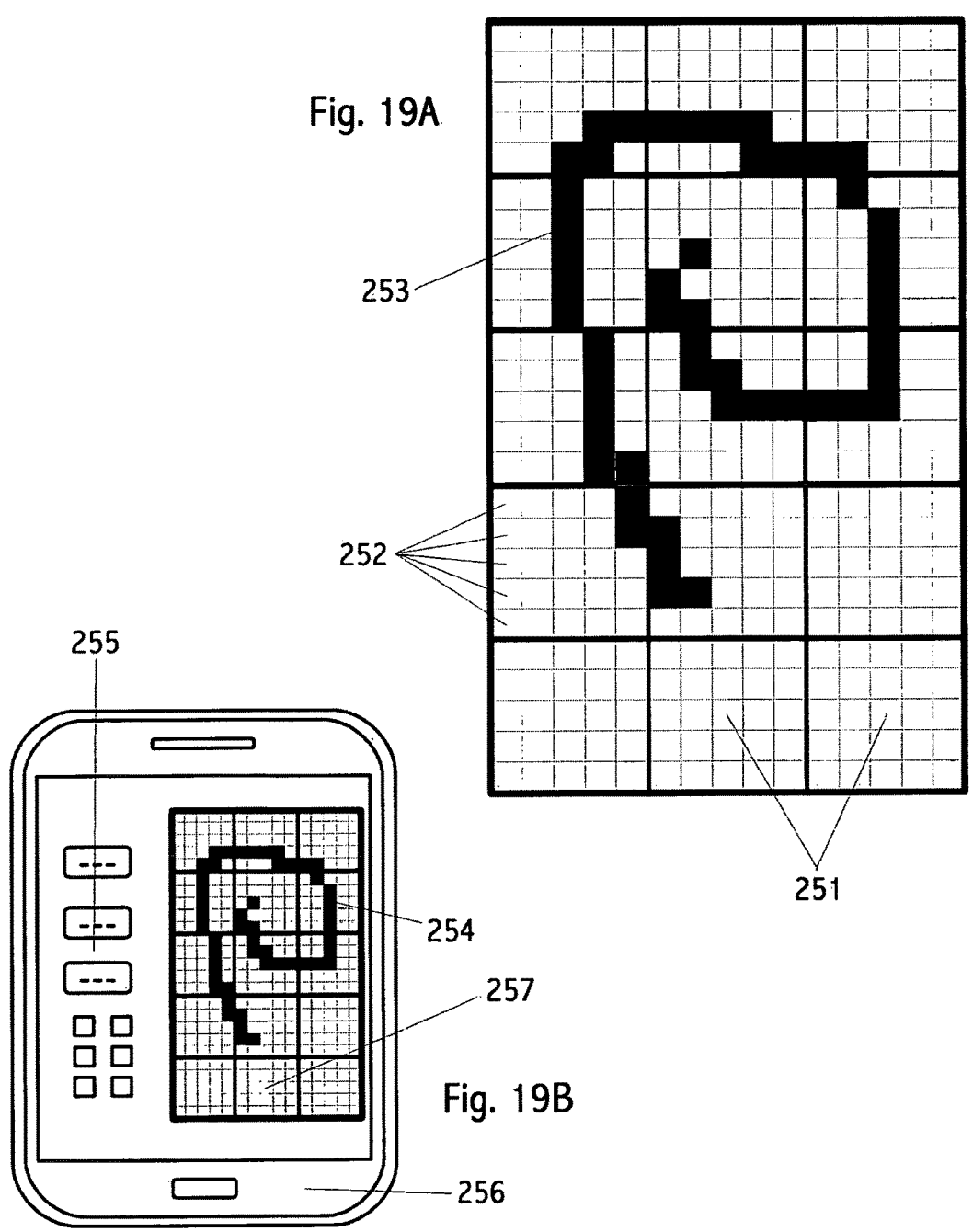
FIGS. 19A and 19B show a particular illumination pattern on a portable electronic device and the same pattern transferred to a working panel.

FIG. 19B shows a pattern 254 on a representation of a panel 257 on a personal electronic device 256. This pattern 253 is replicated on an actual panel shown in FIG. 19A. The panel as shown is comprised of 15 tiles 251 in a three by five array. Each tile comprises 25 illumination elements (pixels) 252 arranged in a five by five array. FIG. 19B further shows a software application ("app") running on the personal electronic device 256, with controls for the app shown 255. In one embodiment the pattern as created, selected or modified by the user running the app is communicated, such as via a cable, WiFi or the Internet, to the panel shown in FIG. 19A. In another embodiment, the pattern on the actual panel in FIG. 19A is communicated to the app shown in FIG. 19B. Such communication between the panel in FIG. 19A and the app in FIG. 19B may be via a controller and the controller's communication port, shown previously in FIG. 7B.

A unique feature of embodiments of this invention is the ability of the assembled panels to auto-configure. That is, a panel self-determines its architecture as to the number of tiles in rows and columns. In one embodiment, this configuration is then communicated from the panel shown in FIG. 19A to the app shown in FIG. 19B. A protocol for such self-configuration is described below.

Figure 20:
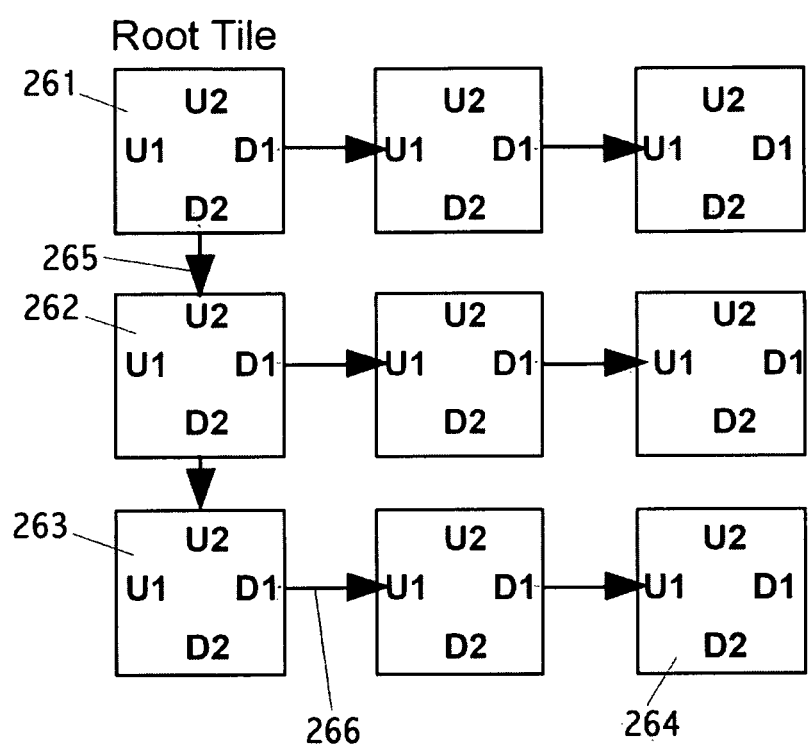
FIG. 20 shows exemplary tree-structure logical or physical wiring for inter-tile communication in a panel.

FIG. 20 shows one method of wiring tiles to create a logical network. This method enables self-configuration of a panel, when used in conjunction with the algorithms described below. Here, the exemplary panel is three rows and three columns, with the root tile, 261, at the top left. Downstream ports on each tile are labeled with a, "D." Upstream ports are labeled with a, "U." Wired connections are shown with an arrow, such as 265, which connects the downstream port D2 of tile 261 to the upstream port U2 of tile 262. Tile 261 is part of row 1. Tile 262 is part of row 2. Tile 263 is part of row 3. Tile 264 is in column 3, row 3. 265 represents a column connection. 266 represents a row connection.

The following exemplary algorithm may be used. Refer to FIG. 20 as one example of this algorithm.

(i) Tiles each have 4 communications ports—with at least one and at most four connected to communications ports on other tiles at any given time.

(ii) U1 and U2 are "upstream ports". For all tiles in a panel, except for the singular "root" tile, exactly one of U1/U2 is connected to another tile at any given time.

(iii) A panel must have a root tile. The root tile is connected to an external source of commands (the Panel Controller) via either U1 or U2 (but not both).

(iv) D1 and D2 are "downstream ports". One, both or neither of these ports can be connected to another tile.

(v) All connections between communication ports are 1-to-1. If it is connected, a D1 port on one tile always connects to a U1 port on another tile.

If it is connected, a D2 port on one tile always connects to a U2 port on another tile.

(vi) A tile whose U1 port is connected to another tile cannot have its D2 port connected.

(vii) If the root tile has a D1 link, all tiles with a U2 connection will have a D1 connection.

(viii) If the root tile does not have a D1 link, all tiles with a U2 connection will not have a D1 connection.

(ix) In a panel, all sequences of tiles transitively connected by D1-U1 links are of the same length.

Figure 21:
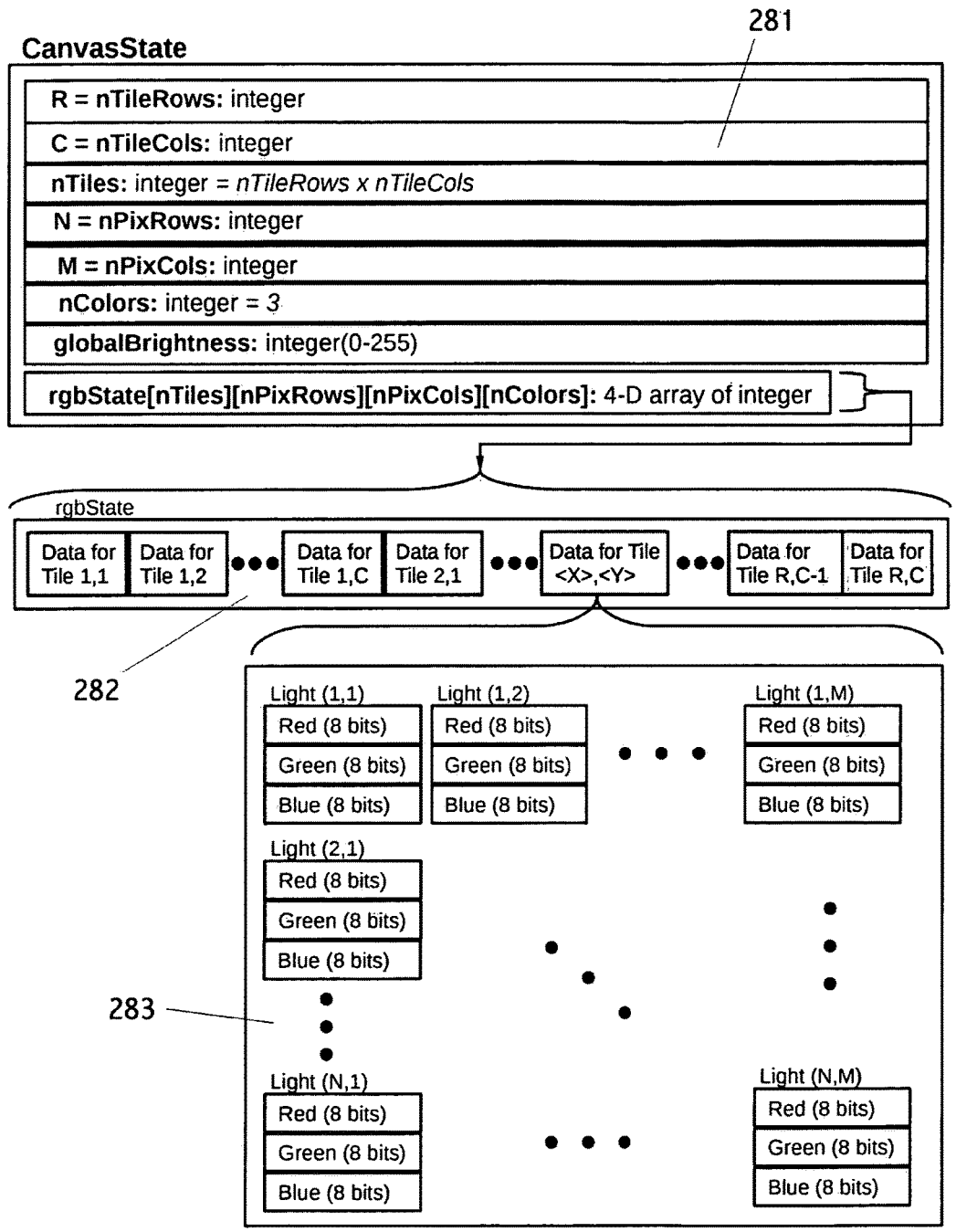
FIG. 21 shows exemplary data structures used by a processor in a tile.

FIG. 21 shows some data structures used in one embodiment within the panel controller, described above. The "CanvasState" data structure, 281, comprises key variables associated with the panel as a whole. These include R and C, the number of rows and columns in the panel; nTiles, the number of total tiles; N and M, the number of pixel rows and pixel columns in each tile; nColors, the number of independent colors in each pixel; and globalBrightness, the overall brightness of the panel. This data structure, 281, may also be replicated in whole or part within the processor of each tile, described above.

FIG. 21 also shows a data structure rgbstate, 282, that replicates the illumination state of each pixel in each tile. Data for one tile is shown in detail view, 283. This view includes 8-bits of brightness for each of the Red, Green, and Blue colors for each of the N×M pixels in a tile. This data structure, 283, also resides in the processor for each tile, holding data for that tile.

Figure 22:
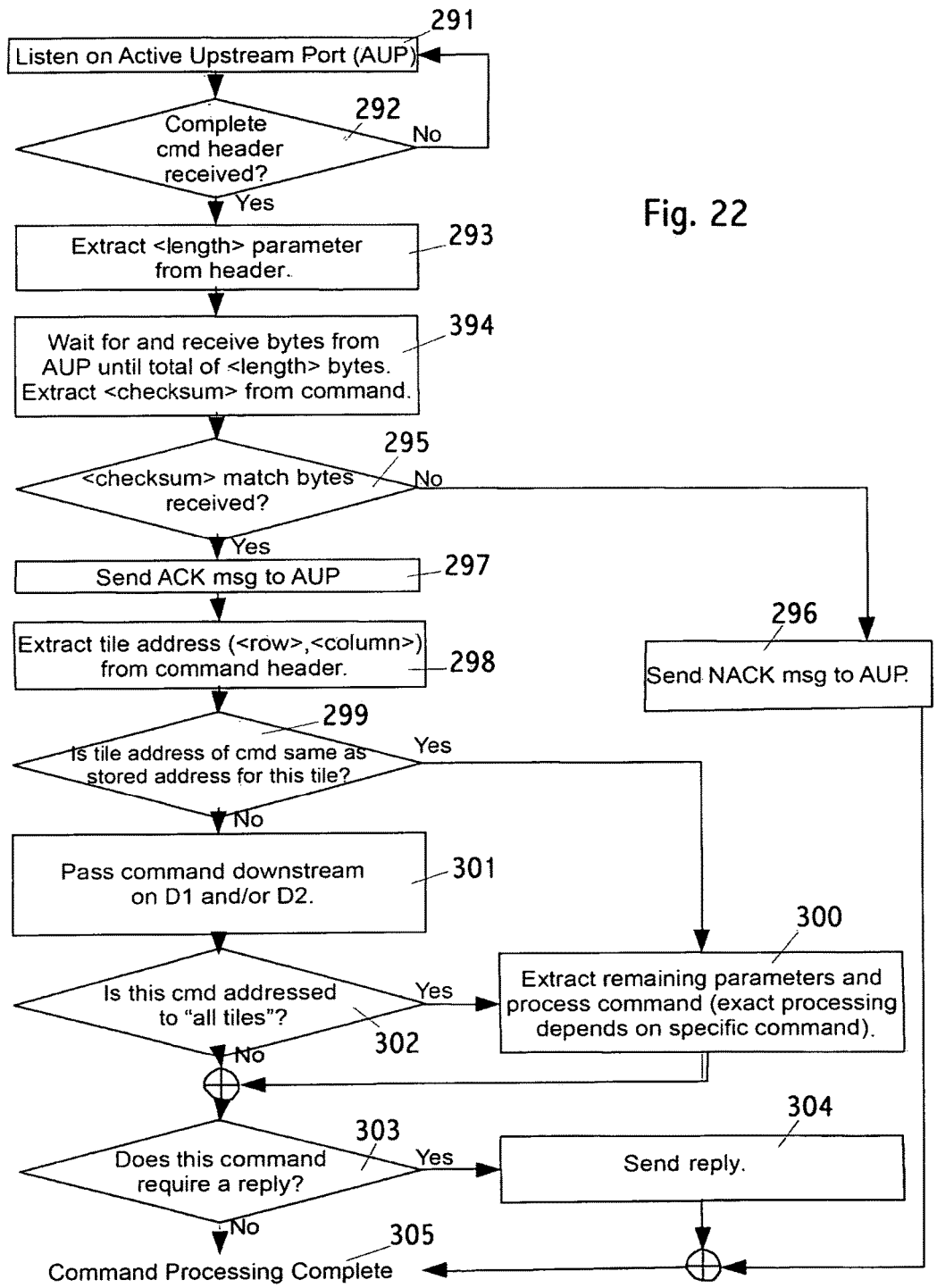
FIG. 22 shows exemplary command routing by a tile.

FIG. 22 shows an exemplary flowchart of routing a command to the correct tile, and routing a reply back to the Panel Controller. This flowchart may be used with a panel-wiring configuration as described above, such as in FIG. 20 and its associated text. After panel configuration is complete, the flowchart starts at 291, where a tile listens on its active upstream port. Each tile has only one active upstream port. The tile continues to listen 291 until a complete command header has been received, 292. Then, the length of the command in bytes is extracted from the command header, 293. Then in step 294 the tile waits for receipt of the command to complete, based on its now known length, step 294. The checksum is verified, 295. If the checksum is not correct, then a communication error occurred and step 296 sends back a negative reply, NACK, on the upstream port. If the checksum is correct, processing of the command continues with step 297, which sends a positive acknowledge, ACK back upstream. Then, in step 298 the destination tile row and column are extracted from the command. If the row and column match the current tiles address, step 299, then the command is processed locally, step 300. If either the row or column are larger than the current tile's address, then the command is retransmitted downstream on whichever or both ports D1 and D2 are active, step 301. In step 302 the command is checked to see if it applies to "all tiles." If so, it is also then executed locally, step 300. Finally, in step 303, the command is check to see if it is requires a reply. If so, a reply is sent in step 304. Step 304 first waits for a reply to be received on any active downstream port. The exact nature of replies depends on the type of command. After step 304, or step 303 if no reply is required, command routing, execution and reply are complete, 305.

Figure 23A:
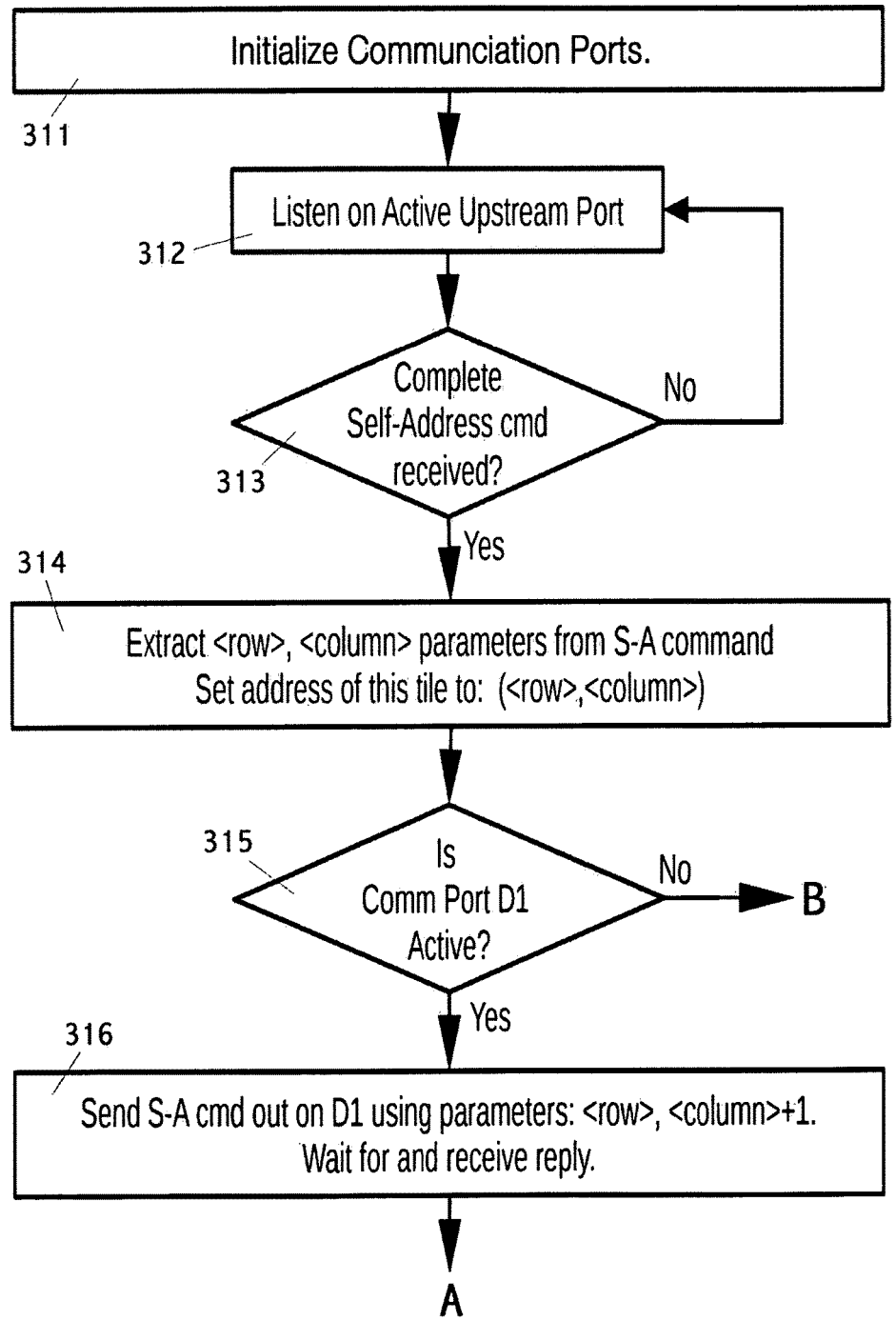
FIGS. 23A and 23B show an exemplary flowchart for establishing self-addressing of a tile within a panel.
Figure 23B:
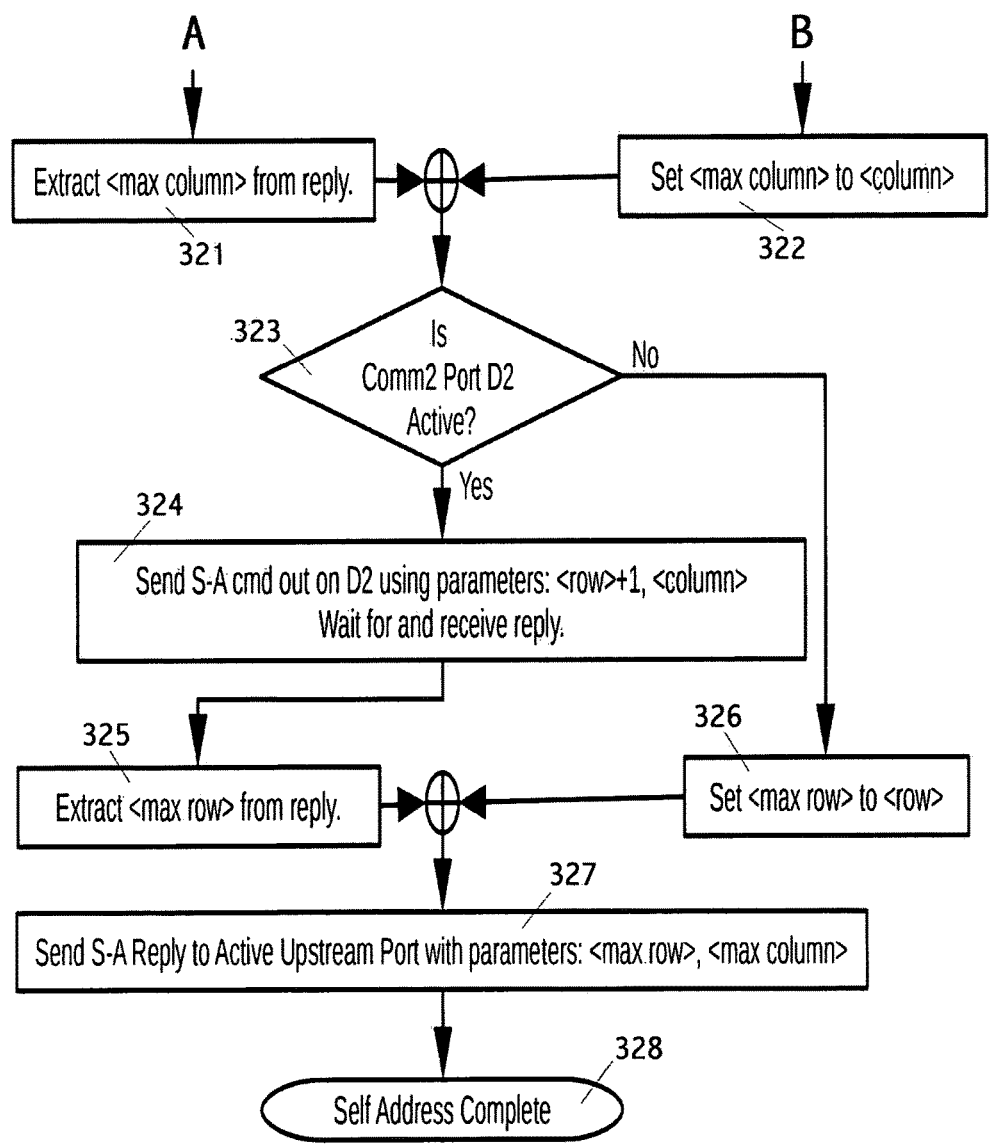

FIGS. 23 A and 23B provide an exemplary flowchart of steps performed by each tile to implement auto-configuration of the panel. This flowchart may be used with a panel-wiring configuration as described above, such as in FIG. 20 and its associated text. The communication initialization step, 311, determines which upstream and downstream ports on the tile are active. Active upstream ports are identified by receiving a valid command on that port. Active downstream ports are identified by sending a command and waiting for a valid reply prior to a predetermined timeout. In step 312 the panel listens for commands. Until a Self-Address command has been received 313, the tile continues to listen 312. When the Self-Address command has been received, in step 314 the tile extracts its own row and column address from the command. In step 315 if port D1 (downstream 1) is not active, processing continues at point B in FIG. 23B. If port D1 is active, the tile sends out a Self-Address command 316 with its own row address, and its own column address incremented by one. The tile then waits for a reply on port D1, also in step 316. Processing then continues at point A in FIG. 23B.

In FIG. 23B, continuing from point A, the tile extracts the MaxCol from the reply 321 received on port D1 in step 316. If port D1 is not active (step 315) then MaxCol is set to the current tile's column address, 322. The tile determines if port D2 (downstream 2) is active, step 323. If so, the tile sends out D2 a Self-Address command 324 with its own row address incremented by one, and its own column address, and waits for a reply on port D2. From the reply on D2, the tile extracts the MaxRow, step 325. If D2 is not active, then MaxRow is the current tile's row address, 326. The tile then sends a reply back up its upstream port comprising the parameters MaxRow and MaxCol, step 327. At the point the Self-Address process for this tile is complete, 328. When the Self-Address is complete for all tiles in the panel, the controller now has the MaxRow and MaxCol for the entire panel, which is its configuration. Ideally, this self-configuration is performed at each power-up. However, it may be performed at different times in different embodiments. Comparing one auto-configuration with prior auto-configurations may be used to determine that the panel architecture has been changed, or that a tile has failed and the panel requires maintenance.

When the Self-Address process for each tile has completed, as described above, each tile knows its own row and column address. It also knows the row and column addresses of its downstream tiles. In this way, it is a simple matter for each tile to direct commands to the correct tile. If the destination row and column address in a command match the tile's addresses, the command is for this tile. If the target row address is larger, the command is resent out the downstream row port. If the target column address is larger, the command is resent out the downstream column port. If the target row or column address is smaller than the tile's own address, an error has occurred. There are many other methods of accomplishing self-addressing and auto-configuration of a panel, as one trained in the art (such as switching and routing messages) appreciates.

Figure 24A:
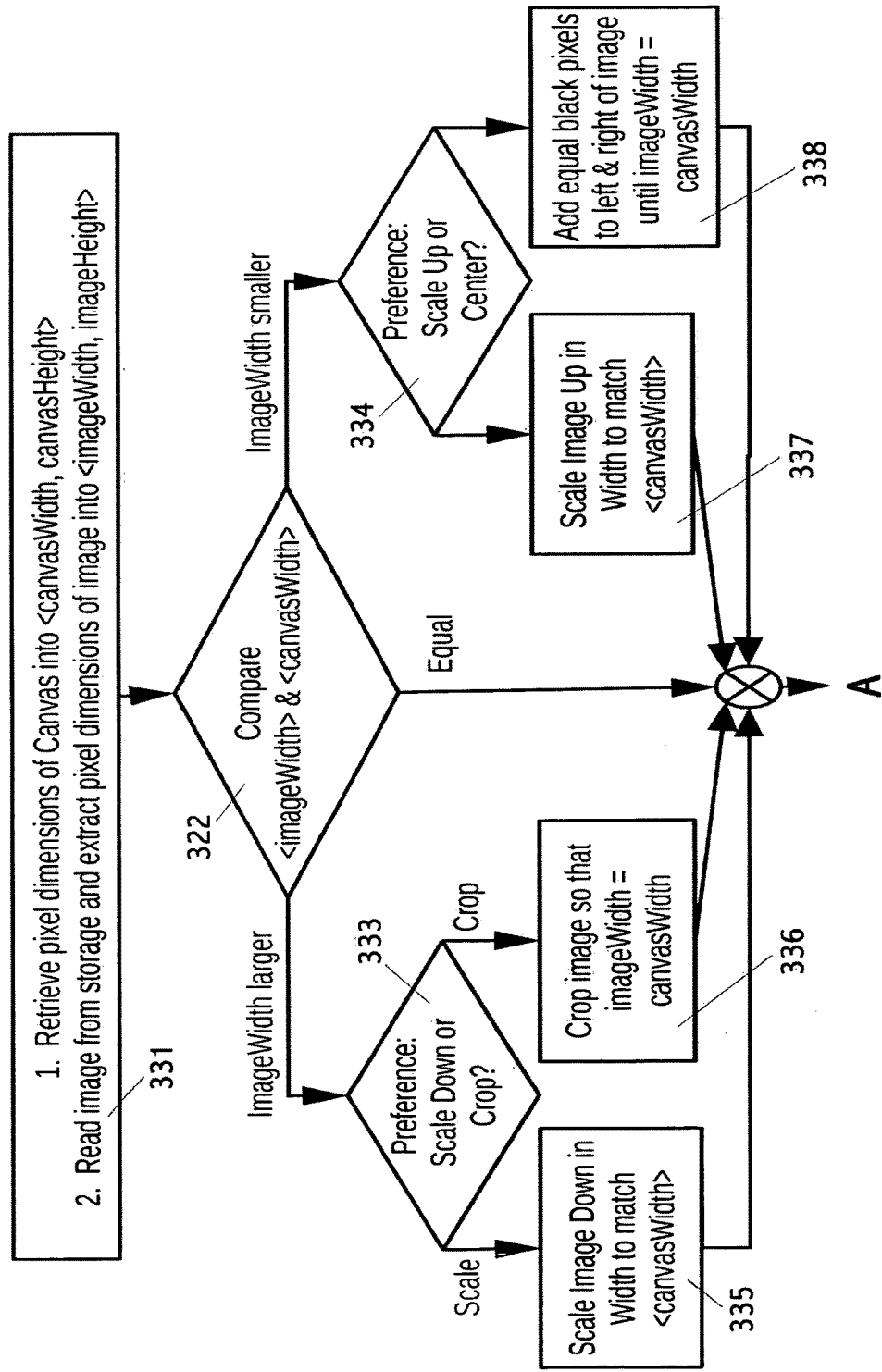
FIGS. 24A and 24B show an exemplary flowchart for converting an illumination pattern from one panel architecture to a second panel architecture.
Figure 24B:
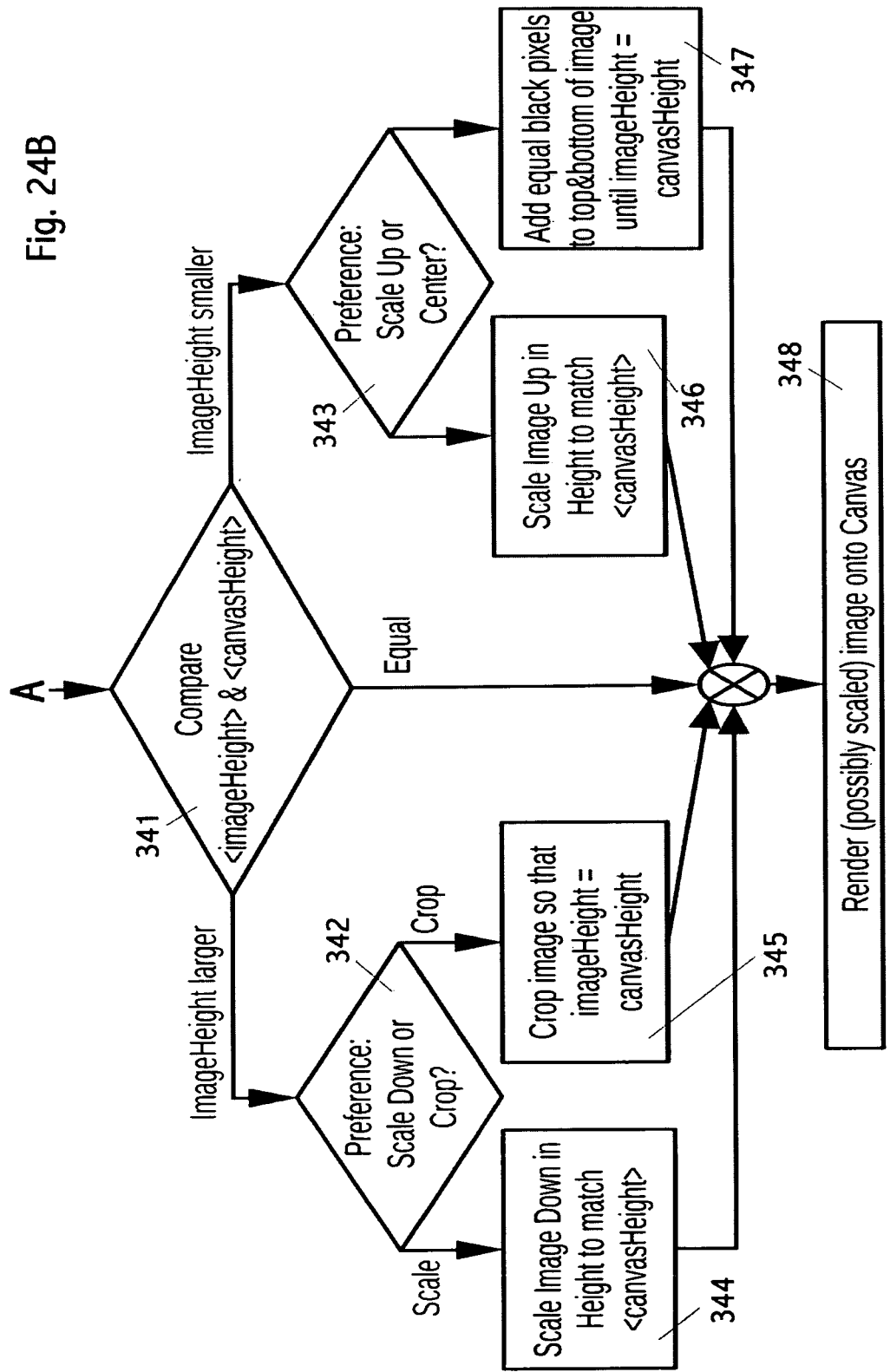

FIGS. 24 A and 24B contain a flowchart for one embodiment of a method of modifying panel images to fit panels of different architectures. In particular, panels with different aspect ratios or a different number of rows or columns. A unique feature of some embodiments is the ability to reuse patterns from panel to panel, even if the panel architectures vary. This flowchart describes one method of altering or converting patterns (images) in such cases. In step 331 the sizes and shapes of the source pattern and the target panel are extracted from stored or received data. In step 332 the width parameters are compared. If the image width is larger than the panel, step 333 selects scaling or cropping width. Such a selection may be set by a user or preset. If the image width is smaller, step 334 selects scaling up or centering. Such a selection may be set by a user or preset. Steps 335, 336, 337, and 338 then perform the scaling down, cropping, scaling up or adding blank (black) around the image, respectively. Processing continues at A in FIG. 24B.

Steps in FIG. 24B are comparable to the steps in FIG. 24A, except they are applied to height instead of width. The height parameters are compared in 341. Steps 342 and 343 select the options of scaling down or cropping, and scaling up or adding black space above and below, respectively. Steps 344, 345, 346 and 347 then perform the selected image modifications. The final, possibly altered image, is then rendered or transmitted to the panel, or to storage prior to transmitting to a panel, step 348. Images may be any of numerous well known formats, such as bitmaps, fax data, PNG, PNG, GIF, TIFF, MPEG, H.264, et cetera. Note that methods other than scaling, centering or cropping may be used to alter a pattern or image to particular panel architecture.

Figure 25A:
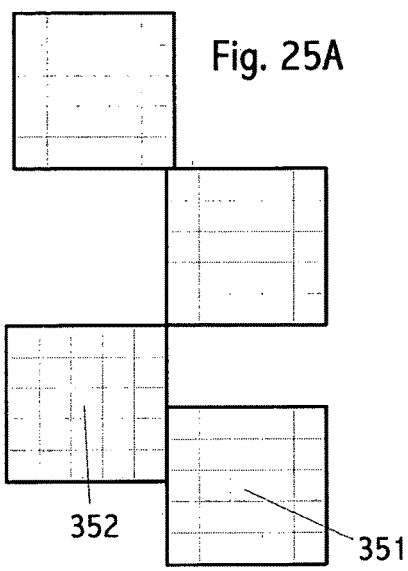
FIGS. 25A, 25B, 25C and 25D show an exemplary method of adjusting a displayed panel architecture on a portable electronic device to compensate for non-adjacent tiles in a panel.
Figure 25B:
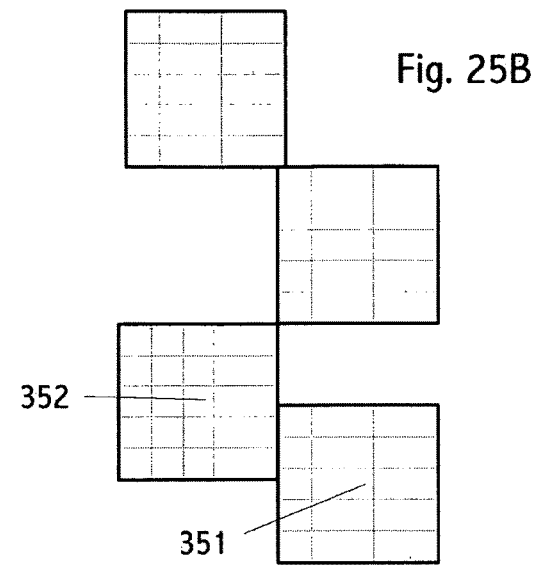
Figure 25C:
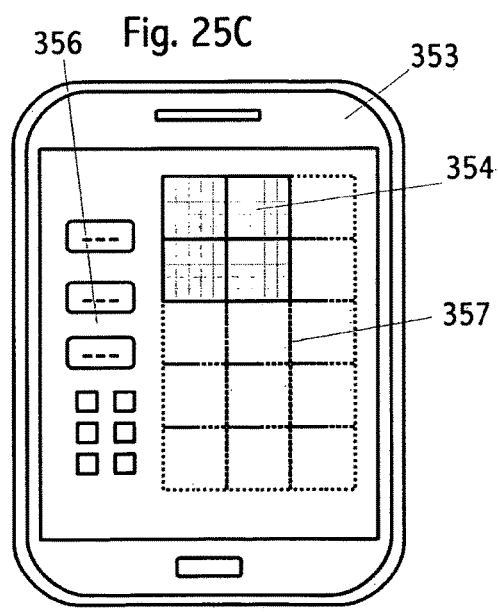
Figure 25D:
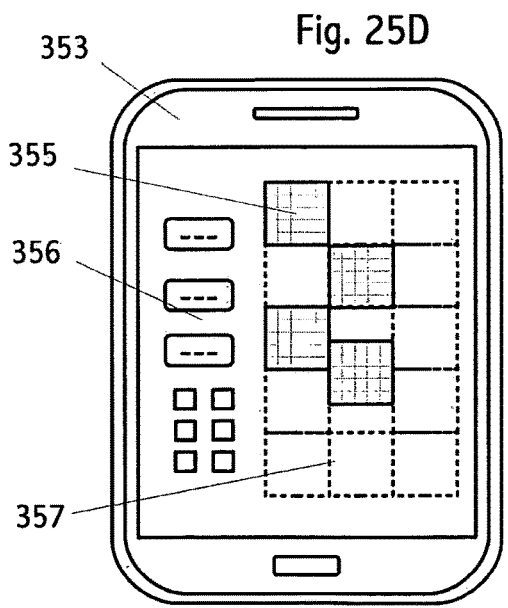

FIGS. 25A, 25B, 25C and 25D show a method of one embodiment for creating on a portable electronic device 353 a realistic mimic of a panel architecture when the panel tiles are not contiguous on a regular grid in a rectangular array. If the tiles are contiguous on a regular grid on a rectangular array then the auto-configuration described above accurately determines the panel architecture. Here FIGS. 25A and 25C show (the same) non-grid panel architecture. For example, tile 351 is not aligned on the tile grid with tile 352. FIG. 25C shows a grid 357 and the assumed panel architecture 354 from the auto-configuration process. An app 356 running on the personal electronic device, 353, allows the user to drag, using a finger or stylus, the four representative tiles, shown in 354, to the correct, corresponding locations, 355, shown in FIG. 25D. The app, shown with controls 356, may allow the shown representative tiles to "snap" to the underlying grid, 357, or not. FIGS. 25A and 25C may be viewed as "before" correction by a user; while FIGS. 25B and 25D may be viewed as "after" correction by the user. This unique embodiment supports unusual and artistic panel architectures. The ability to efficiently implement and support such non-contiguous and non-grid illuminated panels is a unique feature of some embodiments of this invention.

FIG. 26 shows the steps to support re-use of patterns and images on different panel architectures. A user 361 creates, selects, or modifies an image 363, perhaps using an app running on a personal electronic device 362. (A server, PC, cloud processor, or other graphical device may also be used.) This "original" pattern is shown in 364. In step 365 the image is uploaded to cloud storage, 366. Later, the image is modified for a different, wider panel architecture and downloaded 367 to the wider panel 368. The image is modified to a different, narrower panel and downloaded 369 to the panel 370. Such image modification is described above; it may be performed in the cloud, on a personal electronic device, in the panel controller, or on another programmable device. Such modification may be performed in advance, or on demand. This unique feature of some embodiments permits a wide range of "repertoire" images to used and re-used across a wide range of panel architectures, simplifying and lowering the cost of creative and effective panel deployment.

FIGS. 27A and 27B show an image on a panel changing its appearance in response to a sensor local to the panel. Here, the sensor is a touch sensor 373. By touching the sensor 373, a user 374 changes the pattern from a cross, 371, shown in FIG. 27A, to a circle, 372, shown in FIG. 27B. This could be used to implement a game of tic-tac-toe, however considerably more complex games and activities may be implemented, including gaming (gambling) applications, video games, multi-player and massively multi-player games, social interactions, product and service purchasing, education, user-specific and environment specific advertising, food service, and product support. As another example, a panel may be on a shelf, beneath shoes for sale. When a shoe is added, moved, or removed from the shelf one or more sensors cause the lighting in the area of the shoe to change. As another example, guests in the lobby of a hotel are able, via an app on their laptops, tablets, or phones, to indicate their presence and position in the lobby by placing an avatar on a large panel covering a wall of the lobby. They may indicate a desire, such as for a drink or a date, by changing or moving their avatar. As another example, participants in a conference may vote wirelessly, with their vote (or opinion) and location appearing on a large panel at the front of the conference. As another example, passengers in a boarding area at an airport may be able to select or change their seat assignment, with taken, available, and specialized (such as with a baby) seat assignments shown in real-time on a wall panel. The ability to create unusual panel architectures, such as mimicking the shape of a hotel lobby or the shape of airplane seating is a unique benefit of some embodiments of this invention. As another example, a panel in a hotel lobby may change its pattern in real-time depending on the outside weather and temperature.

Figure 28:
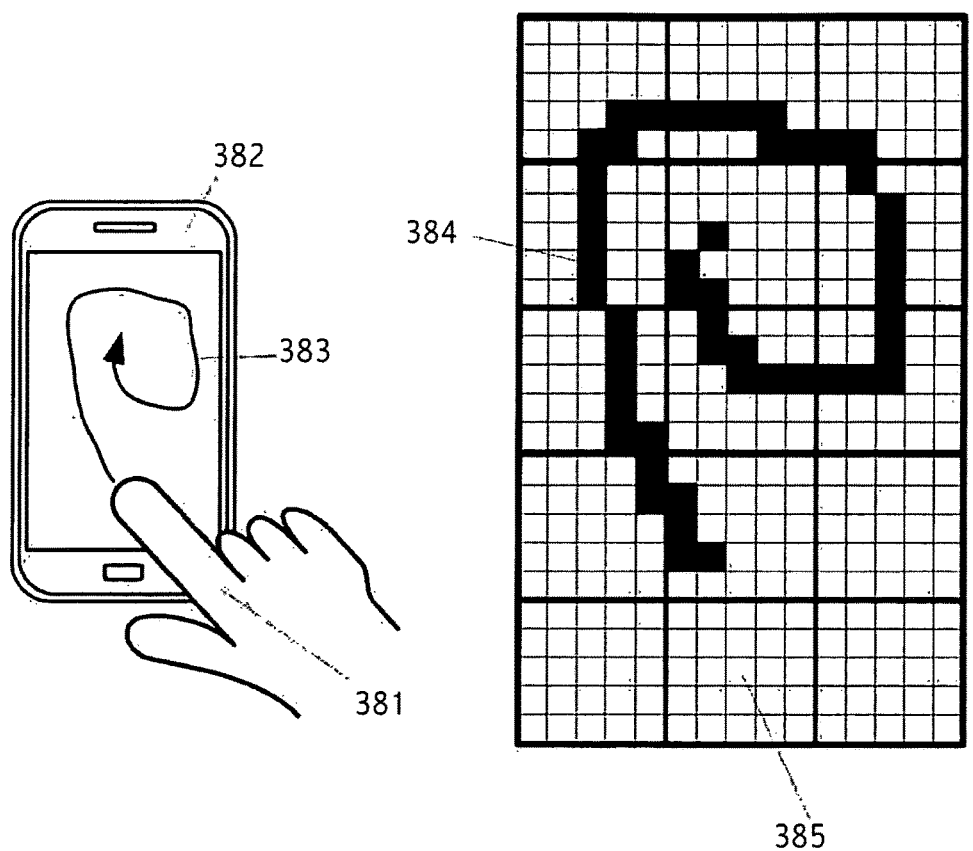
FIG. 28 shows an exemplary embodiment of a user creating an image to display on a panel using a smart phone and touch screen.

FIG. 28 shows a user 381 drawing with a finger a pattern 383 on a personal electronic device 382. The drawn pattern 384 shows up in real-time, as it is being drawn, on a panel 385.

Figure 29:
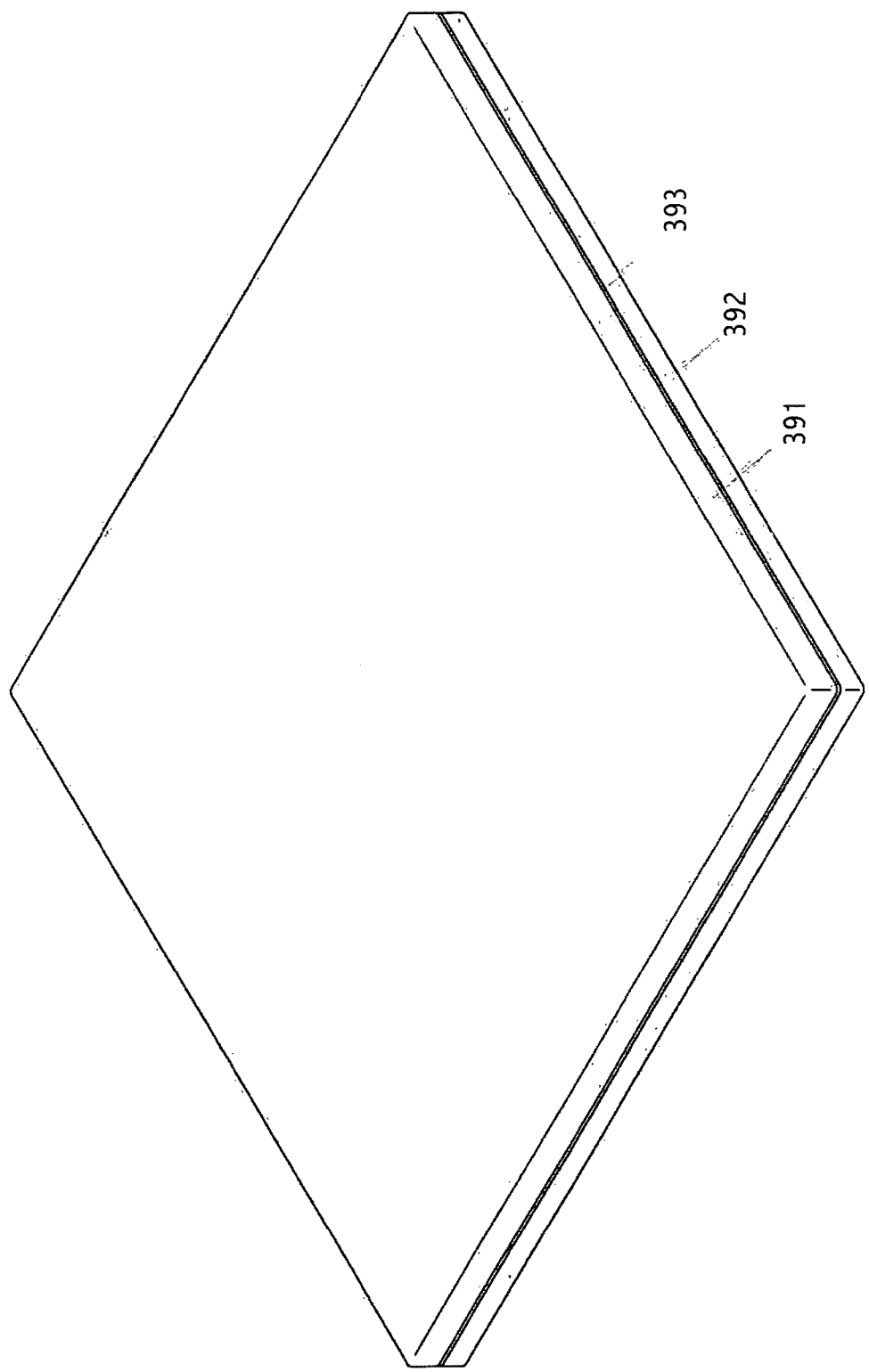
FIG. 29 shows a constructed, seamless panel that is free of a bezel.

FIG. 29 shows a simplified view of a panel. 391 shows the illumination plates. 392 shows the base plates. 393 shows a small gap between the illumination plates and the base plates. As shown, from a nominal viewing distance, the panel appears seamless. A support surface for this panel is not shown. Note in particular that no bezel is required to create a finished, smooth and safe panel. Holes in the sides of the tiles that are used for tile-to-tile interconnections are filled with cosmetic plugs, not visible from this distance. One unique advantage of these embodiments is that the panel may be constructed flush to an existing edge, such as a wall, ceiling, floor, edge of a shelf, table or support, without the need for a bezel. For example, panels may be placed on an existing wall with the edges of the panel entirely flush with the walls left and right and the floor below and the ceiling above. As another example, a panel may be the entire surface of a restaurant table.

FIGS. 30A, 30B, and 30C show the primary components in a kit to construct a panel, in one embodiment. These are the base plates, 401; "O" clamps, 402; and illumination plates 403. A completed panel is shown, 405, in FIG. 30C. A plug is used to fill the holes, 403, at the edges of the panel, created by the partial gaps in the edge, 406 in FIG. 30A, that are used to hold the tile-to-tile interconnecting cables. 403 in FIG. 30D shows the hole prior to having a cosmetic plug inserted. The plug itself is not shown.

Figure 31A:
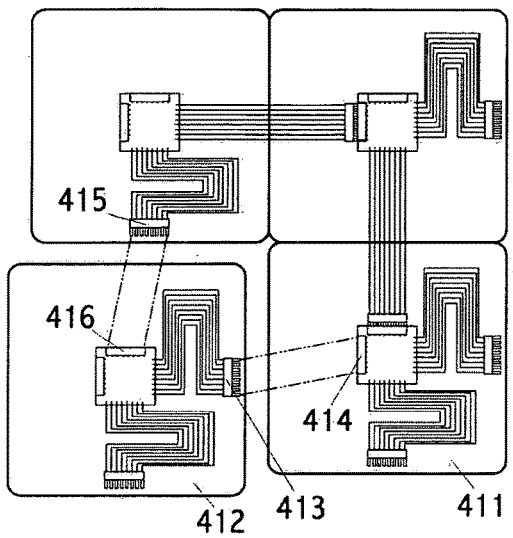
FIGS. 31A, 31B, 31C, 31D and 31E show an embodiment of steps to create a panel from tiles.
Figure 31B:
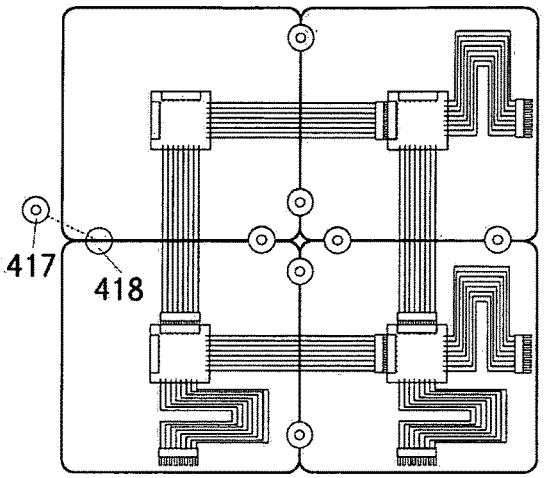
Figure 31C:
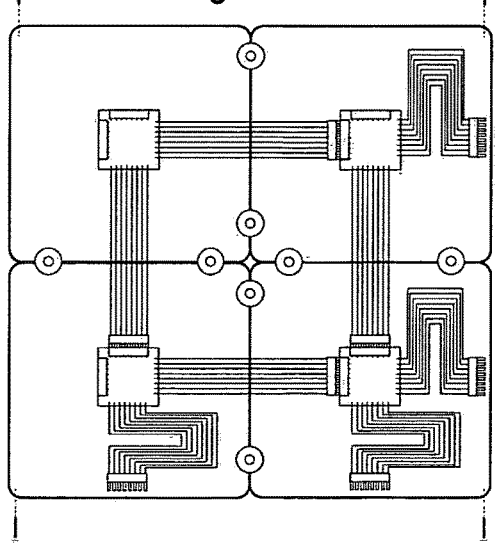
Figure 31D:
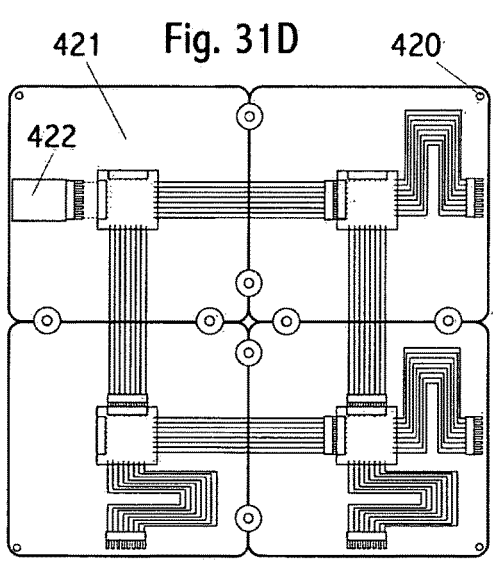

FIGS. 31A through 31E show the process of assembling a panel. In FIG. 31A base plates are electrically connected. Base plate 412 is about to be connected to the three base plate group: 411. For example, cable 415 plugs into connector 416 and cable 413 plugs into connector 414. In FIG. 31B "O" clamps 417, are placed at all tile adjacencies, in corresponding "O" clamp mating positions 481. In FIG. 31C the panel portion comprised of assembled base plates (which may be only a portion of the final panel) is mounted to a supporting surface with fasteners, 419. Note that not all base plates need be affixed to the supporting surface. In FIG. 31D a panel controller 422 is attached to one tile, here 421. Installed fasteners are shown 420. Power for the panel may come through the same connection as the panel controller 422, or another connection, to any tile. A separate power connection is not shown.

Figure 31E:
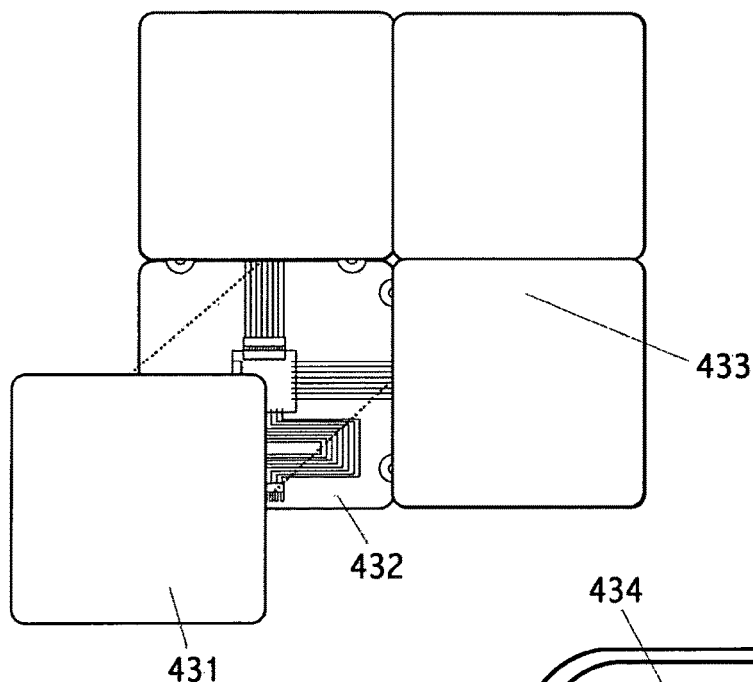

In FIG. 31E the illumination plates are first electrically plugged into a corresponding base plate, then mechanically affixed to the base plate, such as by the use of magnets and mechanical alignment features, as described above. 433 shows one of three installed illumination plates. 431 shows an illumination plate about to be installed over base plate 432.

FIGS. 31A through 31D show one embodiment of wiring tiles. Even with some tiles connected in a "loop," as shown in FIGS. 31B through 31D, a logical connected network in the form of a tree, without logical loops, as has been described above, is implemented. Tiles "fully connected," meaning connected to every adjacent tile, is, in some embodiments, advantageous for distributing power. In one embodiment the power wiring between tiles and the communications wiring between tiles is not necessary the same.

Figure 31F:
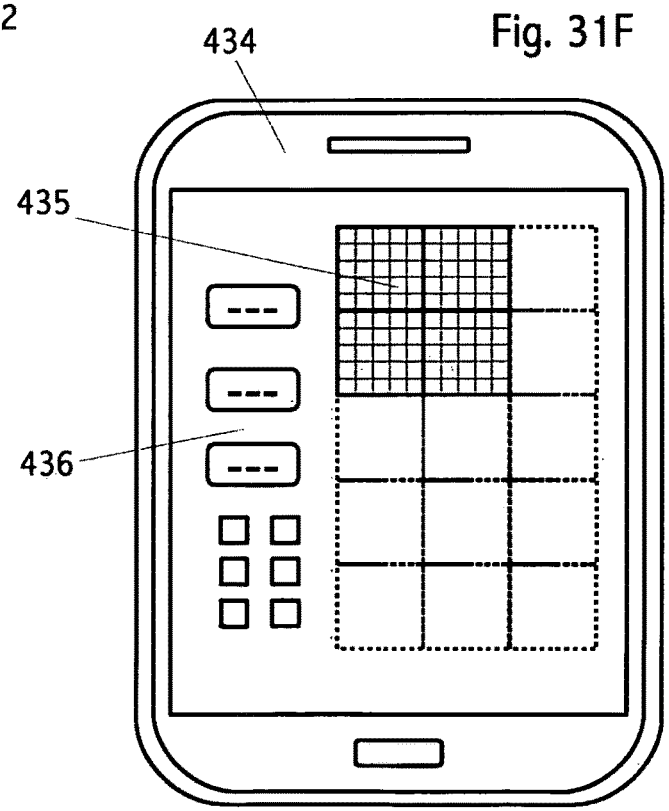
FIG. 31F shows a replication of a constructed panel architecture on portable electronic device.

FIG. 31F shows an app 436 running on a personal electronic device 434. The app is in communication with the panel controller. The controller has sent to the app the panel configuration (a 2×2 square), of the completed panel of FIG. 31E, which is visible, 435.

In one embodiment one or more sensors are used in the base plates to automatically detect rotational orientation of the base plate on a wall. One to four tilt switches may be used for such sensors. In one embodiment one or more sensors are used in the illumination plates to automatically detect the rotational orientation of the illumination plate on a wall. One to four tilt switches may be used for such sensors. A single tilt switch sensor may be used to detect "proper" orientation. Two tilt switch sensors, placed for example at 45 degrees, may provide a two-bit binary combination indicating one of four orientations. Additional sensors may be used for convenience, such as one sensor per orientation angle.

In one embodiment the above sensors in the base plates are used to automatically compute the orientation of the panel as a whole. In one embodiment the above sensors in the base plates, in conjunction with the protocol on the interconnection communication elements between the base plates, are used to automatically determine panel configuration—that is, the relative location of each base plate relative to the other base plates.

In one embodiment the above sensors in the illumination plates may be used to create a map of physical illumination elements (pixels) to desired visual location of pixels on the panel (such as upper left) so that a correct map of desired pixel location within an illumination panel may be determined automatically for any of four rotations of any illumination plate, as the panel has been constructed.

The use of such sensors as described above has the advantage and utility that panels may be constructed by placing base plates in any orientation and illumination plates in any orientation and the panel will self-configure, when fully installed, interconnected and equipped with a suitable controller.

Many other sensor types may be used to detect rotation of base plates, illumination plates, or both.

In one embodiment the illumination elements and tiles are designed such that the light overlaps between pixels in a generally Gaussian shaped or normal distribution brightness curve to generate a rounded final appearance for a single illuminated pixel in isolation. The shape of the Gaussian brightness curves are such as to minimize visible seams between adjacent pixels of equal brightness and hue. The advantage of this embodiment is that sharp boundaries between areas of differing hue or brightness are now blurred, to create a softer visual effect. This embodiment may be appropriate for mood or ambient lighting. In particular, gradual brightness or color changes over a panel area are possible. Sky and clouds (fixed or moving) may be simulated. Gracefully moving shapes are possible. In general, this embodiment is accomplished by lowering the ribs so they do not touch the diffusion layer and by changing the shape of the primary reflector near its perimeter to reflect more light into its neighboring pixels. In addition, a more diffuse, such as a thicker, diffusion layer is appropriate. Uniformity of brightness (emissivity) has the same standard or ranges as for other embodiments described herein. Looking at a cross-section of the brightness curves of two adjacent pixels, the brightness of the first pixel tapers lower at effectively the same slope as the brightness of the second pixel increases, so that as the overlapping portions of the two brightness curves are added, the overall brightness moving from the center of the first pixel to the center of the second pixel is constant, within a predetermined uniformity. This is true for both cross-sections through the center of pixel edges and for cross-sections through pixel corners. Ideally, the brightness from a first pixel tapers to zero at or close to the center of adjoining pixels, within predefined limits, such as within 5%, 2%, or 1% of average brightness. Support for the diffusion layer may be achieved by using light transmissive ribs or supports, or by supporting the diffusion layer with a narrow support at the corners of the pixels, but not at the edges of the pixels.

A suitable component in some embodiments for a tile processor is a Microchip® PC24FJ128 CPU with 128 KB Flash memory and four bi-directional communication ports. A suitable component in some embodiments for an LED driver in the illumination plates is a Texas Instruments® TLx59xx component, such as a TLC5951. This component includes a built-in regulator and a dot correction function to achieve matched colors between pixels. A suitable component in some embodiments for the illumination elements, as LEDs, is MULTILED (RGB) from Osram® (LRTB-GFTM) in a PLCC-6 package. A suitable component in some embodiments for a DC-DC power supply on each tile comprises a Texas Instruments® LM5005. A suitable component in some embodiments for a WiFi interface on the panel process is an FCC certified WiFi modules from Murata®, GainSpan®, Roving Networks®, Microchip®, or Texas Instruments®. A suitable component in some embodiments for a panel controller CPU is an ARM 32-bit Cortex-A8 processor, such as a Texas Instruments® AM335x. Suitable tile rotation sensors for some embodiments are two, two-pin tilt switches.

A suitable material in some embodiments for the base plate is injection molded ABS plastic. A suitable material in some embodiments for a lens array is injection molded PMMA. A suitable means of assembling the electronic components in the illumination module is to place surface mounted LEDs on the front side of a printed circuit board and the CPU, LED drivers, DC-DC converter, cable connector to the base plate, and related components on the back of the same printed circuit board.

A suitable range of pixels per tile is 2×2 to 256 by 256. Another suitable range of pixels per tile is 3×3 to 64×64. Yet another suitable range is 5×5 to 12×12. Yet another suitable range is 6×6 to 8×8. Tiles may be rectangular, with either rectangular or square pixels. A suitable rectangular aspect ratio is 2:1. Rectangular tiles may be assembled into panels using brick patterns, including diagonal and curved patterns.

A suitable range of tile size is 1 cm square to 2 m square. Another suitable range of tiles size is 3 cm square to 500 cm square. Yet another suitable range of tile size is 10 cm square to 100 cm square. Yet another suitable range of tiles size is 20 cm to 50 cm square. Yet another suitable is the same as, or in integer fraction of, or an integer multiple of standard floor, wall or ceiling tiles. For these sizes, panels may be constructed that replace an integer number of standard tiles, such as ceiling tiles or ceiling panels. Tile size may be rectangular.

DEFINITIONS

"Adjacent"—refers both to mechanically touching or to a functionally electrically adjacent, meaning directly connected. Which or both of these variations in definition is determined by the context.

"Behind a product" this might be a shelf, horizontal, vertical, or angled, such as might display shoes, purses or electronics. The surface might be a restaurant surface on which food is displayed or served. The surface might be a dance or exercise surface such as a floor, where here, the "product" is a service such as dancing, teaching, or exercising.

"Bezel" is a mechanical component that goes either over the top, around the edge, or both, of those portions of a display that produce illumination. A bezel may provide mechanical support or visually clean lines, or other purposes such as wiring, power, or input light. Typically a bezel surrounds an entire panel, although a bezel need not completely surround a panel. A bezel on a panel prevents two such panels from being placed adjacent seamlessly. A bezel generally prevents the illumination portion of a panel from going fully to the flush edge of a mounting surface.

"Changes in a product" Such changes might include placement, removal, position, or movement of the product, such as shoes. A product might have an RFID to easily identify it, or it might be identified by means of a video camera, or an inventory system, for example. For example, different colors and different types of motion on the panel may be used for different types of shoes, such as running shoes for men versus high-fashion dress shoes for women.

"Connected power"—may include a fusing device as part of the connection.

"Corresponding . . . plate"—When an illumination plate is mechanically and electrically operatively connected to a base plate, the pair forms a tile, and the illumination plate is the "corresponding" plate to the base plate, and vice versa.

"Edge"—a mating edge to effect the tessellation of the panel. Generally straight, but may be curved.

"Freeform drawing"—drawing by hand, such as using a finger or stylus on a touch-sensitive device to form an arbitrary image, such as a scribble, or a recognizable image, such as a face or a flower.

"Grid" is a regular pattern such that additional elements, if added to the grid, could be placed only at predictable locations. A grid may consist of the intersection points of two sets of parallel lines, where the spacing of the lines is predictable. If the two sets of lines are orthogonal, then the grid is rectangular. A grid does not have to be rectangular; for example, a honeycomb pattern. A grid does not need identical spacing between elements; for example, a grid that expands outward growing geometrically.

"Graphical input file" is a digital file in still image format such as JPEG, GIF, or TIFF, or a video format such as MOV, AVI, WMV, MPEG, H.264, DVD, or animation formats such as Flash, HTML5, animated GIF, or Silverlight. Those in the art realize there are a large number of such formats.

"Left," "right," "up," down"—terms are arbitrary and do not refer to any particular direction or orientation. A tile, base plate, illumination plate, or panel may be rotated any angle within any of three axes. One or more tilt switches may be used as sensors to automatically determine physical orientation relative to gravity.

"Logical tree"—set of linked nodes, where the nodes are tiles, where there is a single path from any node to any other node. In one embodiment, where each tile (node) has four communication ports, there is a maximum of four tiles connected directly to that tile. In one embodiment, each tile is connected to at least one adjacent tile. Another way to think of logical trees is that there are no loops. A single node may be identified as a root node. In one embodiment, the root node is a tile that is not fully surrounded by other tiles. Thus, it has at least one interface available to connect to an external controller or to an external power source. Note that the controller root and the power input root may be separate tiles. In a preferred embodiment, when traversing the tree from the root, there are no more than two exit branches one each node.

"Male" and "female" connectors—No mechanical attributes implied—only the ability of a male to mate to a female.

"Map the pixels" may mean the best available mapping to accomplish a particular goal, such as fitting the entire source image on the panel; or filling the panel while maintaining the original aspect ratio, or adjusting the aspect ratio to fit a panel. Such mapping also may include color mapping and may include changes to frame rates. Such mapping may include "sharpening" operations or "blur" operations. Such mapping may include overlays or combining with other image sources.

"Panel graphics" may be a still, video or animation, or programmable module for display on a panel. Such panel graphics may be linked, or used as sub-modules, or used as subroutines for a more comprehensive panel graphic. They may be overlaid or arranged in different portions of a panel.

"Pixel parameters" means parameters such as the horizontal size or vertical size in pixels, aspect ratio, pixel count, resolution, or implied parameters in standards such as DVD or Blue Ray.

"Video game" may be single player game, a multi-player game, or a massively multi-player game. In the panel area means at least one game player is in this area.

"Plane," or "planer"—Typically, the panel is assembled on a planer or nearly planer surface. However, gentle curves are possible by adding a small angle, either concave or convex between tiles. In addition, special tiles may be available to assist in the creation of gentle or moderate curves. In addition, special O-clamps may be provided to assist in the creation of gentle or moderate curves. Such moderate curves are formed, then, to be "faceted," where each facet is a single tile or single row (or column) of tiles. Moderate curves of this nature may be used on a curved backdrop of a trade show booth, a diorama, or a curved ceiling, as examples. In addition, connector, connecting cables, and special O-clamps, as well as other interfacing elements, may be provide to implement right-angle concave or convex corners within the panel. In addition, tiles might be placed in a "relief pattern," such as a checkerboard pattern, where the surfaces of diagonally adjacent tiles are in a single plane and the surfaces of the remaining diagonally adjacent tiles are in a second plane and the two places are close to each other, such as a fraction of the tile width. Such a relief pattern may be irregular in order to create a more natural, or "random texture" appearance of the panel when close, yet show a relatively planer image from the panel as a whole at distance.

"Programmable electronic device" may be a consumer mobile electronic device such as a laptop, tablet, or smart phone, or it may be an embedded processor, such as an OEM computer board, or may be a virtual device in a remote server.

"Relative physical location of tiles"—assuming the panel is in a vertical plane for convenience of this definition, the relative physical location of tiles means determining a map with an entry for each tile in the panel, and that the relationship, such as: above, left or, below, or right of, for each adjacent tile to that entry is known.

"Selected by a user"—A user may select at any time, by any of many known methods, such as by name, appearance, or attribute, a file or multiple files, a pattern, sub-patterns, or subroutine. Such selection might be in real-time, at a previous time, or the selection might be stored earlier and retrieved automatically later, as from a list, calendar, script, application, or other means. The selection may be nearby or remote. Automatic selection may include other means of selection, such as selecting one file from a set randomly, or based on a sensor or other input.

"Tessellation"—see images. Often based on a repeating rectangular or hexagonal base, but may not. Also, the overall shape may be distorted, "rubber like." Once such distortion is to create curved lines in place of straight lines.

"Thickness of pixel walls"—the thickness of pixel walls is the effective optical thickness as observed from a normal viewing distance of an operating panel. The pixel walls serve the purpose of blocking the light from one pixel from overlapping or interfering with the light from an adjacent pixel, while at the same time maximizing the apparent uniformity of light from an array of multiple pixels. A pixel wall may cause a dark band, or a light band, or a different colored band to be visible at the "seam" between pixels. The effective optical width of a pixel wall is the visible intensity of such an optical seam. Two pixel walls are effectively the same optical thickness if the seams they create are visibly indistinguishable.

"Width"—is a measurement in the plane of a panel. Depth is a measurement on an axis normal to the plane of a panel. In general, directionality terms are relative to tiles, tile components, and panels mounted on a vertical wall, unless otherwise clear from the context. In one embodiment, tiles are square with a 30 cm width and a 4 cm depth.

The set: (temperature, motion, sound, and network activity) include such specifics as room temperate, the temperature of people or animals or food, the motions of people, animals, objects or vehicles: sound may include music, talking, singing, street noise, background noise and other sound sources; network activity includes quantity of activity, type of activity such as email, web surfing, or video, specific elements within the network data such as keywords. This set also includes changes, which might be temporal or spatial.

Ideal, Ideally, Optimum and Preferred—Use of the words, "ideal," "ideally," "optimum," "optimum," "should" and "preferred," when used in the context of describing this invention, refer specifically a best mode for one or more embodiments for one or more applications of this invention. Such best modes are non-limiting, and may not be the best mode for all embodiments, applications, or implementation technologies, as one trained in the art will appreciate.

May, Could, Option, Mode, Alternative and Feature—Use of the words, "may," "could," "option," "optional," "mode," "alternative," "typical," "ideal" and "feature," when used in the context of describing this invention, refer specifically to various embodiments of this invention. Described benefits refer only to those embodiments that provide that benefit. All descriptions, examples, and scenarios herein are non-limiting, as one trained in the art will appreciate.

All examples are sample embodiments. In particular, the phrase "invention" should be interpreted under all conditions to mean, "an embodiment of this invention." Examples, scenarios, drawings, applications, and claimed benefits herein are non-limiting. The only limitations of this invention are in the claims.

All combinations and sub-combinations of all features, embodiments, claims and claim limitations are explicitly included as embodiments herein.

Embodiments

Various embodiments include:
101. A tile for the purpose of providing illumination comprising:
   a plurality of illumination devices configured to provide colored light of different hues and brightnesses;
   a processor operatively connected to the illumination devices;
   a one or more communication interfaces operatively connected to the processor configured to connect to a plurality of similar tiles;
   wherein each tile edge is configured to optionally mate to a tile edge of an adjacent tile;
   wherein the processor is configured to receive over one or more of its communication interfaces hue and brightness commands.
102. The tile of embodiment 101 wherein:
   the tile is rectangular.
103. The tile of embodiment 101 wherein:
   the number of communication interfaces is three or more.
104. The tile of embodiment 101 wherein:
   the processor controls the brightness and hue of each illumination device separately.
105. The tile of embodiment 101 wherein:
   the illumination devices are arranged in a grid.
106. The tile of embodiment 101 additionally comprising:
   reflective or refractive surfaces are located primarily between the illumination devices;
   such that the illumination from the tile appears maximally uniform across the surface of the tile.
107. The tile of embodiment 106 additionally comprising:
   a light barrier located primarily between the illumination devices;
   such that the illumination from each illumination device minimally overlaps with the illumination from the other illumination devices.
108. The tile of embodiment 101 additionally comprising:
   a light diffuser wherein the surface of the light diffuser extends to the edges of the tile.
109. The tile of embodiment 101 additionally comprising:
   a base plate and an illumination plate wherein the illumination plate is attachable and removable from the base plate by a force normal to the plates, with the force compressing the plates for attachment and the force separating the plates for removal.
110. The tile of embodiment 101 further comprising:
   four electrical connectors, one associated with each tile edge, wherein two connectors are male connectors and two connectors are female connectors, and wherein a male connector and a female connector are associated with opposing edges; and wherein the male connectors mate with the female connectors.
111. The tile of embodiment 101 further comprising:
   four electrical connectors of a first gender;
   wherein the tile and the four electrical connectors are configured to connect to a similar tile with a tile connection cable where the tile connection cable comprises two connectors of a second gender and the connectors of the first gender mate to the connectors of the second gender.
112. The tile of embodiment 101 further comprising:
   n electrical connectors, one associated with of the n tile edges, where n is greater than two, each connector comprising at least one positive power conductor and at least one negative power conductor, and wherein the positive power conductor of each connector is electrically connected to the positive power conductor of the other connectors, and wherein the negative power conductor of each connector is electrically connected to the negative power conductor of the other connectors.
113. The tile of embodiment 113 wherein:
   the processor receives power from any one of the n connectors.
114. The tile of embodiment 113 wherein:
   each of the n connectors additionally comprises a bi-directional communication circuit.
115. The tile of embodiment 113 wherein:
   each of the n connectors additionally comprises at least two positive power conductor and at least two negative power conductors.
116. The tile of embodiment 113 wherein:
   each of the n connectors comprises two mechanical positions: a recessed and a non-recessed position; wherein when in the recessed position no part of the connector extends beyond the associated edge of the tile and wherein when in the non-recessed position the connector is capable of mating.

117. The tile of embodiment 110 wherein:
the base plate is configured to attach to a supporting surface, and the illumination plate is configured to attach to the base plate without attachment to the supporting surface.

118. The tile of embodiment 110 wherein:
the base plate is further configured to attach to other base plates to form a panel base set such that a fraction of the base plates in the panel base set are free of attachments to a supporting surface while the panel base set as a whole is soundly structurally attachable to the supporting surface.

119. The tile of embodiment 119 wherein:
the fraction of base plates in the panel base set that are free of attachment to a supporting surface is between 49% and 98%.

120. The tile of embodiment 110 further comprising:
one or more "O-clamps" wherein each 0-clamp comprises a first and a second element and wherein the first element mates via pressure to a corresponding first mating element in a first base plate and the second element mates via pressure to a corresponding second mating element in a second base plate and wherein the first base plate and second base plate are held adjacent by the one or more O-clamps.

121. The tile of embodiment 121 wherein:
the O-clamps, when installed on two adjacent base plates, maintain these two adjacent base plates substantially planer.

122. The tile of embodiment 121 wherein:
the base plate is free from edge interference elements such that: when a first base plate is secured on all sides to adjacent surrounding base plates with the O-clamps and the adjacent surrounding base plates are secured to a supporting surface, the first base plate may be removed from the supporting surface by removing the O-clamps from the first base plate without removing any of the adjacent surrounding base plates from the supporting surface.

123. The tile of embodiment 101 further comprising:
n electrical connectors, one associated with of the n tile edges, where n is greater than two, wherein each of the n connectors is configured to support a minimum of 20 amps of continuous current flow per connector.

124. The tile of embodiment 101 further comprising:
at least n magnets, at least one magnet associated with each of the n tile edges, wherein the magnets are configured such that tiles may be arranged in contiguous grid comprised of adjacent tiles.

125. The tile of embodiment 125 wherein:
the at least n magnets maintain the alignment of the tiles substantially planer.

126. The tile of embodiment 110 wherein:
the illumination plate mates with the base plate magnetically.

127. The tile of embodiment 110 wherein:
the base plate comprises first mating shape and the illumination plate comprises a second mating shape such that the first mating shape and the second mating shape mechanically align and mate such that when the first and the second mating shapes are mated that the edges of illumination plate are accurately aligned with any adjacent illumination plates.

128. The tile of embodiment 101 further comprising:
a first tile;
a second tile;
wherein copies of the first tile and copies of the second tile may be arranged in a contiguous planer tessellation.

201. An illuminated panel comprising:
a plurality of adjacent tiles of embodiment 101.

202. The illuminated panel of embodiment 201 additionally comprising:
all tiles in the panel each comprise an array of addressable pixels;
wherein the addressable pixels in a first tile, in conjunction with the addressable pixels in additional tiles adjacent to the first tile, form a substantially uniform array of pixels.

203. The illuminated panel of embodiment 201 additionally comprising:
a programmable controller, comprising non-transitory memory;
a data structure in the non-transitory memory wherein for a given pixel location in the panel the data structure comprises an entry that identifies first a tile within the panel and second a pixel within that tile.

204. The illuminated panel of embodiment 201 additionally comprising:
a first tile in the panel, comprising four interfaces, configured to receive a tile-address message comprising a tile address from any one of the four interfaces, which interface is then identified as a first interface;
wherein the first tile is additionally configured to determine if it is the tile identified by the address in the tile-address message; and if so; to not retransmit the tile-address message;
wherein the first tile, if it is not the tile identified by the address in the tile-address message, then determines which of the non-first interfaces to use for retransmission based on address within the tile-address message, where this determination is based on a prior auto-configuration sequence of the panel;
wherein the first tile, if it is not the tile identified by the address in the tile-address message, then retransmits the tile-address message out the above-determined interface.

205. The illuminated panel of embodiment 201 additionally comprising:
a programmable controller, comprising non-transitory memory and a first controller interface;
a controller program executing in the memory of the controller;
a tile program, executing in the memory of the processors in each tile in the panel;
wherein the tiles of the panel are electrically connected to adjacent tiles;
wherein the controller is electrically connected to at least one tile in the panel;
wherein the controller program and the tile program operate cooperatively such that for any panel configuration the controller program determines the relative location of each tile within the panel.

206. The illuminated panel of embodiment 201 additionally comprising:
a graphical user interface (GUI) configured to operate on a programmable electronic device wherein the GUI comprises:
a first GUI function to accept a panel configuration comprising panel pixel parameters from the programmable controller;

a second GUI function to accept a graphical input file selected by a user;
a third GUI function to automatically map the pixels in the input file to pixels in the panel, responsive to both the pixel parameters in the input file and the panel pixel parameters.

207. The illuminated panel of embodiment 201 further comprising:
a graphical user interface (GUI) configured to operate on a programmable electronic device wherein the GUI comprises:
a first GUI function to accept a panel configuration comprising panel pixel parameters from the programmable controller;
a second GUI function to display the panel configuration to a user.

208. The illuminated panel of embodiment 208 further comprising:
a third GUI function to allow the user to move panel tiles to more accurately represent the physical location of tiles in the panel.

209. The illuminated panel of embodiment 209 further comprising:
a fourth GUI function wherein an individual tile on the display, as the user moves the tile, snaps to a nearest grid location on a predefined grid.

210. The illuminated panel of embodiment 201 further comprising:
a user accessible repository of panel graphics, wherein multiple users may upload and download panel graphics;
a file format conversion module adapted to modify a selected panel graphic prior to downloading such that the modified panel graphic file is compatible with a user's panel configuration.

211. The illuminated panel of embodiment 201 further comprising:
a sensor producing data responsive to one or more elements in the set: (temperature, motion, sound, and network activity) in a panel area in which the panel is visible and wherein the display on the panel changes responsively to the sensor data.

212. The illuminated panel of embodiment 201 further comprising:
a network data interface responsive to at least one video game being played within a panel area in which the panel is visible and wherein the display on the panel changes responsively to the game action in at least one video game.

213. The illuminated panel of embodiment 201 further comprising:
a graphical user interface (GUI) configured to operate on a programmable electronic device wherein the GUI comprises:
a first GUI function that allows a user to draw freeform;
a second GUI function that transmits the drawing of the user in real-time to the panel.

214. The illuminated panel of embodiment 201 wherein:
the panel may be powered via a single power connection to any available connector on any tile.

215. The illuminated panel of embodiment 201 wherein:
the panel is controllable via a single data connection to any available connector on any tile not fully surrounded by adjacent tiles.

216. The illuminated panel of embodiment 201 wherein:
the tiles are connected in a logical tree structure;
the panel is controlled via a single data connection to the tile at the root of the logical tree.

217. The illuminated panel of embodiment 201 wherein:
the panel is free of a bezel.

301. A method of creating a rectangular panel comprising the steps of:
placing tiles of embodiment 101 adjacently in at least two axes of the panel;
connecting all the tiles in the panel with communication cables such that each cable connects two adjacent panels.

401. A method of displaying products comprising:
the illuminated panel of embodiment 201 wherein the panel is located behind at least one product;
the display on the panel changes responsively to changes in the at least one product.

501. A kit comprising:
a plurality of base tiles;
a plurality of illumination tiles;
a controller;

601. A method of assembling a panel comprising:
a first step of electrically joining base tiles into one or more base tile groups;
a second step of mechanically joining the tiles within the one or more base tile groups;
a third step of fastening the one or more base tile groups to a supporting surface;
a fourth step of connecting a controller to any one tile on the periphery of the panel;
a fifth step of attaching illumination tiles to each base tile;
sixth step of running a program on the controller to automatically determine panel configuration;
such that the tiles in the complete panel are electrically wired in the form of a logical tree;
wherein the above steps do not necessarily need to be done in the above sequence.

The invention claimed is:
1. A rectangular, modular tile for the purpose of providing illumination comprising: an array of illumination devices configured to provide colored light of different hues and brightness; a processor operatively connected to the illumination devices; three or more communication interfaces operatively connected to the processor adapted to connect to a plurality of similar, adjacent tiles, wherein each tile is adapted to connect mechanically and electrically to one to four adjacent tiles; wherein the improvement comprises:
each tile comprises a base plate and an illumination plate, operatively attached to the base plate, wherein:
the base plate comprises: (a) a base plate frame, adapted to mechanically attach to adjacent base plates on four sides, and adapted to be mounted on a structural support surface, and adapted to mechanically, removably attach to the illumination plate; (b) at least three panel electrical interconnection elements, each panel electrical interconnection element associated with one side, adapted to electrically connect to adjacent base plates; wherein each such panel electrical interconnection element supports both power and data transmission; (c) a first processor interconnection element adapted to electrically connect to the illumination plate; and
the illumination plate comprises: (a) an illumination plate frame, adapted to mechanically, removably attach to the base plate; (b) an array of light emitting elements;

(c) a second processor interconnection element adapted to electrically connect to the base plate; and (d) a diffusion layer through which light from the array of light emitting elements exits the illumination plate.

2. The rectangular, modular tile of claim 1 wherein:
the depth to width of the tile is a ratio of 1/4 or less.

3. The rectangular, modular tile of claim 1 further comprising:
a processor adapted to control the hue and brightness of each of the light emitting elements responsive to data received over one of the four electrical interconnection elements.

4. The rectangular, modular tile of claim 1 wherein:
the illumination plate is adapted to be attached and be removed from its corresponding base plate without the use of tools.

5. The rectangular, modular tile of claim 1 wherein:
the illumination plate is mechanically attached to its corresponding base plate by magnetic attraction.

6. The rectangular, modular tile of claim 1 wherein:
the base plate and illumination plate are mechanically keyed, such that only one of four rotational orientations of the illumination plate, relative to the base plate, permits proper attachment of the illumination plate to the base plate.

7. The rectangular, modular tile of claim 1 wherein:
the base plate and illumination plate each comprise at least one magnet, such magnet assisting in the removable attachment of the illumination plate to the base plate, and wherein the magnetic orientation of the magnet is such that only one orientation of the attached illumination plate, relative to the base plate, is consistent with the natural magnetic attractions of the magnet.

8. The rectangular, modular tile of claim 1 wherein:
the illumination plate is adapted to provide the appearance of a seamless display for pixels within an illumination plate; wherein the illumination plate provides light uniformity such that for any area of the diffusion layer on the illumination plate more than a distance equal to one tenth the width of a light emitting element from the edge of the illumination plate, measured over a circular area equal to 0.25% of the area of a light emitting element, the luminous emittance does not vary by more than plus or minus 10% from the average luminous emittance of the diffusion layer; when all pixels in the illumination plate are configured for equal hue and 50% of maximum brightness; and
wherein the illumination plate provides light uniformity such that for any area of the diffusion layer on the illumination plate more than a distance equal to one tenth the width of a light emitting element from the edge of any light emitting element, measured over a circular area equal to 0.25% of the area of a light emitting element, the luminous emittance does not vary by more than plus or minus 5% from the average luminous emittance of the diffusion layer; when all pixels in the illumination plate are configured for equal hue and 50% of maximum brightness.

9. The rectangular, modular tile of claim 1 wherein:
the light emitting elements are adapted to provide uniform light from light emitting element to light emitting element within one tile such that for any one light emitting element, its luminous emittance exiting the diffusion layer at that light emitting element does not vary by more than plus or minus 2% from the average luminous emittance of all light emitting elements in the tile, when all light emitting elements in the illumination plate are configured for equal hue and 50% of maximum brightness; and
the light emitting elements are adapted to provide uniform light from light emitting element to light emitting element for any two light emitting elements in different tiles within an operating panel of adjacent, interconnected tiles such that for any one light emitting element, its luminous emittance exiting the diffusion layer at that light emitting element does not vary by more then plus or minus 2% from the average luminous emittance of all light emitting elements in the panel, when all light emitting elements in the panel are configured for equal hue and 50% of maximum brightness.

10. The rectangular, modular tile of claim 1 wherein:
the illumination plate is adapted to provide the appearance of a seamless display for adjacent illumination plates in an operating panel of adjacent, interconnected tiles such that the luminous emittance centered on and aligned with a seam, over an area defined by a rectangle whose length on one side is the width of one light emitting element and whose length on an adjacent side is 5% the width of one light emitting element, does not vary by more than plus or minus 10% for an average seam between two illumination plates from an average seam on the interior of an illumination plate; wherein a seam is defined as the edge between two adjacent light emitting elements at the exit surface of the diffusion layer, when all light emitting elements in the panel are configured for equal hue and 50% of maximum brightness.

11. The rectangular, modular tile of claim 1 wherein:
the tile is adapted such that in an assembled and operating panel comprising at least two illumination plates, when the diffusion layers of the at least two illumination plates are viewed from a viewing distance of one meter, any visible seam between two first adjacent light emitting elements within one illumination plate is substantially indistinguishable from a seam between two second adjacent light emitting elements wherein the second adjacent pixels are in two adjacent illumination plates.

12. The rectangular, modular tile of claim 1 wherein:
the illumination plate further comprises a light emitting element wall surrounding each individual light emitting element; and
wherein the thickness of the light emitting element wall at the periphery of the illumination plate is half the thickness of the light emitting element wall between the light emitting elements within the illumination plate;
such that the thickness of the combined light emitting element wall (comprised of two half-thickness walls, one from each of two adjacent tiles,) for two light emitting elements in adjacent, connected tiles is the same as the thickness of the light emitting element wall for two light emitting elements within one tile.

13. The rectangular, modular tile of claim 1 wherein:
the tile is adapted to receive and retransmit a sequence of illumination command messages, wherein an illumination command message comprises a tile ID and a data block, and wherein the data block comprises one or more tuples, wherein each tuple comprises a light emitting element address and an illumination value, and wherein multiple tuples in the data block may be in arbitrary order, and wherein the sequence of illumination commands are free of a required order for their tile IDs; and each tile in an operating panel of interconnected tiles comprises a tile ID that is unique with that panel; and wherein if a received illumination command's tile ID matches the tile's ID the received illumination command is processed by the tile's processor and not retransmitted, and wherein if the received illumination command's tile ID does not match the tile's ID the received illumination command is forwarded to at least one adjacent tile.

14. The rectangular, modular tile of claim 1 wherein:

the four electrical interconnection elements are each adapted to support a minimum of 20 amps of continuous current; and the four electrical interconnection elements have a depth, as measured in the same direction as tile depth, of no more than 7.5 mm.

15. The rectangular, modular tile of claim 1 wherein:

the base plate comprises two half-receptacles on each edge wherein each half-receptacle is adapted to accept half a joining fastener such that two base plates may be removably attached adjacently edge to edge by the installation of two joining fasteners, each joining fastener occupying the corresponding half-receptacles on the adjoining edge of the two base plates; and wherein two such attached base plates are maintained in proper translational alignment in three perpendicular axes by the two installed fasteners.

16. The rectangular, modular tile of claim 1 wherein:

the base plate is adapted to permit assembly of a panel on a vertical wall comprised of a first base plate; a second base plate removably attached to a first edge on the first base plate; and a third base plate removably attached to a second edge on the first base plate, wherein the first edge and the second edge of the first base plate share a common corner of the first base plate; and wherein the rotational orientation of the first base plate may be any of four rotations; the rotational orientation of the second base plate may be any of four rotations, and the rotational orientation of the third base plate may be any of four rotations, without negatively affecting the operational performance of the panel.

17. The rectangular, modular tile of claim 1 wherein:

the tile is adapted to permit assembly of a wall-mounted panel of adjacent tiles comprised of at least two tiles in a horizontal row and at least two tiles in a vertical column; wherein each tile in the panel is connected to at least one adjacent tile via one of its at least three panel electrical interconnection elements; and wherein each tile in the panel is interconnected to every other tile in the panel through a series of such adjacent tile connections;

wherein any additional connections between adjacent tiles may be then added to the panel using any remaining unconnected of the at least three panel electrical interconnection elements for each tile, without negatively affecting the operational performance of the panel.

18. The rectangular, modular tile of claim 1 wherein:

the base plate is adapted to permit assembly of a subpanel comprised of a plurality of adjacent, attached base plates; wherein the subpanel is then securable to a wall by securing no more than a subset of the base plates to the wall, the subset consisting of selected base plates, such selected base plates selected such that each base plate in the subpanel is adjacent to at least one selected base plate.

19. An illuminated panel constructed from the plurality of adjacent, interconnected tiles of claim 1.

20. The illuminated panel of claim 19 wherein the tiles are adapted such each panel tile may be in any of four rotational orientations, and wherein the tiles are adapted such that the panel tiles require no pre-assigned tile ID prior to the construction of the panel.

21. The illuminated panel of claim 19 wherein the tiles are adapted such the constructed panel is controllable by a single controller connected to any unconnected of the at least three panel electrical interconnection elements of any tile of the constructed panel.

22. The illuminated panel of claim 19 wherein the tiles are adapted such the constructed panel is powered by a single power source connected to any unconnected of the at least three panel electrical interconnection elements of any tile of the constructed panel.

23. The illuminated panel of claim 19 wherein the panel is free of a bezel.

24. The illuminated panel of claim 19 further comprising:

one or more rotational orientation sensors in the base plate;

such that a panel constructed of adjacent and interconnected base plates wherein each base plate has a connected corresponding illumination plate, when connected to a suitable controller, self-configures with respect to determining the relative locations of tiles within the panel and the orientation of panel as a whole.

25. A kit suitable for the construction of an illuminated panel, comprising:

(i) a plurality of base plates, each base plate comprising: (a) a base plate frame, adapted to mechanically attach to adjacent base plates on four sides, and adapted to be mounted on a structural support surface; (b) at least three panel electrical interconnection elements, each panel electrical interconnection element associated with one side, adapted to electrically connect to adjacent base plates; wherein each such panel electrical interconnection element supports both power and data transmission; (c) a first processor interconnection element adapted to electrically connect to a corresponding illumination plate;

(ii) a plurality of illumination plates, each illumination plate comprising: (a) an illumination plate frame, adapted to mechanically attach to a corresponding base plate; (b) an array of light emitting elements; (c) a second processor interconnection element adapted to electrically connect to the corresponding base plate; and (d) a diffusion layer through which light from the array of light emitting elements exits the illumination plate;

(iii) a panel controller, adapted to attach to a constructed panel at any single peripheral tile on the constructed panel;

wherein the constructed illuminated panel is comprised of a plurality of adjacent, interconnected tiles, each tile comprising one base plate and one associated illumination plate.

26. A method of assembling an illuminated panel, comprising the steps of:

(a) joining electrically a plurality of base plates into one or more base plate groups;

(b) joining mechanically the base plates within the one or more base plate groups;

(c) fastening the one or more base plate groups to a supporting surface such that at least one base plate in each base plate group is adjacent to at least one base plate in at least one other base plate group, if there is more than one base plate group; wherein all base plate groups together form a panel base;

(d) joining mechanically and electrically at least one base plate in each base plate group with one adjacent base plate in another base plate group, if there is more than one base plate group in the panel base;

(e) attaching an illumination plate to each base plate in the panel base, wherein each base plate and corresponding attached illumination plate forms a functional tile, and wherein all mechanically and electrically interconnected functional tiles form a functional panel;

(f) connecting a panel controller to any one tile of the panel;

(g) connecting a panel power source to any one plate of the panel;

wherein the above steps do not necessarily need to be done in the above sequence; and wherein:

(i) each base plate comprises: (a) a base plate frame, adapted to mechanically attach to adjacent base plates on four sides, and adapted to be mounted on a structural support surface; (b) at least three panel electrical interconnection elements, each panel electrical interconnection element associated with one side, adapted to electrically connect to adjacent base plates; wherein each such panel electrical interconnection element supports both power and data transmission; (c) a first processor interconnection element adapted to electrically connect to a corresponding illumination plate; and (ii) each illumination plate comprises: (a) an illumination plate frame, adapted to mechanically attach to a corresponding base plate; (b) an array of light emitting elements; (c) a second processor interconnection element adapted to electrically connect to the corresponding base plate; and (d) a diffusion layer through which light from the array of light emitting elements exits the illumination plate.

* * * * *